US005461559A

United States Patent [19]
Heyob et al.

[11] Patent Number: 5,461,559
[45] Date of Patent: Oct. 24, 1995

[54] HIERARCHICAL CONTROL SYSTEM FOR MOLECULAR BEAM EPITAXY

[75] Inventors: Jeffrey J. Heyob; Oliver D. Patterson, both of Beavercreek; Steven R. LeClair, Spring Valley; T. Walter Haas, Kettering, all of Ohio; Kenneth Currie, Cookeville, Tenn.; Doug Moore, Okeana, Ohio; Stephen J. Adams, Dayton, Ohio; Victor Hunt, Cincinnati, Ohio

[73] Assignee: The United States of America as represented by the Secretary of the Air Force, Washington, D.C.

[21] Appl. No.: 131,536

[22] Filed: Oct. 4, 1993

[51] Int. Cl.$^6$ .................................................. G05B 13/04
[52] U.S. Cl. ........................... 364/149; 364/468; 395/904; 117/85; 505/473
[58] Field of Search ..................... 364/149, 148, 364/468, 488–491; 156/601; 437/81, 122; 395/902, 904, 903, 906, 912; 117/85, 86, 202; 437/105; 505/473; 118/725; 427/564

[56] References Cited

U.S. PATENT DOCUMENTS

| | | | |
|---|---|---|---|
| 5,096,533 | 3/1992 | Igarashi | 156/601 |
| 5,122,222 | 6/1992 | Turner et al. | 117/86 |
| 5,143,896 | 9/1992 | Harada et al. | 505/473 |
| 5,169,798 | 12/1992 | Eaglesham et al. | 437/81 |
| 5,185,288 | 2/1993 | Cook et al. | 437/122 |
| 5,205,900 | 4/1993 | Inoue et al. | 156/601 |
| 5,227,363 | 7/1993 | Furukawa et al. | 505/473 |
| 5,364,492 | 11/1994 | Eckstein et al. | 117/105 |

OTHER PUBLICATIONS

Currie, K. R. LeClair, S. R. and Pattevon, O. D., "Self–Improving Process Control for Molecular Beam Epitaxy", International Journal of Advanced Manufacturing Technology no date.
Chilton, P. A., Truscott, W. S., Wen, V. F. "Elimination of the Flux Transients from Molecular–Beam Epitaxy Source Cells following Shutter Operation", Journal of Vacuum Science and Technology, B6 (4), Jul./Aug. 1988 pp. 1099–1103.
Vlcek, J. C. Fonstad, C. G. "Precise Computer Control of the MBE Process", Journal of Crystal Growth, vol. III 1991 pp. 55–60.
Patterson, O. D., Qualitative Control of Molecular Beam Epitaxy, Self Directed Control Workshop, WRDC–TR–90–4123 May 1990.
Heyob, Jeffrey J., "The Process Discovery Autotuner", 1991, pp. 1–114.
Adams, Stephen J., "Implementation Of A Robust Algorithm For Comp. Of Shutter Opening Induced Flux Transients For The Molecular Beam Epitaxy Process":, 1993, pp. 1–78.
Patterson O. D., Adams S. J., Garrett P. H., Eyink K. G., LeClair S. R., Heyob J. J., Hunt V., Currie K. R., Haas T. W., "Progress Toward A Compre. Control Sys. For Molecular Beam Epataxy", Aug. 1992, pp. 1–20.
Heyob J. J., "Insitu Process Control Research", 1992, pp. 1–60.

*Primary Examiner*—James P. Trammell
*Attorney, Agent, or Firm*—Bernard E. Franz; Thomas L. Kundert

[57] ABSTRACT

A multi-featured control system which improves the manufacturing capability of the thin-film semiconductor growth process. This system improves repeatability and accuracy of the process, reduces the manpower requirements to operate MBE, and improves the MBE environment for scientific investigation. This system has three levels of feedback control. The first level improves the precision and tracking of the process variables, flux, and substrate temperature. The second level comprises an expert system that uses sensors to monitor the status of the product in order to tailor the process plan in real time so that the exact qualities desired are achieved. The third level features a continuously evolving neural network model of the process which is used to recommend the recipe and command inputs to achieve a desired goal. The third level is particularly useful during the development process for new materials. All three levels require models of the process which are updated during automatic process identification experiments.

18 Claims, 39 Drawing Sheets

Microfiche Appendix Included
(101 pages 2 Microfiche)

Modular Diagram of the MBE Control System

Sketches of Typical and Ideal Flux Waveforms

Knudsen Cell

PID Control Loop

The Three Loops of the MBE Control System

Fig. 5 Modular Diagram of the MBE Control System

Shutter Disturbance

Model of cell and PID controller

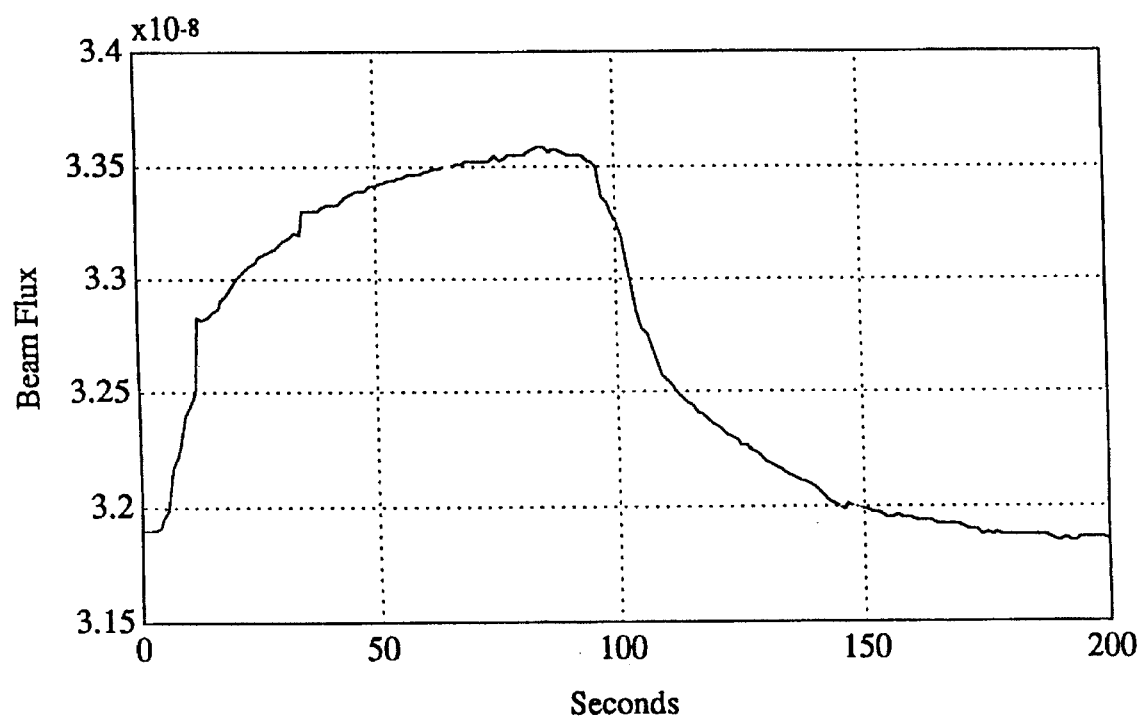
Figure 8. Pulse Data

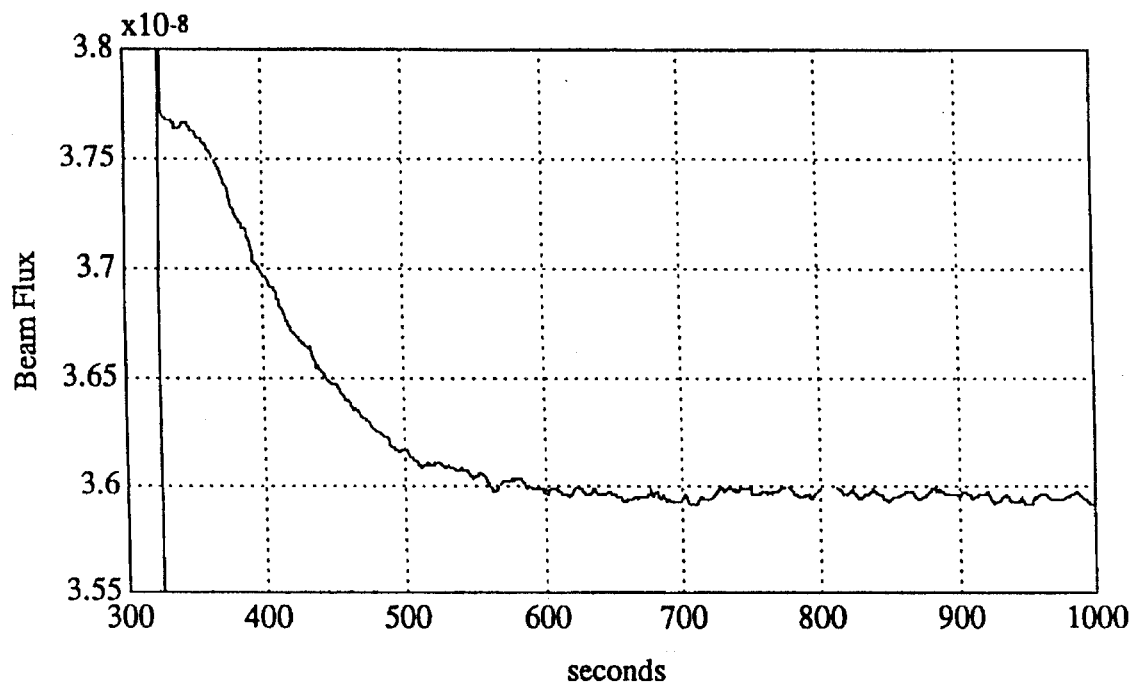
Figure 9a: Flux at shutter opening without Shutter Opening Transient Compensation
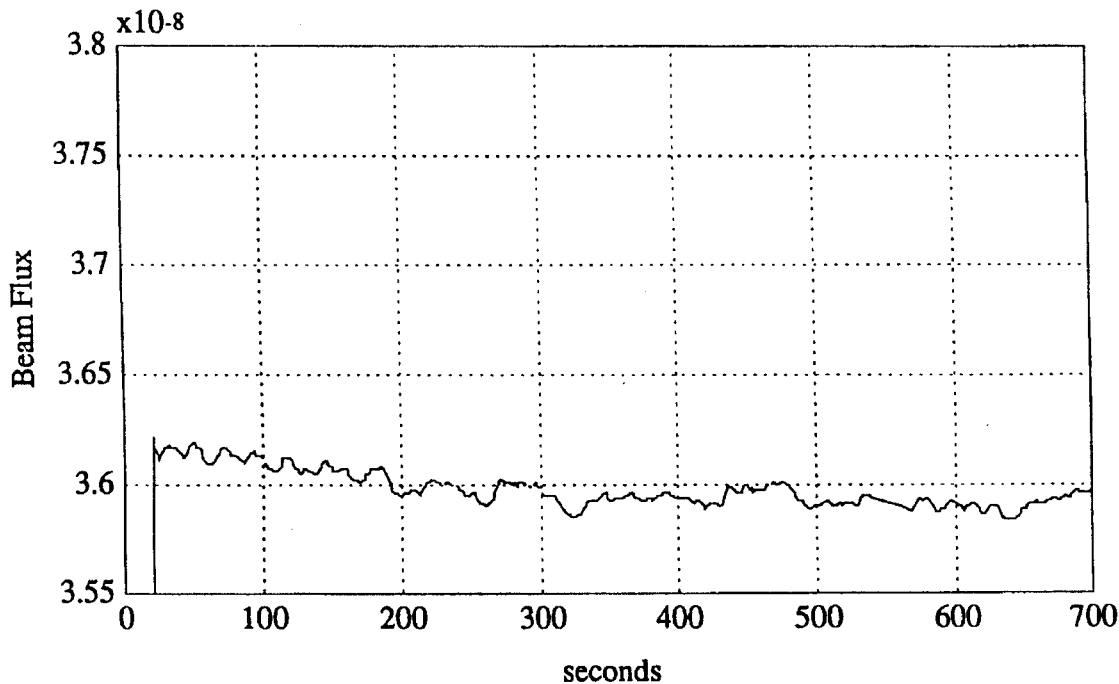
Figure 9b: Flux at shutter opening with Shutter Opening Transient Compensation

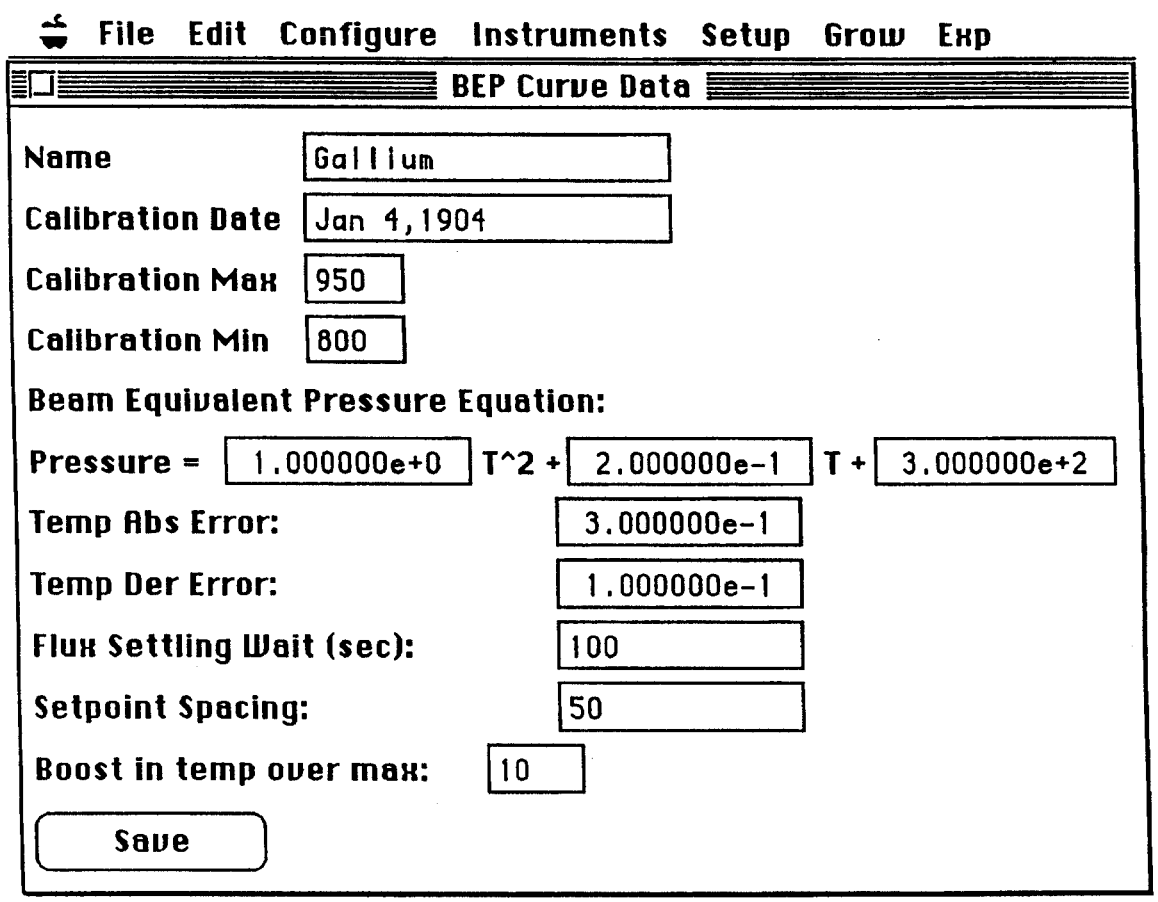
Figure 10: Configuration Window for BEP Curve Measurement

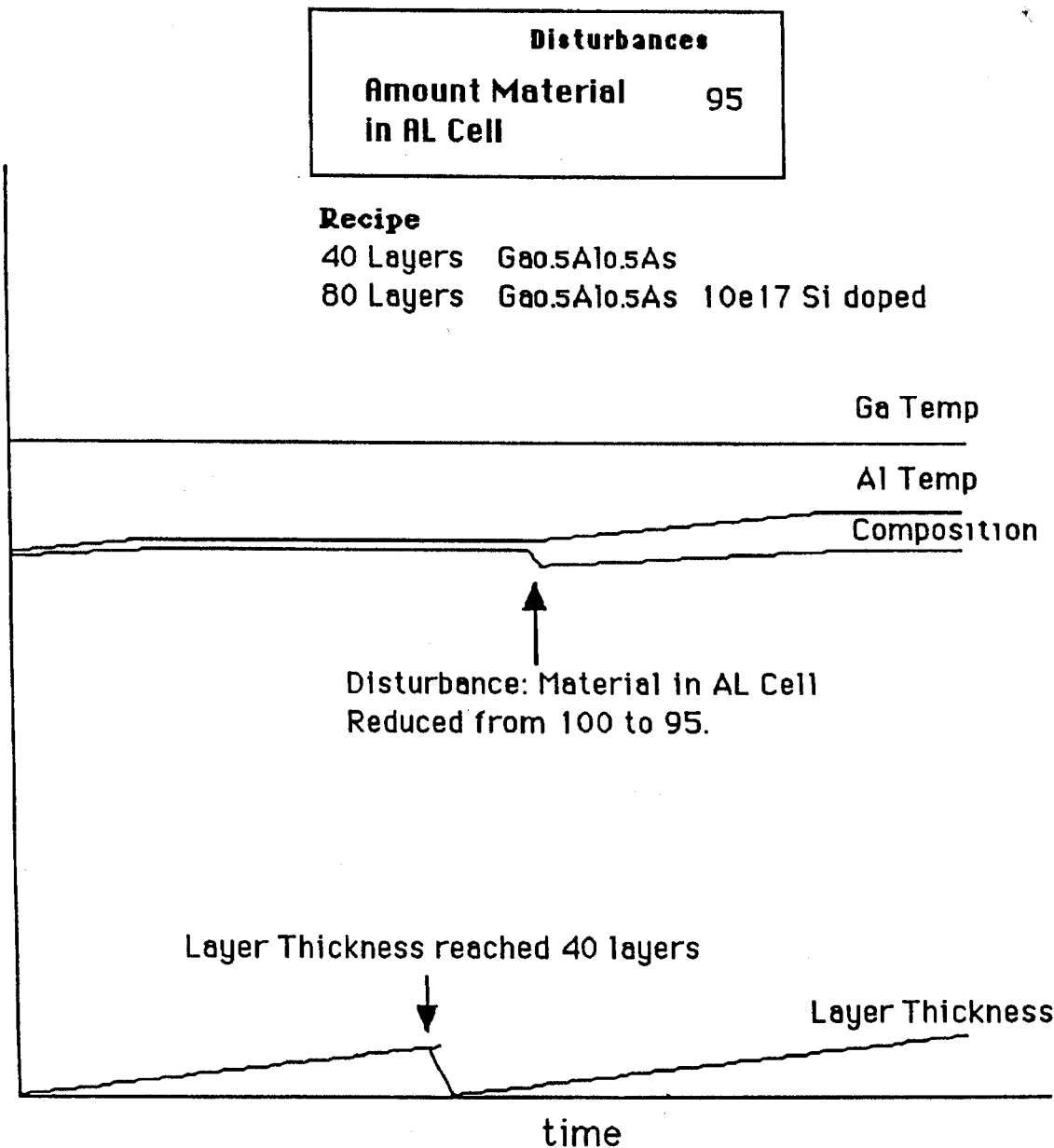
Figure 11: The Expert System Inference Engine Module Running an MBE Simulator

```
void Think()
{
    // Closed loop temperature control
    if(stoich > target.stoich + 0.005)      // Want target < stoich < target+0.01
        TempSP[GA]--;
    else if(stoich < target.stoich)
        TempSP[GA]++;

// Closed loop thickness control
    if(thickness >= target.thickness[layer]) {
        thickness = 0;                       // Reset thickness counter
        layer++;                             // Go to next layer in recipe
    }
    if(layer > target.layers)
        Stop_Growth();

// Health Monitor for(i=0;i<NUMCELLS;i++) {
        if( (TempSP[i] > MaxTemp[i]) || (SetPoint[i] < MinTemp[i]) )
            OK_Alert_Box("\pHealthMoniter triggered termination",
                "\pBad temperature setpoint");

if( (Temp[i] > MaxTemp[i]+20) || (Temp[i] < MinTemp[i]-10) )
            OK_Alert_Box("\pHealthMoniter triggered termination",
                "\pFailed thermocouple suspected");
    } if(ligNit < EMPTY)
        OK_Alert_Box("\pHealthMoniter triggered termination",
            "\pLow on Liquid Nitrogen");

}
```

Figure 12: Expert System Rule Base

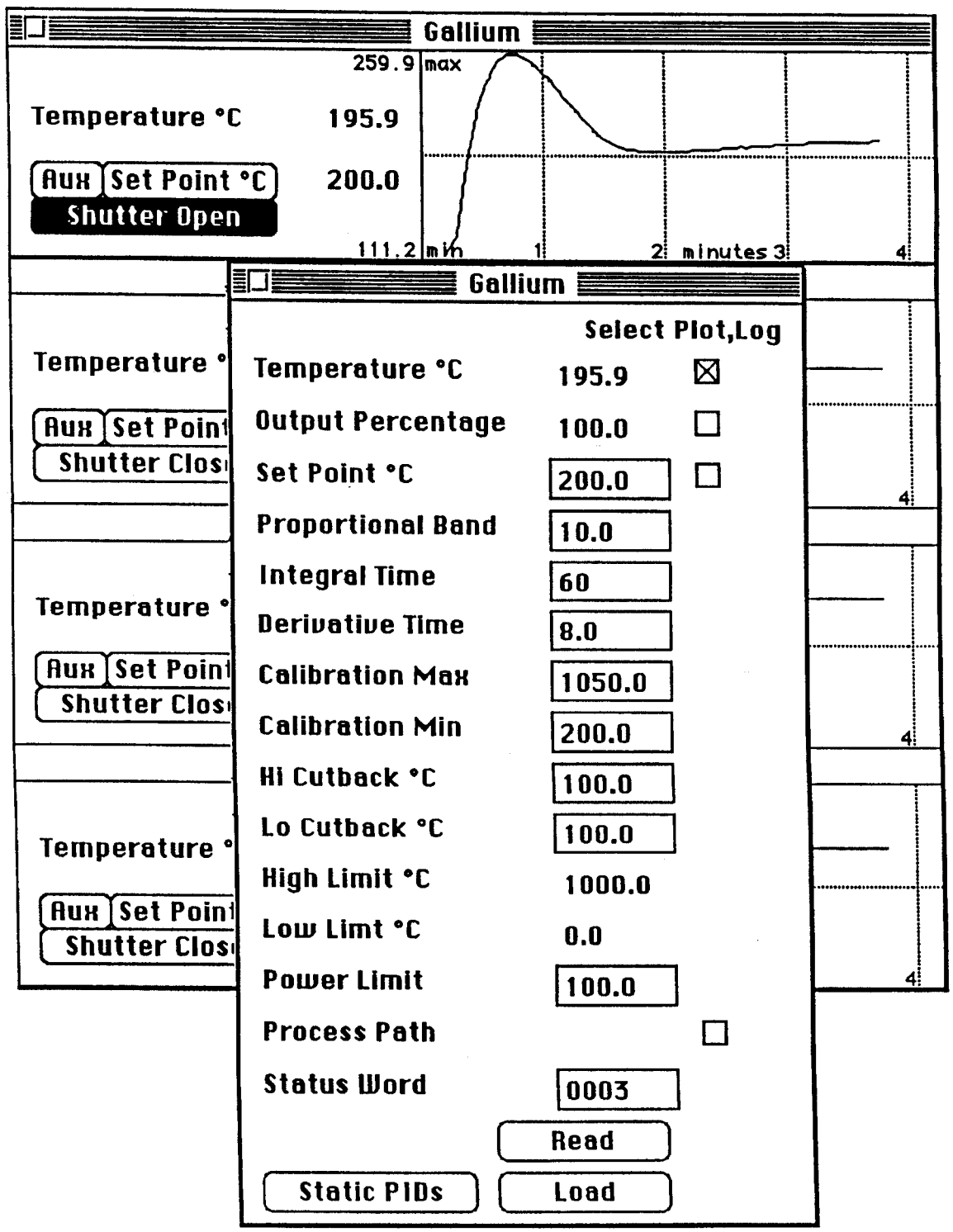
Fig 13: Main Plot Windows and Gallium Window

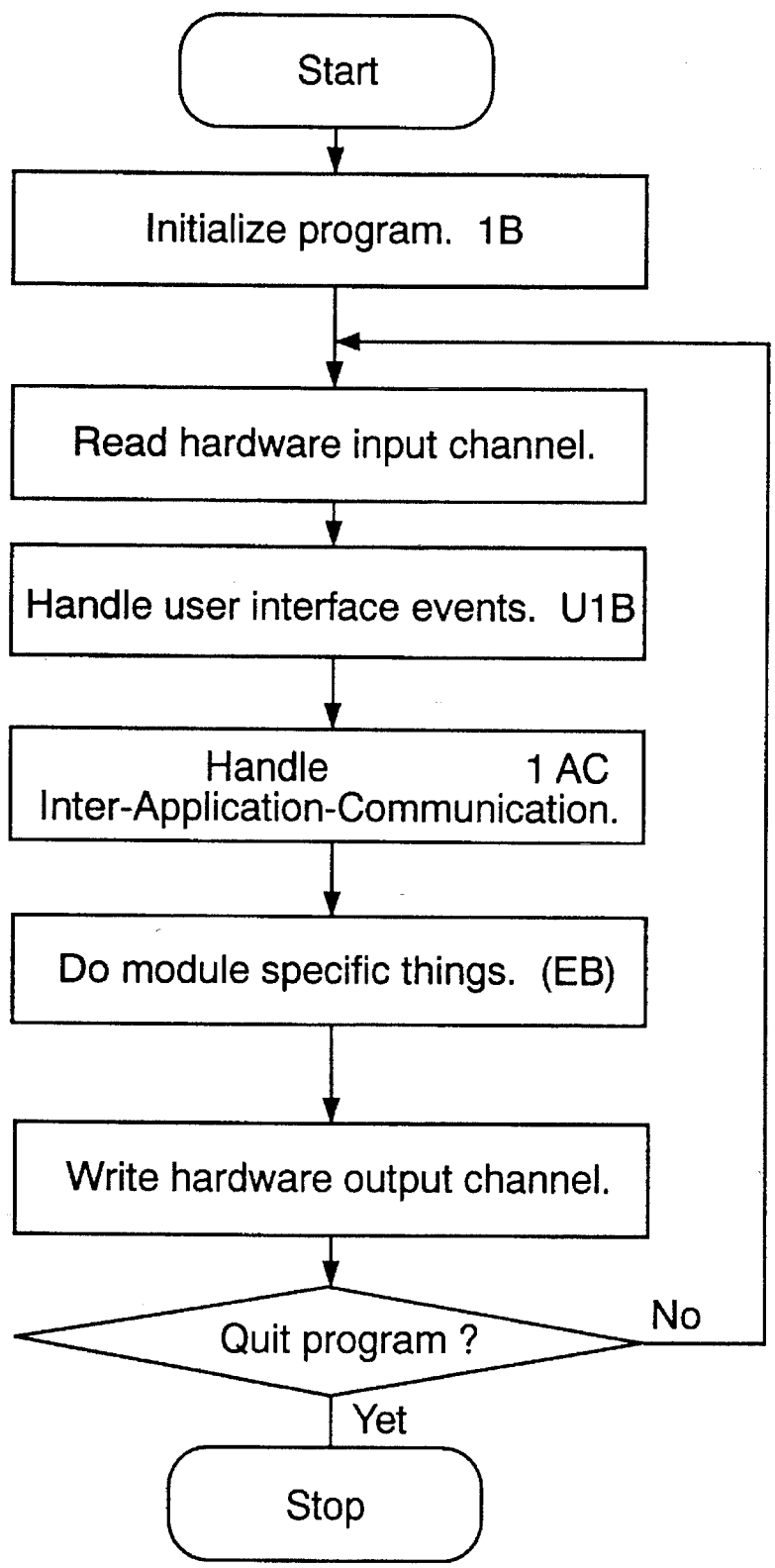
Figure 14: Event Sequence of Generic Module

BEP Data and Curvefit

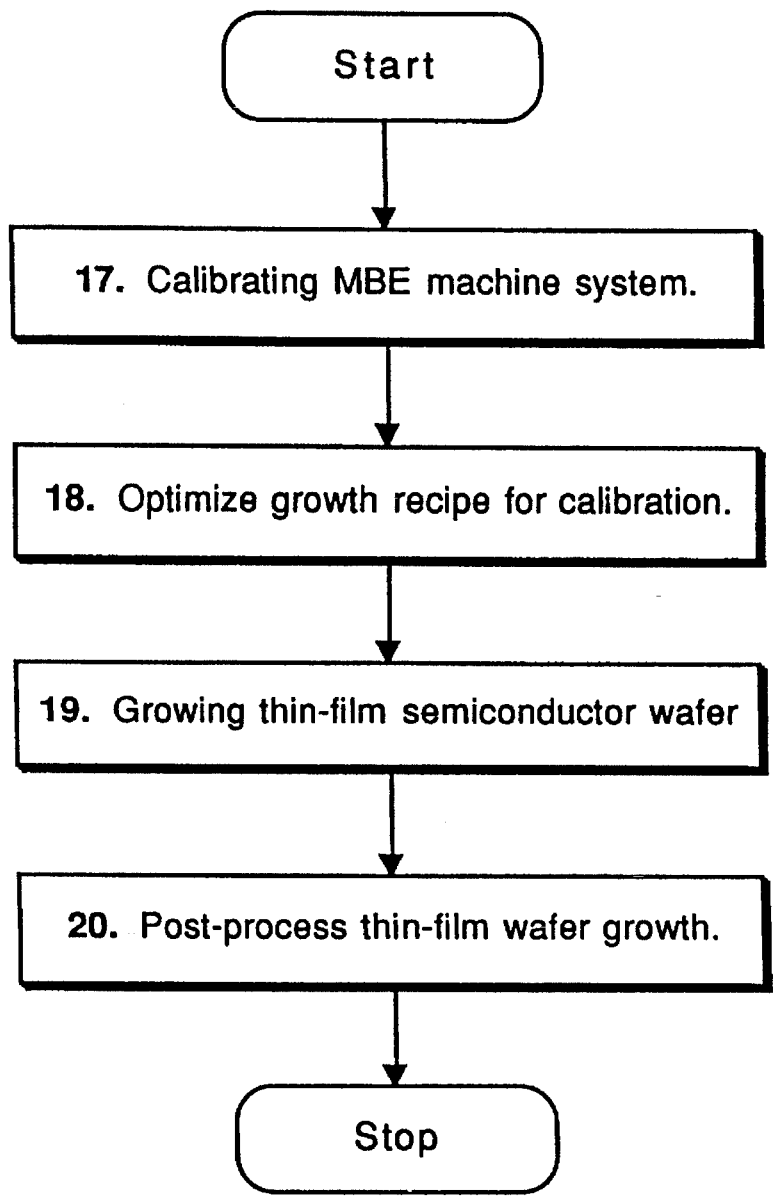
FIGURE 16. Hierarchical Control Methods for MBE.

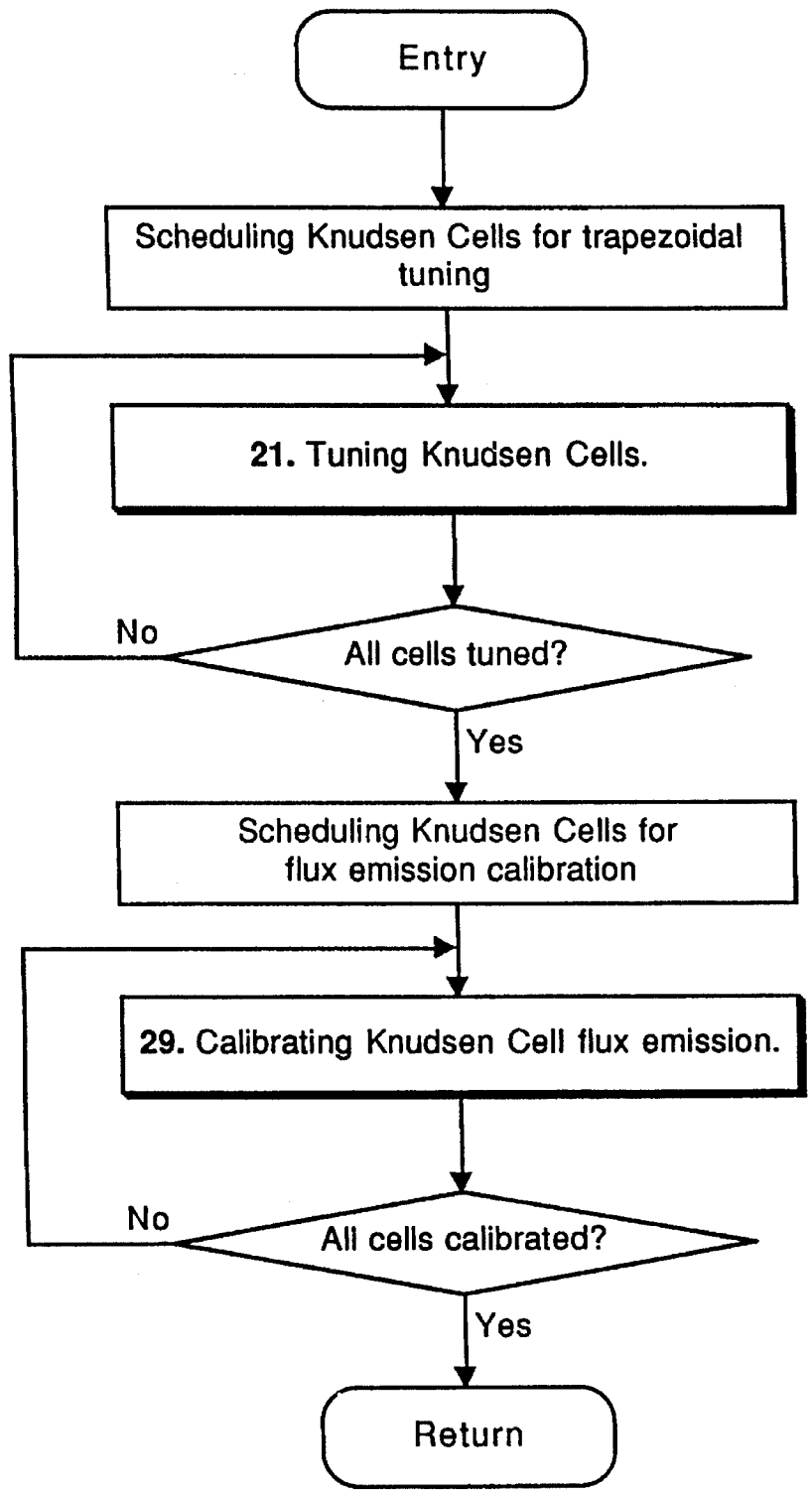
FIGURE 17. Calibrating MBE machine system.

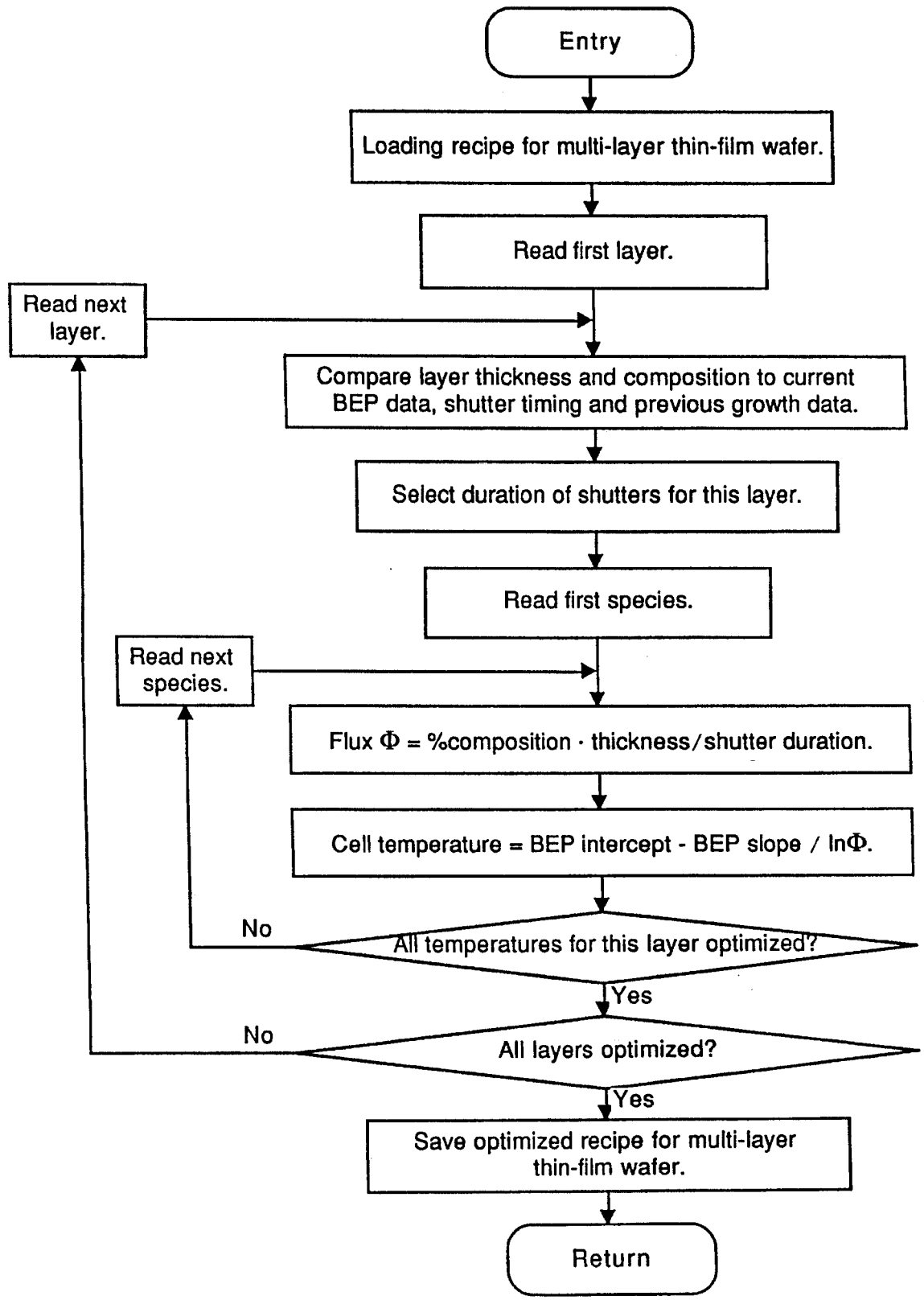
FIGURE 18. Optimize growth recipe for calibration.

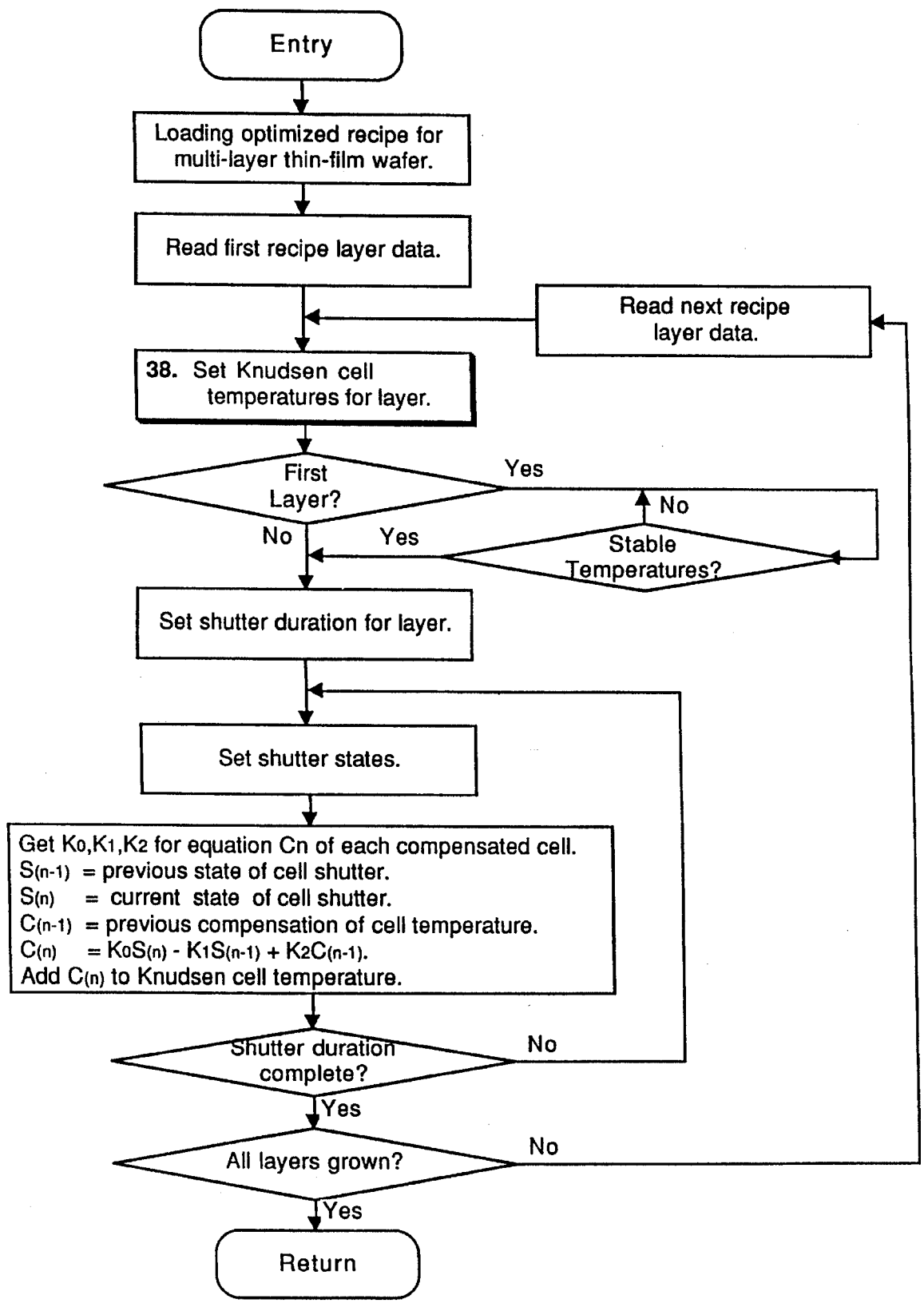
FIGURE 19. Growing thin-film semiconductor wafer.

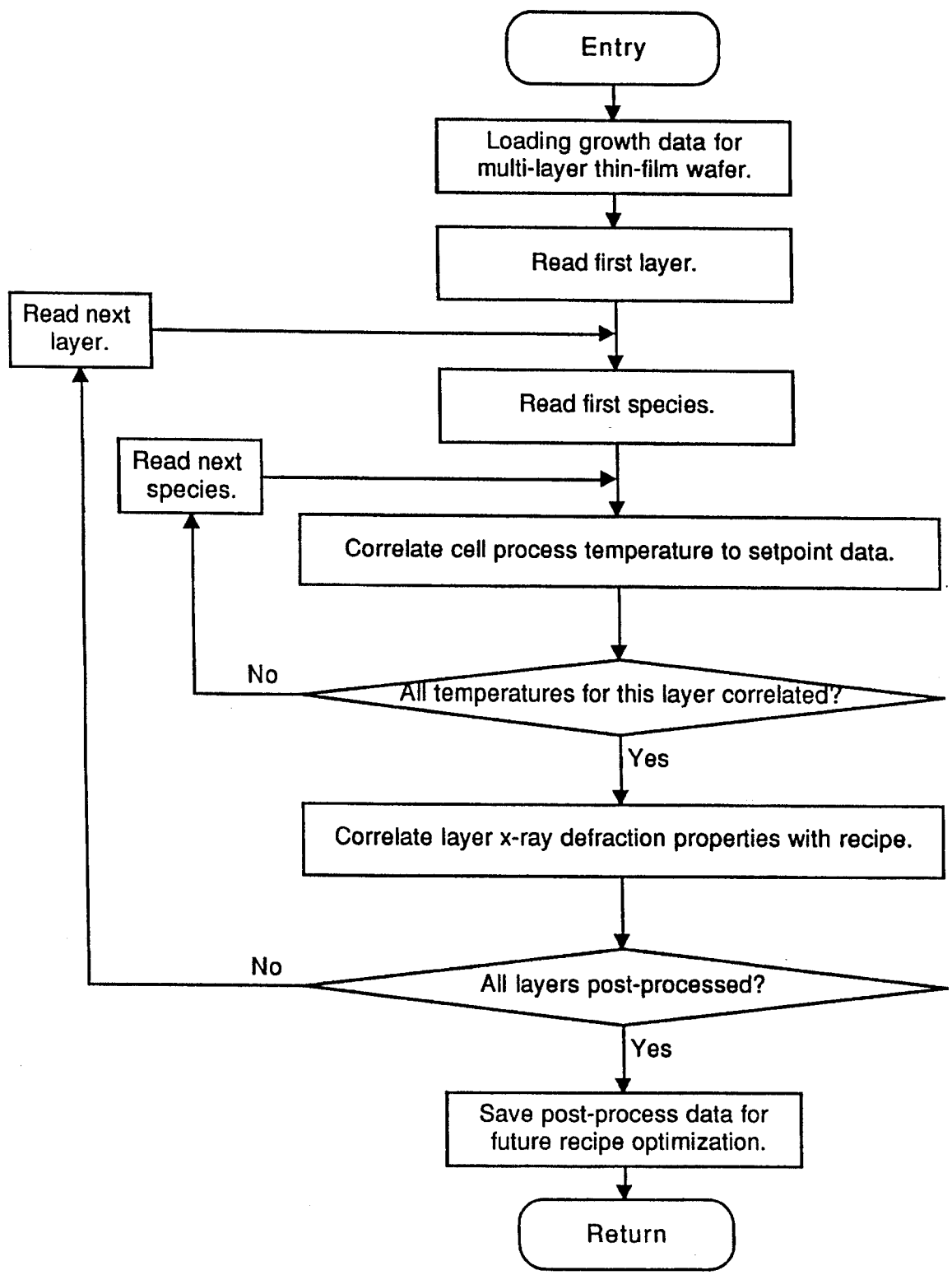
FIGURE 20. Post-process thin-film wafer growth.

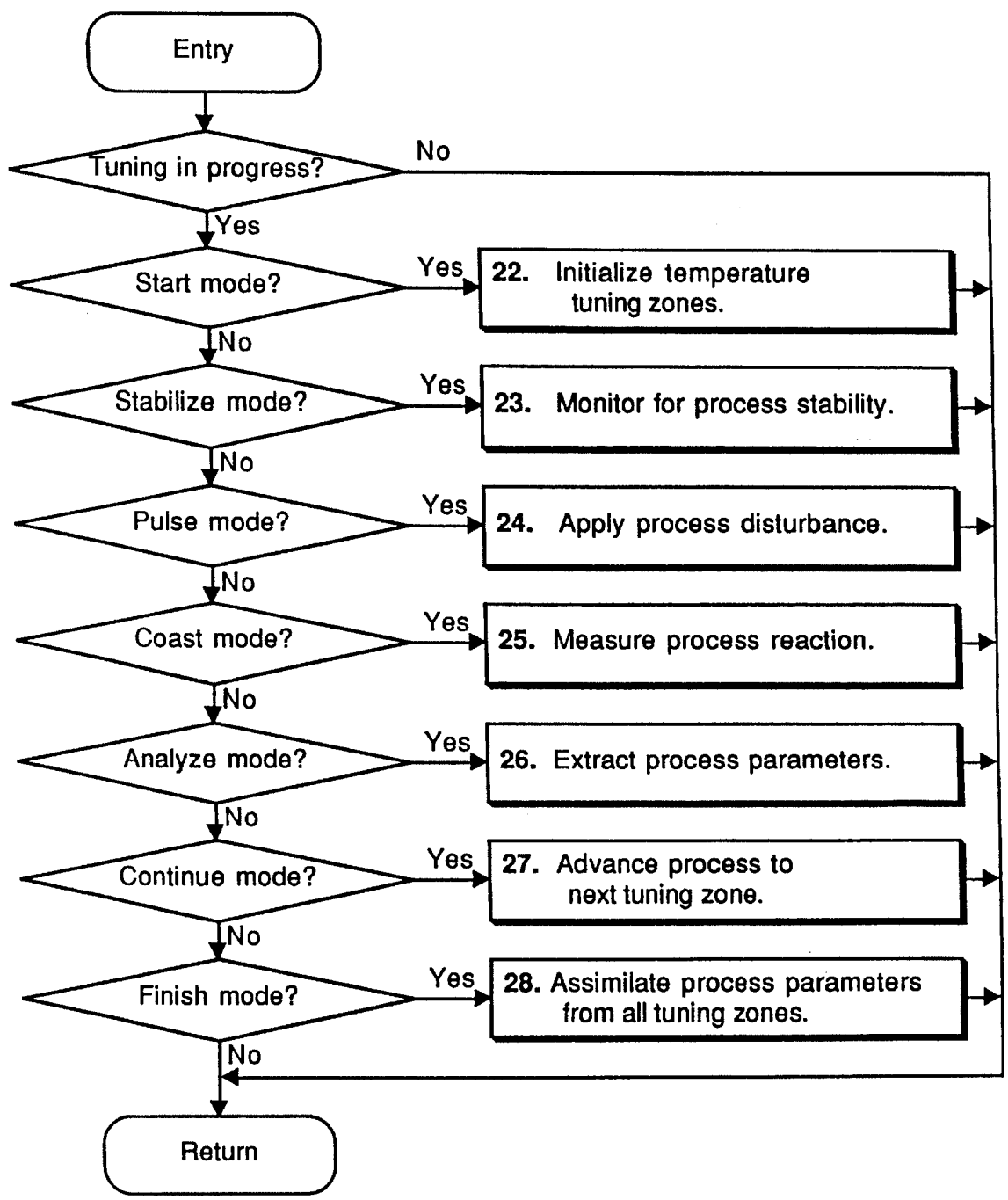
FIGURE 21. Tuning Knudsen Cells.

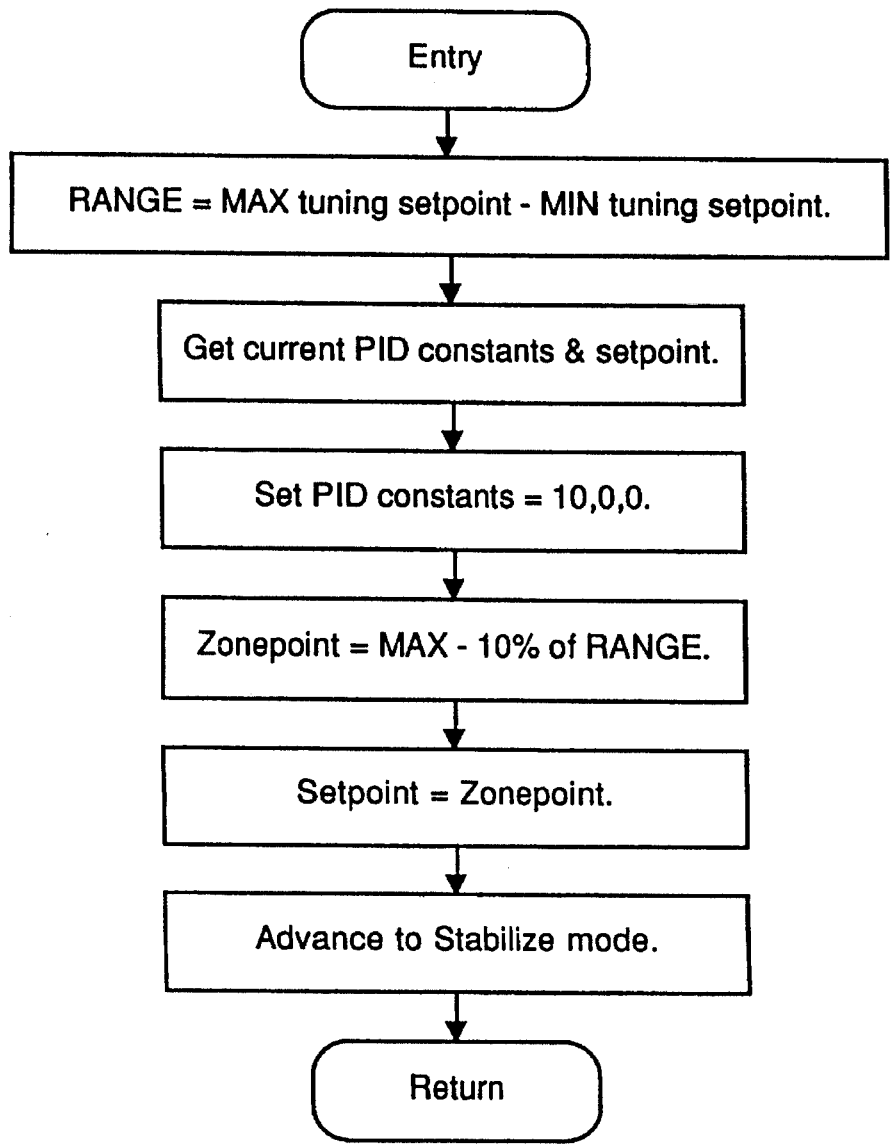
FIGURE 22. Initialize temperature tuning zones.

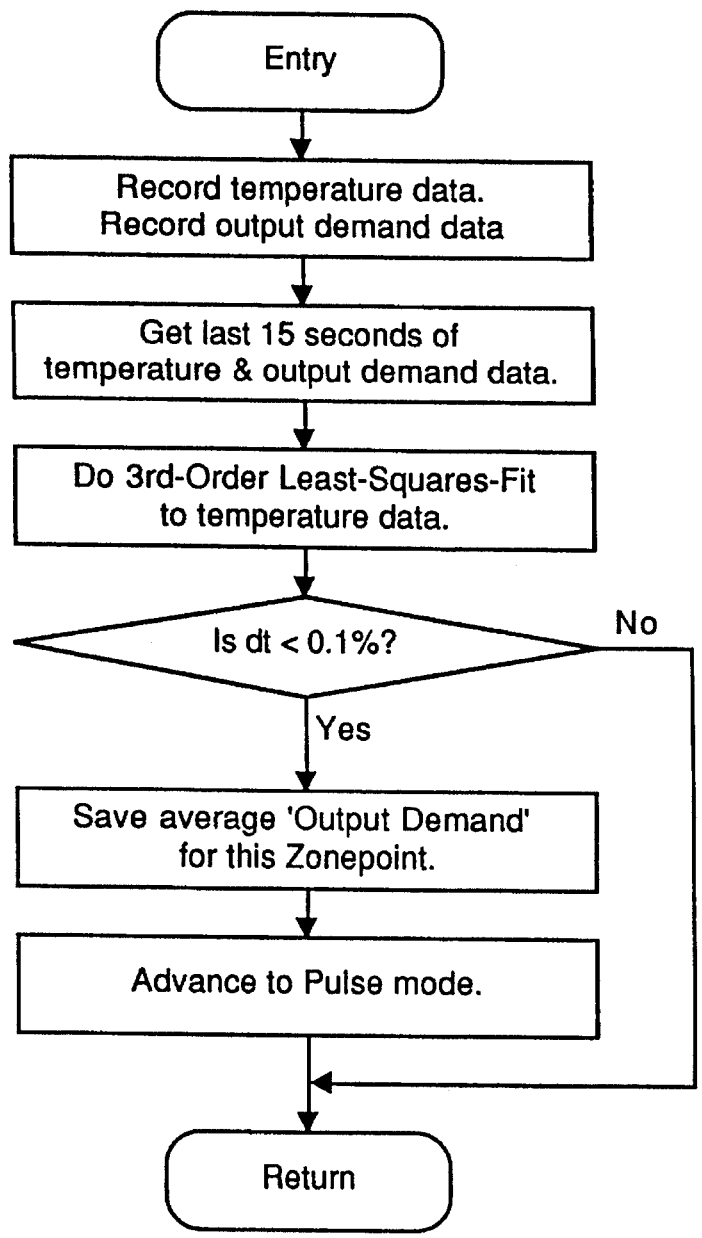
FIGURE 23. Monitor for process stability.

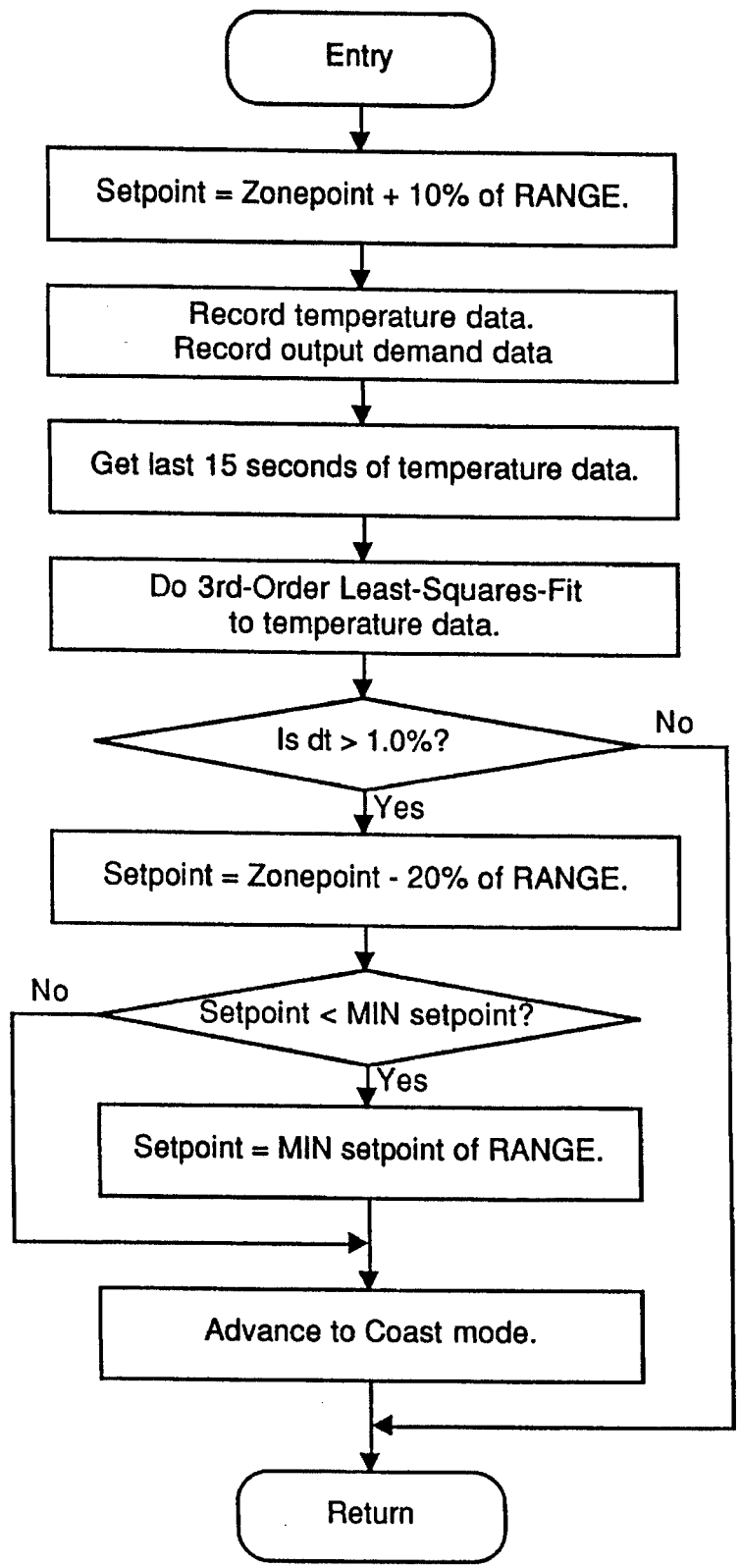
FIGURE 24. Apply process disturbance.

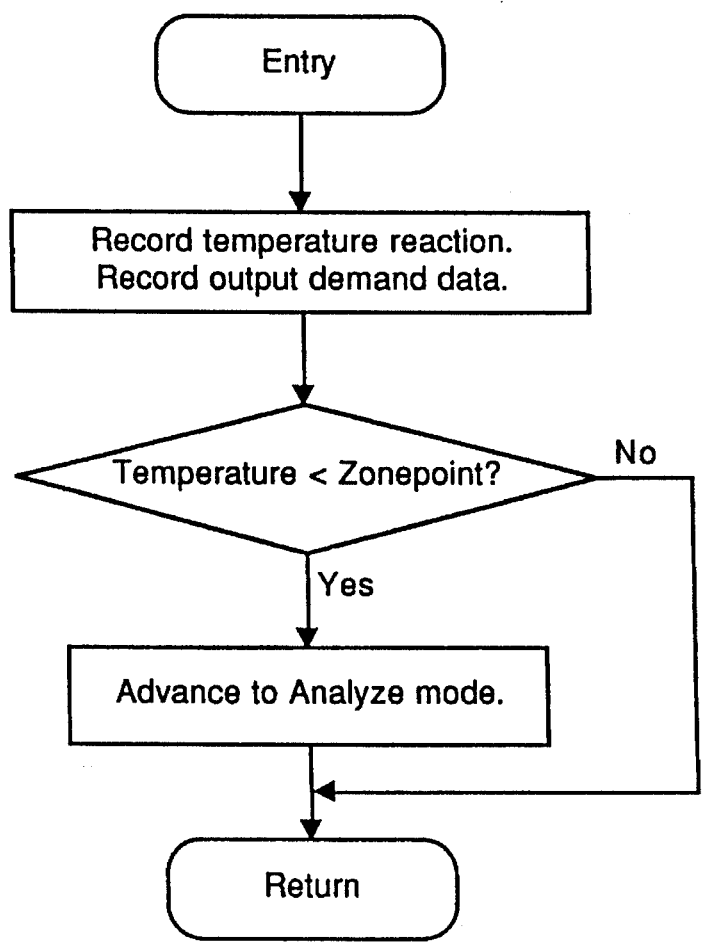
FIGURE 25. Measure process reaction.

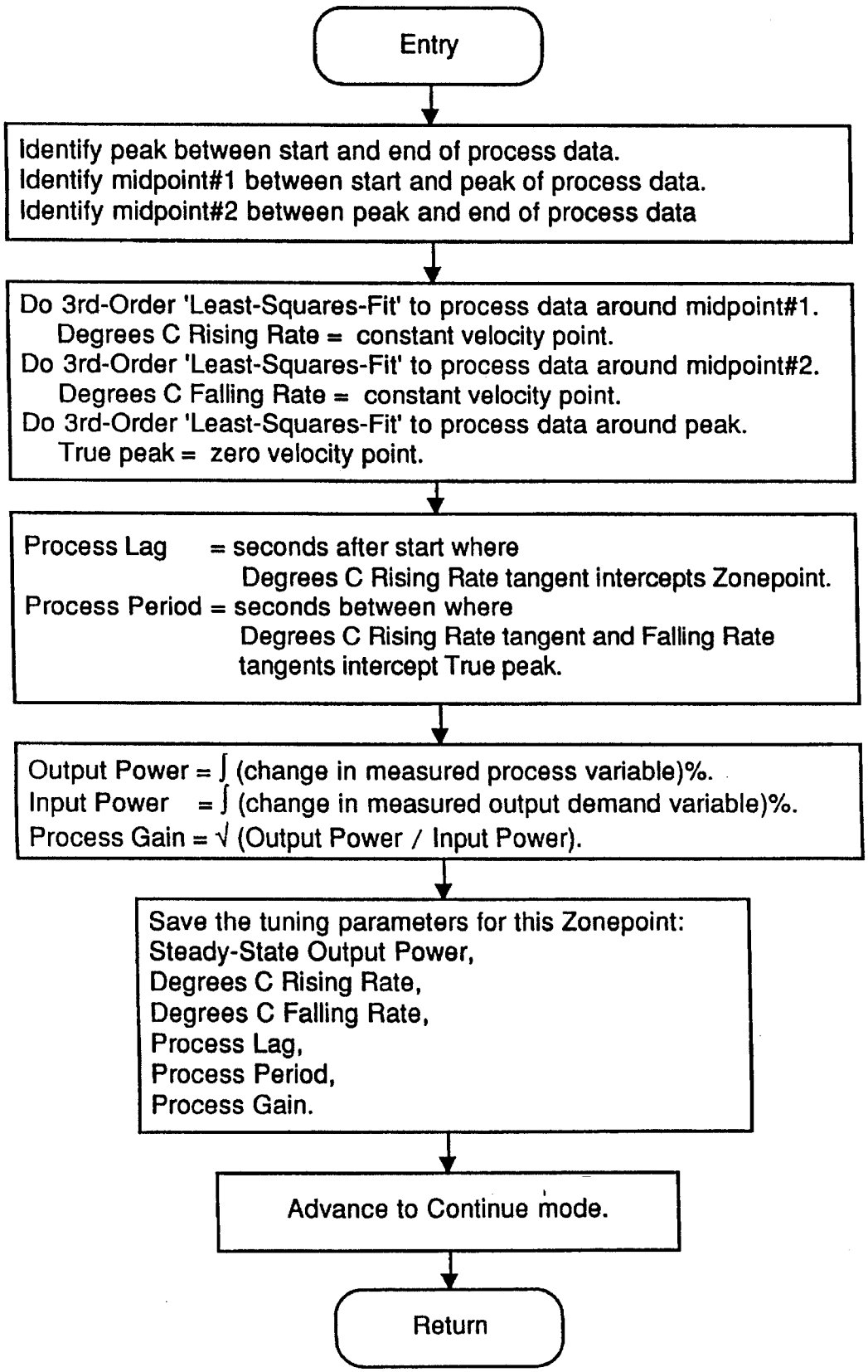
FIGURE 26. Extract process parameters.

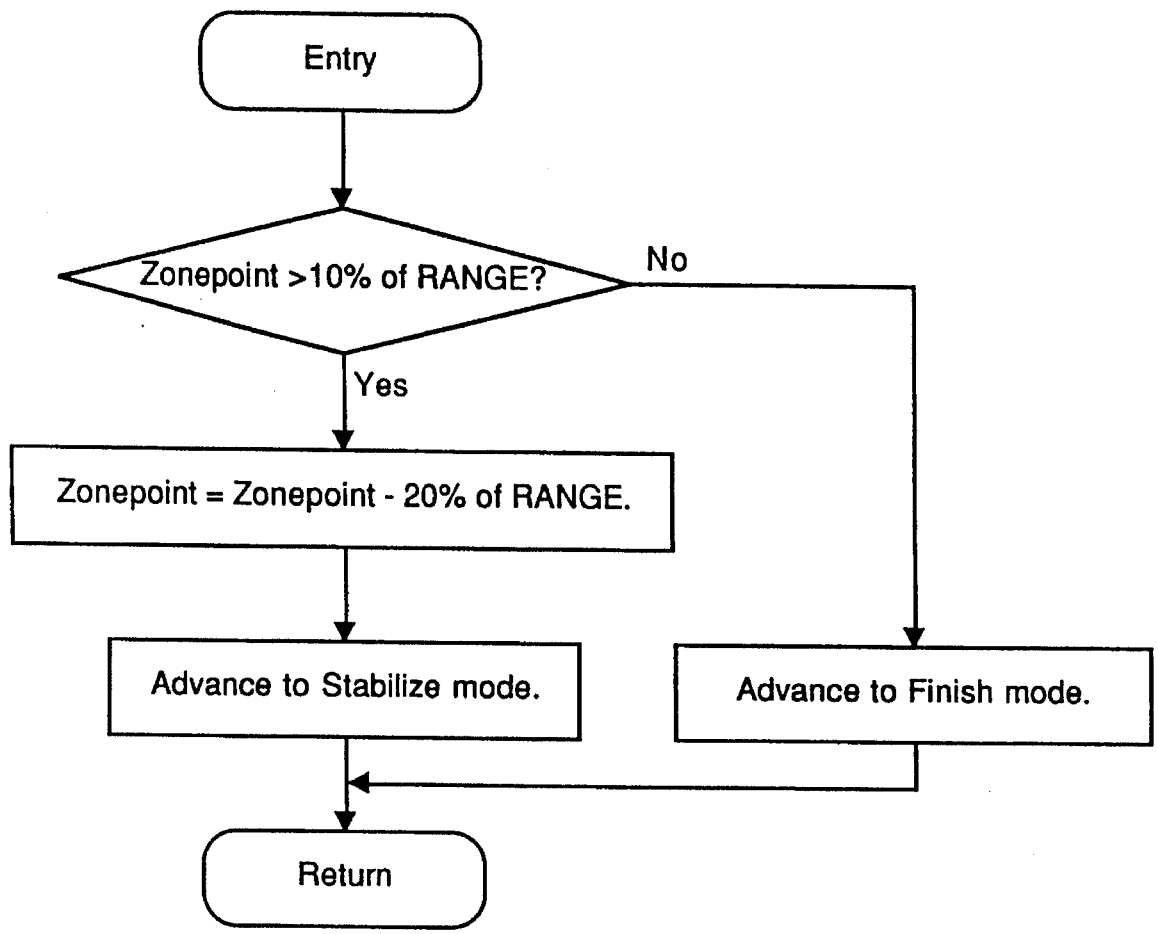
FIGURE 27. Advance process to next tuning zone.

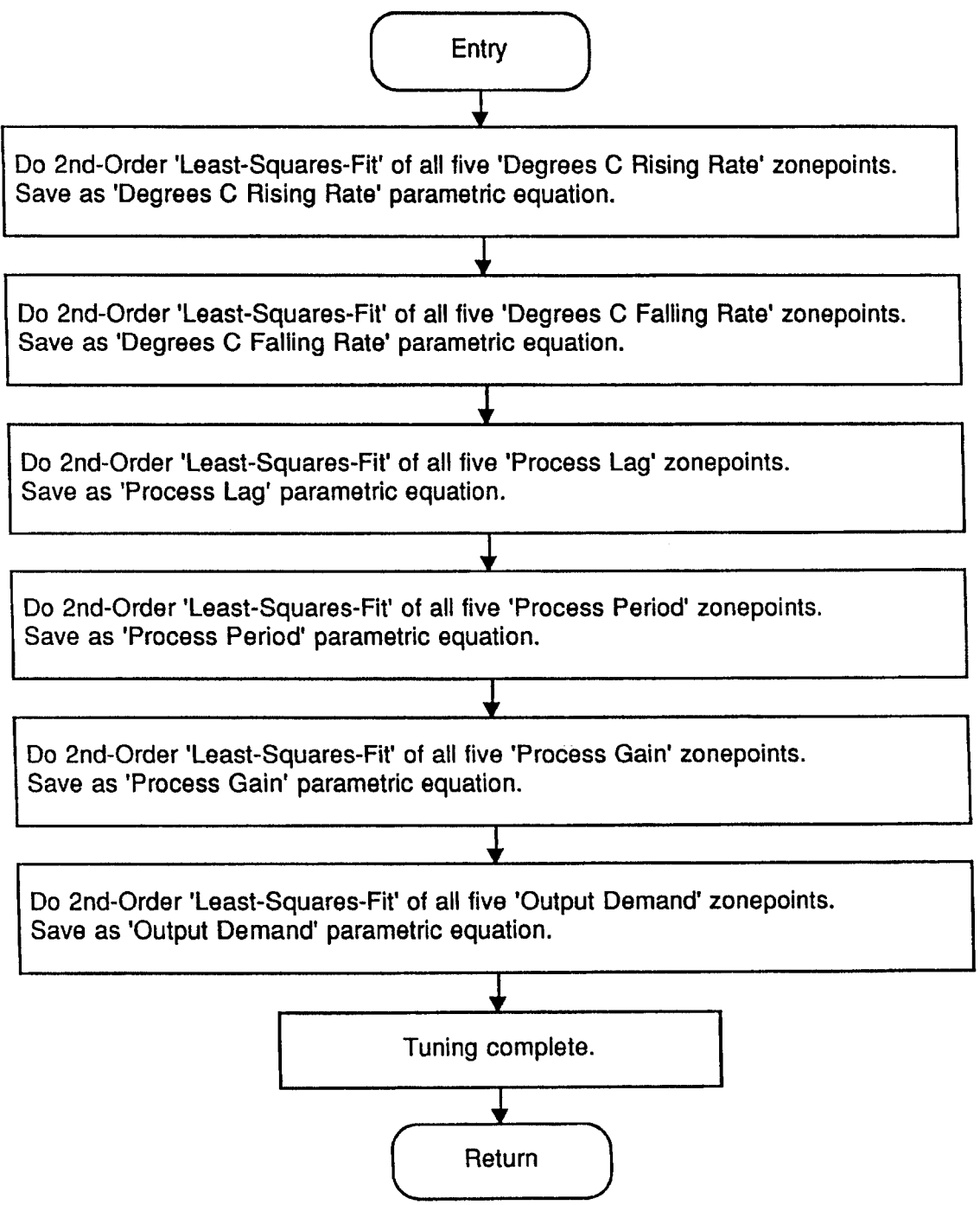
FIGURE 28. Assimilate process parameters from all tuning zones.

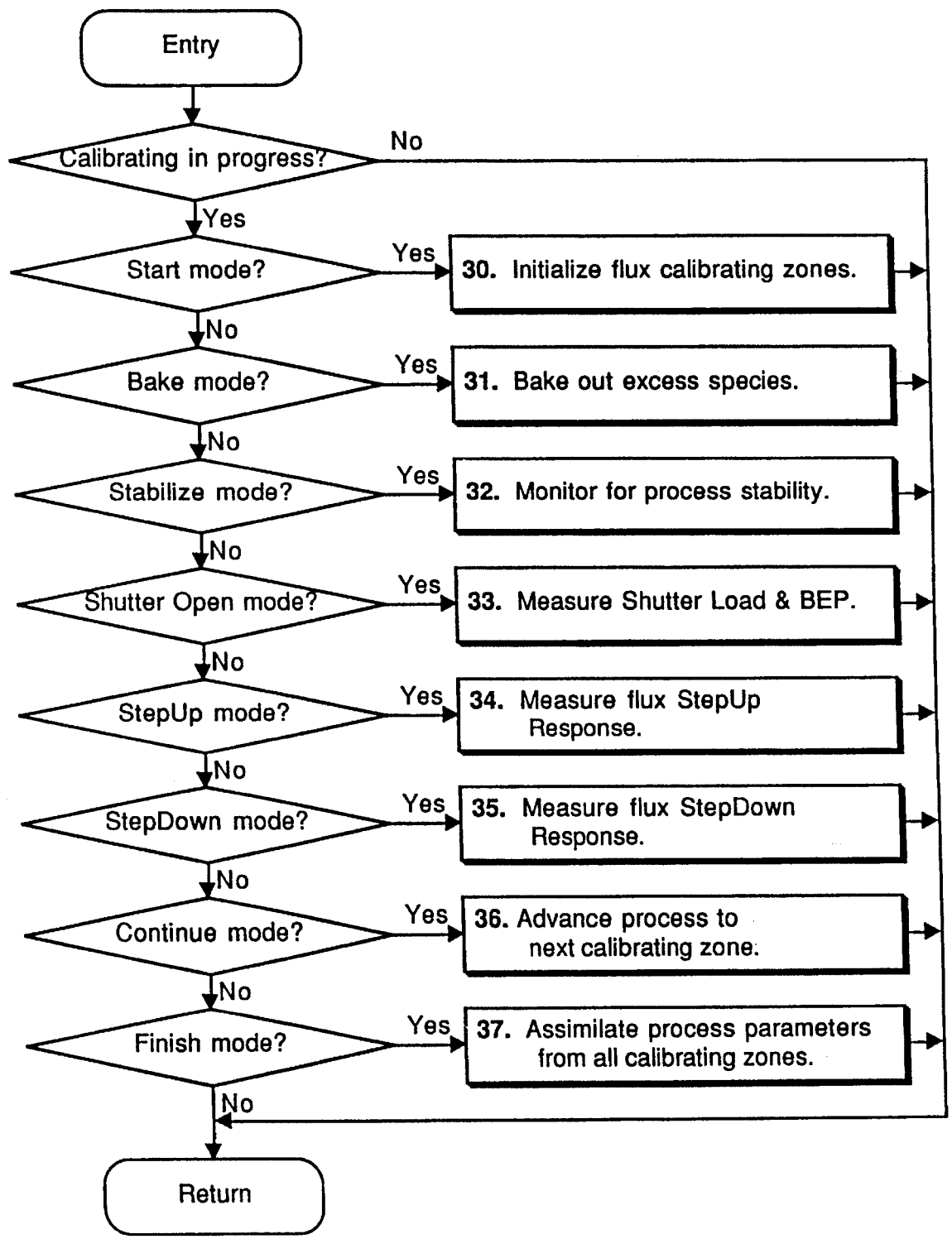
FIGURE 29. Calibrating Knudsen Cell flux emission.

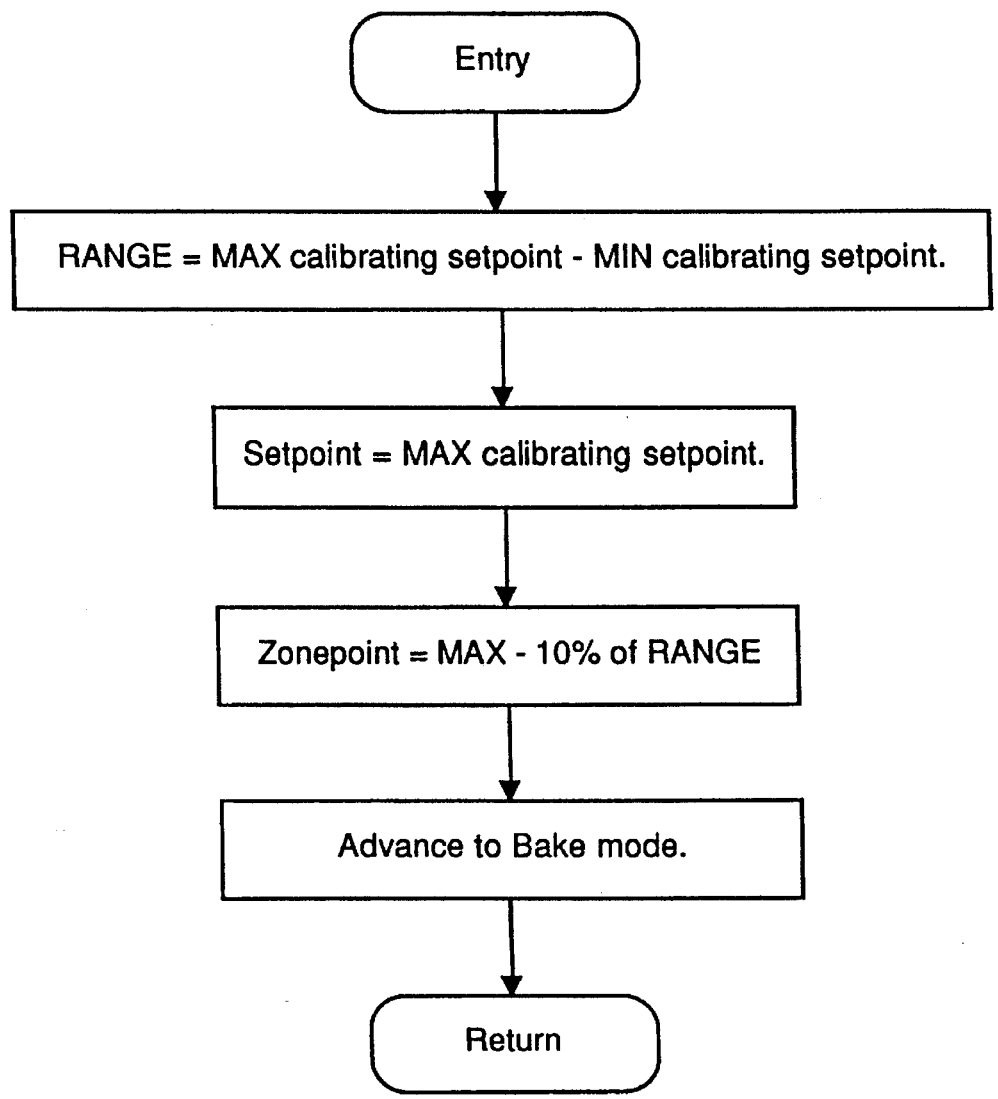
FIGURE 30. Initialize flux calibrating zones.

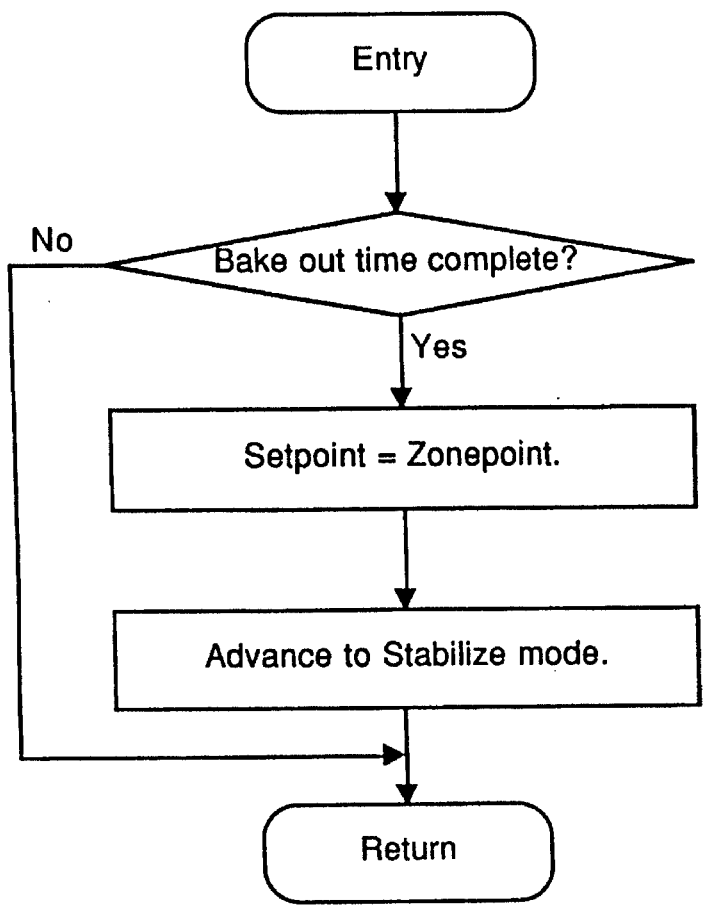
FIGURE 31. Bake out excess species.

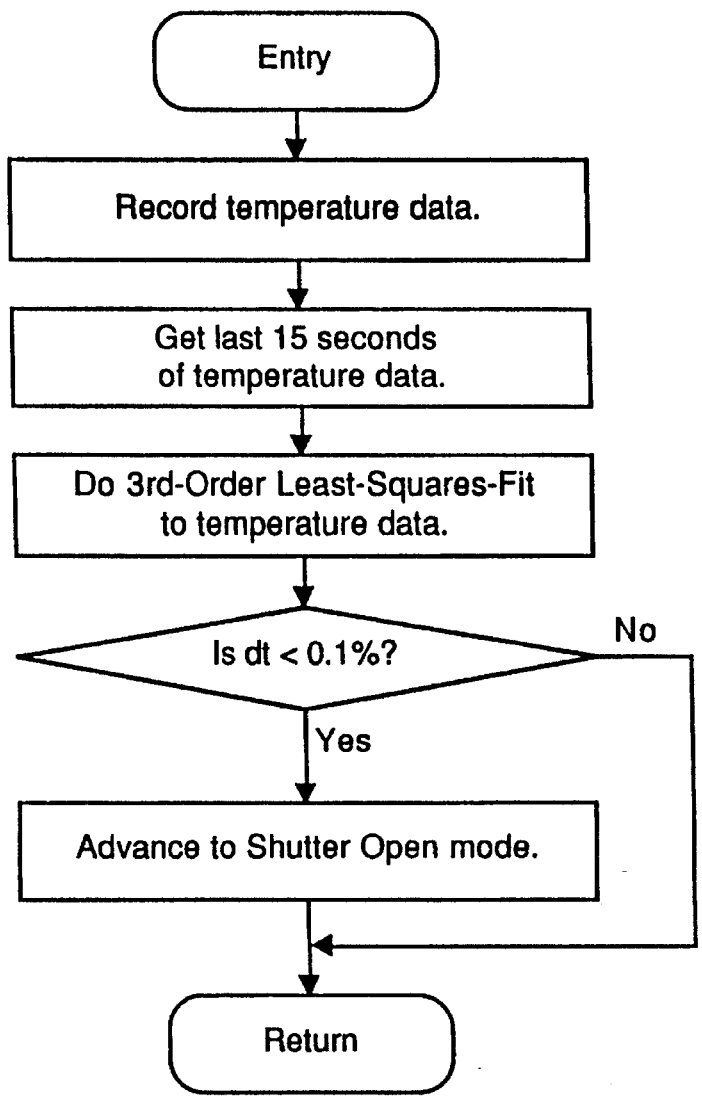
FIGURE 32. Monitor for process stability.

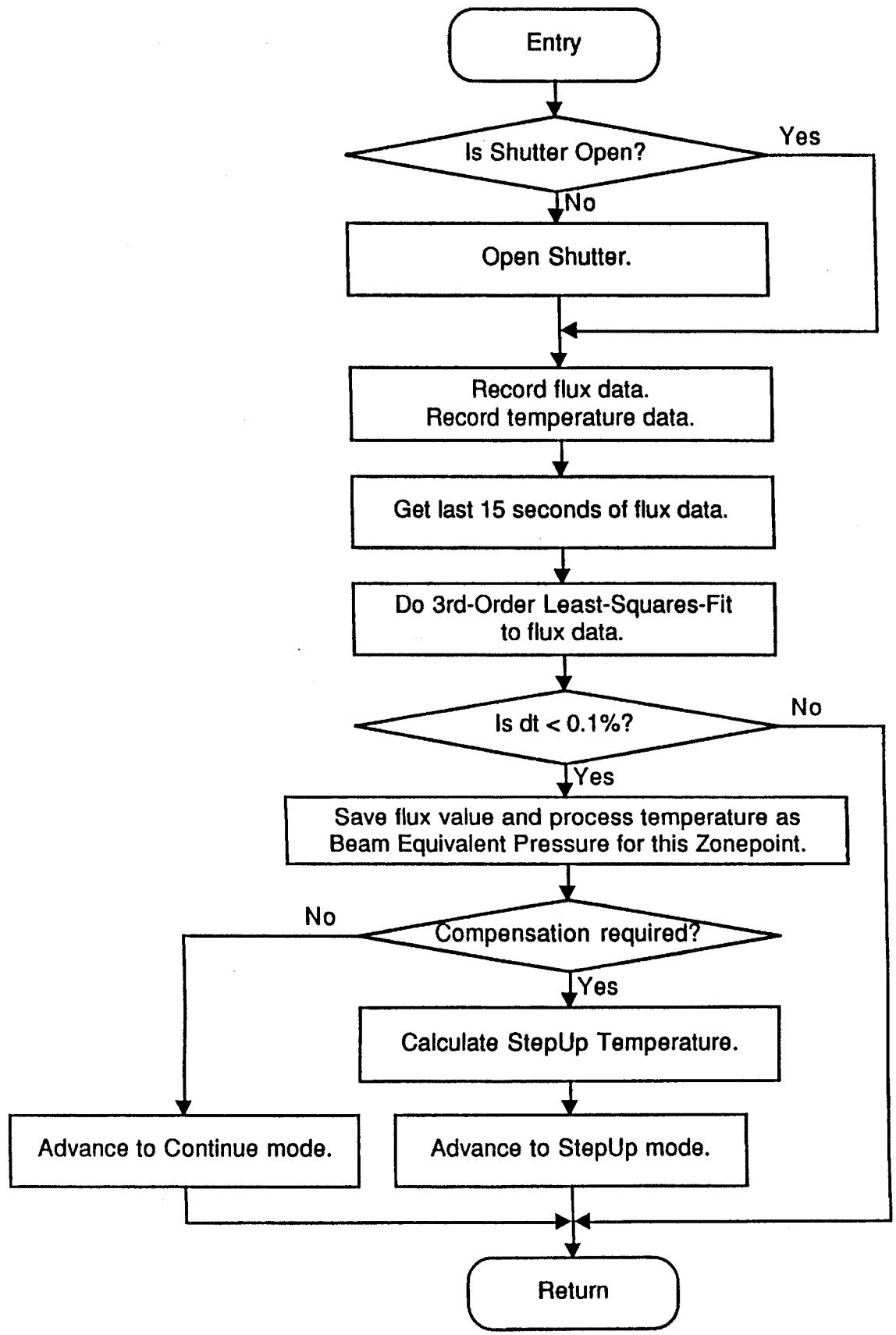
FIGURE 33. Measure Shutter Load & Beam Equivalent Pressure.

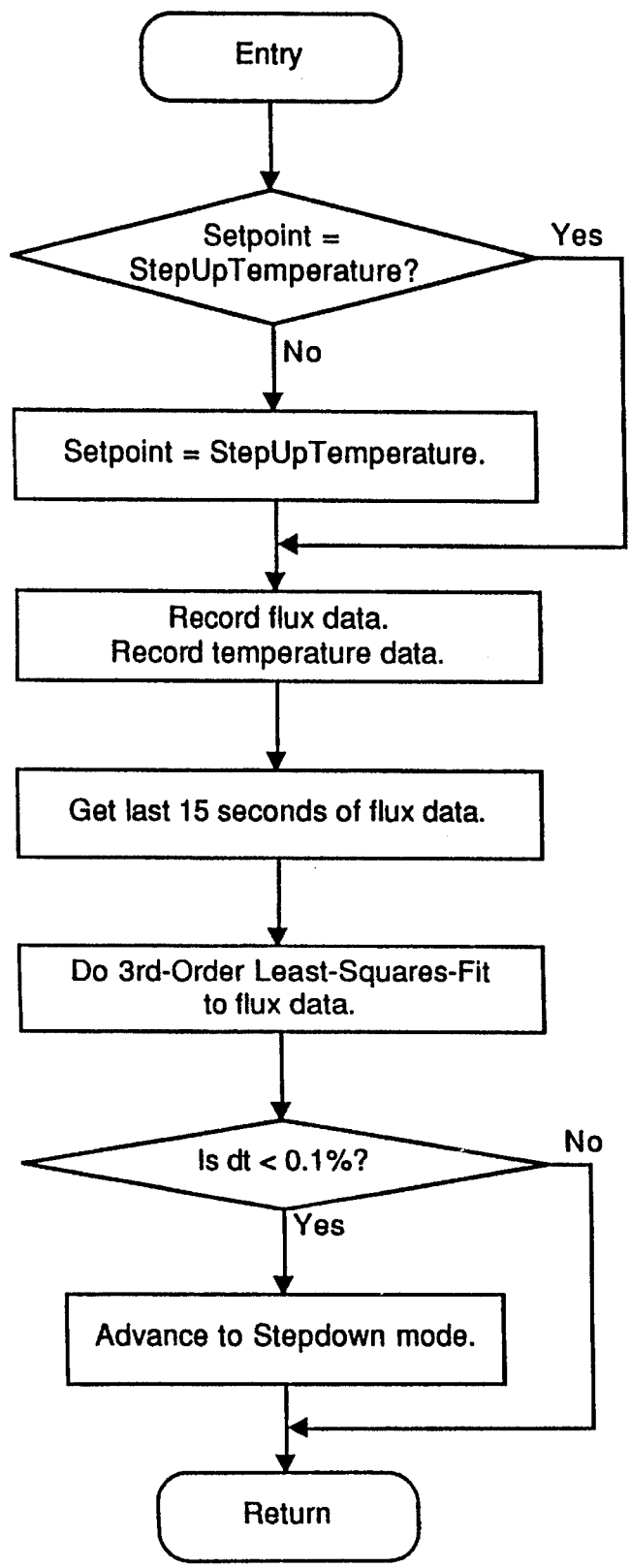
FIGURE 34. Measure flux StepUp Response.

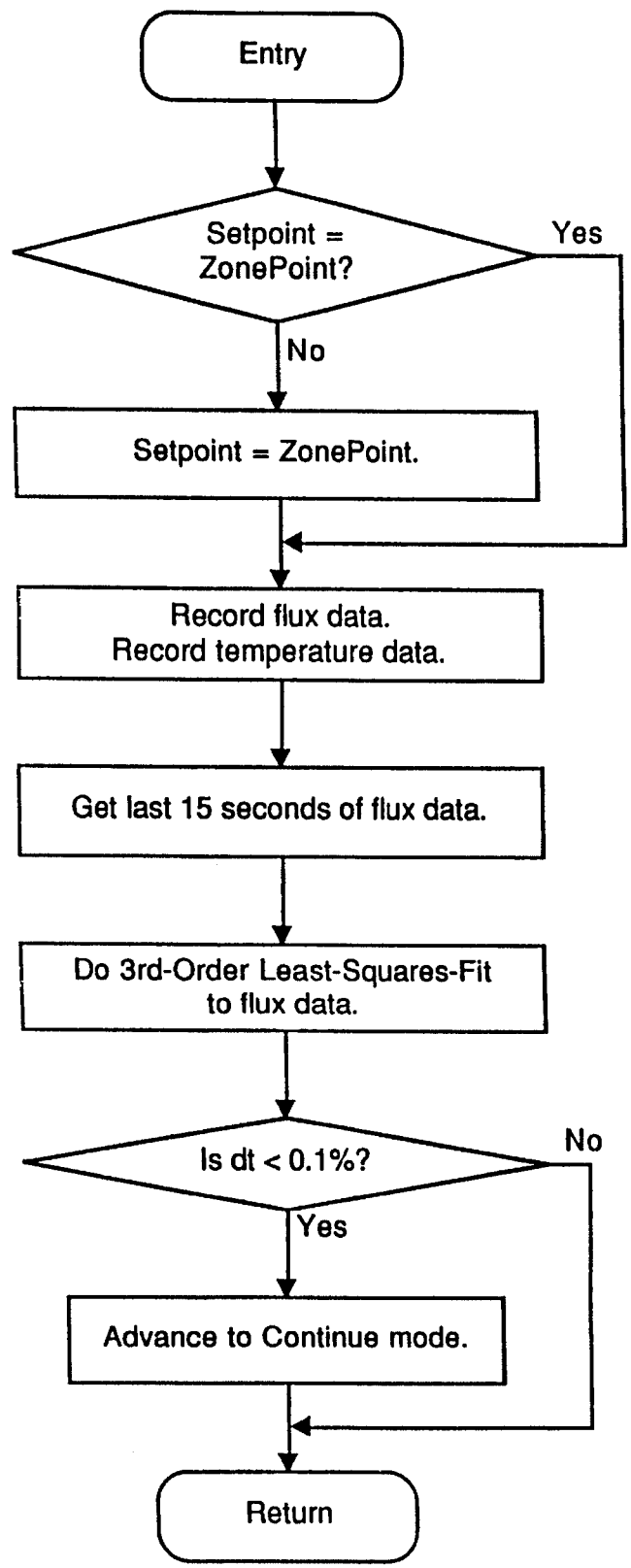
FIGURE 35. Measure flux StepDown Response.

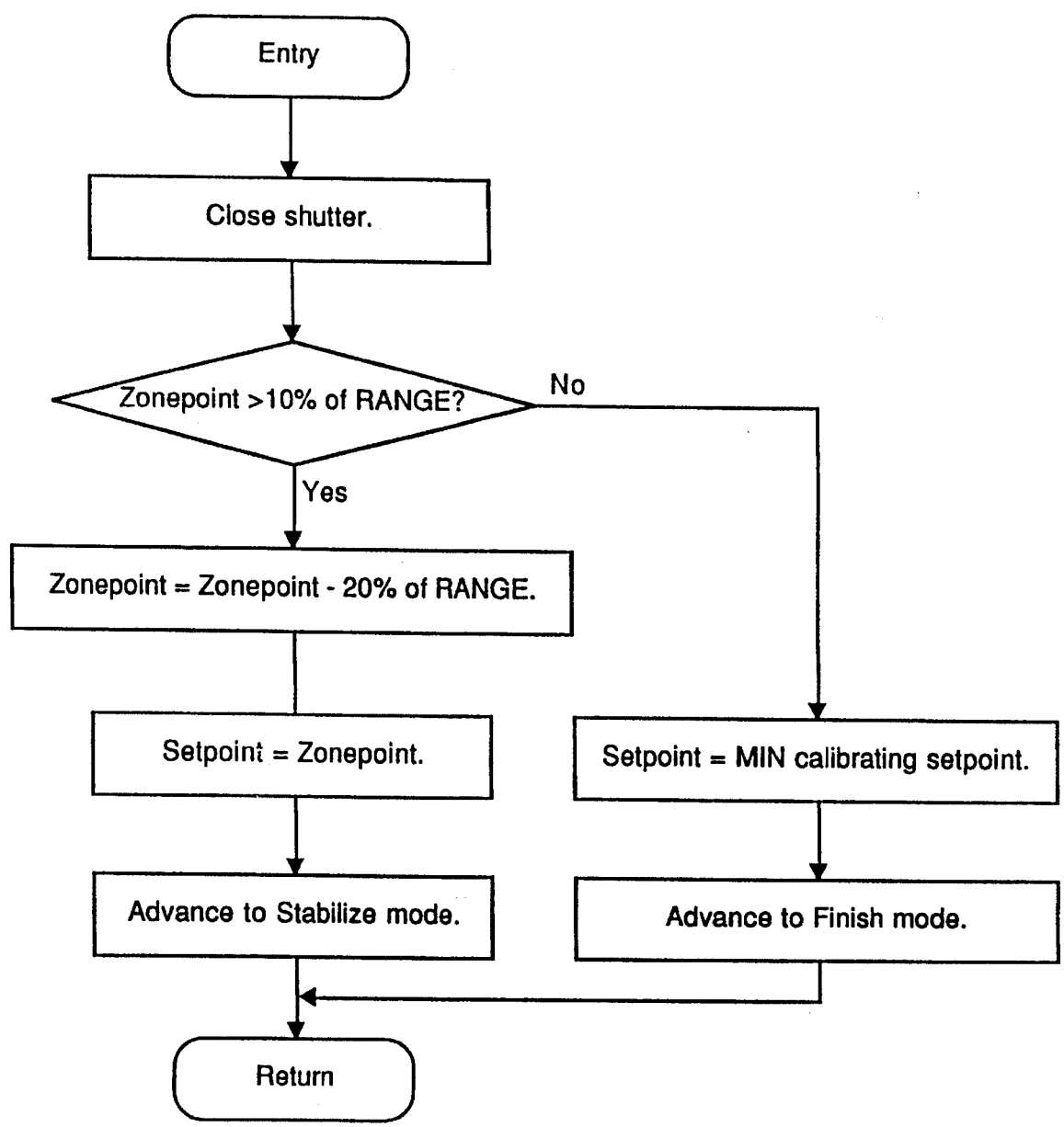
FIGURE 36. Advance process to next calibrating zone.

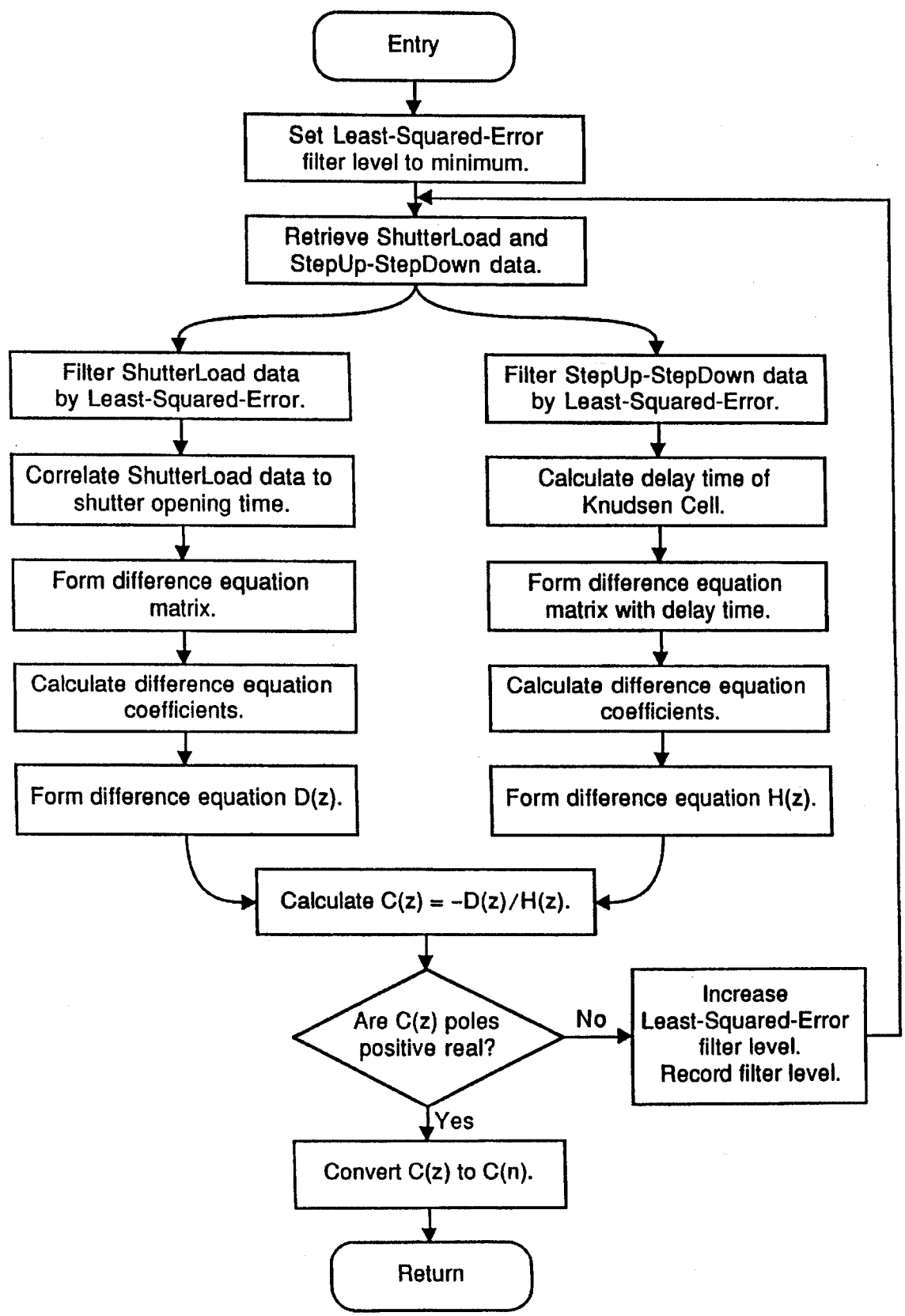
FIGURE 37. Assimilate process parameters from all calibrating zones.

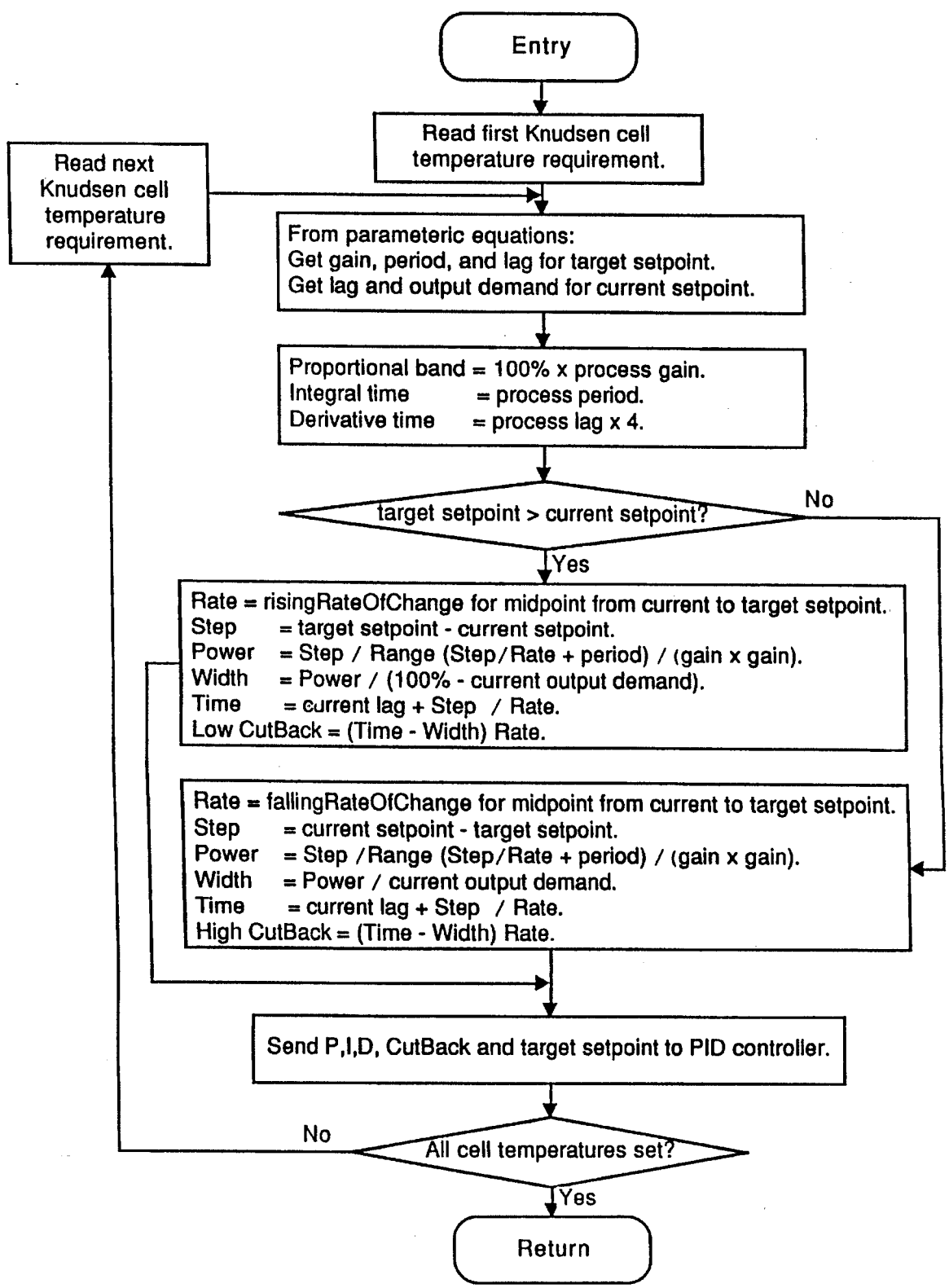
FIGURE 38. Set Knudsen Cell temperatures for layer.

Fig. 39a
$$C(z) = \frac{-F_d(z)}{H(z)}$$

$$C(z) = -\frac{z}{z-1} \cdot \frac{D(z)}{H(z)}$$

Fig. 39b
$$C(z) = K_0 \frac{z}{z-1} + K_1 \frac{z}{z-p_1} + K_2 \frac{z}{z-p_2} + K_3 \frac{z}{z-p_3}$$

Fig. 39c
$$K_m \frac{z}{z-p_m} = K_m P_m^n$$

Fig. 39d
$$C(n) = K_0 1^n + K_1 P_1^n + K_2 P_2^n + K_3 P_3^n$$

Fig. 39e
$$y(n) = \sum_{i=0}^{N} a_i x(n-d-i) - \sum_{j=0}^{M} b_j y(n-1-j)$$

Fig. 39f
$$\Theta = (D^T D)^{-1} D^T Y$$

where $D = [X_{n-d} X_{n-d-1} X_{n-d-2} \cdots X_{n-d-N}, Y_{n-1} Y_{n-2} \cdots Y_{n-1-M}]$ Fig. 39g
$$Y(z) = \sum_{i=0}^{N} a_i z^{-(d+i)} X(z) - \sum_{j=0}^{M} b_j z^{-(1+j)} Y(z)$$

Fig. 39h
$$\Rightarrow \quad \frac{Y(z)}{X(z)} = \frac{\sum_{i=0}^{N} a_i z^{-(d+i)}}{1 + \sum_{j=0}^{N} b_j z^{-(1+j)}}$$

Fig. 39i
$$\ln P = -|M| \frac{10^4}{T} + B$$

*Fig. 40a*

$$\text{process gain} = \sqrt{\frac{\frac{1}{\text{range}} \int \text{Output Temperature Pulse \& Noise Power}}{\int \text{Input Pulse Power}}}$$

$$\ln \Phi = \ln A - \frac{E_a}{k} \cdot \frac{1}{T}$$
$$\quad\quad\quad\quad\uparrow\quad\uparrow$$

*Fig. 40b*  BEP intercept, BEP slope.

*Fig. 40c* $\quad f_e(t) = \left( A + B \frac{d}{dt} \right) f_d(t)$

Fig. 41a $$G = K_{G2}T^2 + K_{G1}T^1 + K_{G0}T^0$$
$$P = K_{P2}T^2 + K_{P1}T^1 + K_{P0}T^0$$
$$L = K_{L2}T^2 + K_{L1}T^1 + K_{L0}T^0$$
$$R = K_{R2}T^2 + K_{R1}T^1 + K_{R0}T^0$$
$$F = K_{F2}T^2 + K_{F1}T^1 + K_{F0}T^0$$
$$Q = K_{Q2}T^2 + K_{Q1}T^1 + K_{Q0}T^0$$
$$\Delta = |\text{target setpoint} - \text{current setpoint}|$$

Proportional band $= G \cdot 100\%$
Integral time $= P$
Derivative time $= L \cdot 4$ $$\text{HighCutBack} = \frac{L}{F} + \frac{\Delta}{F^2} - \frac{\Delta^2 + \Delta \cdot P \cdot F}{F^2 \cdot G^2 \cdot Q \cdot \text{range}}$$

$$\text{LowCutBack} = \frac{L}{R} + \frac{\Delta}{R^2} - \frac{\Delta^2 + \Delta \cdot P \cdot R}{R^2 \cdot G^2 \cdot (100\% - Q) \cdot \text{range}}$$

Fig. 41b   $\Phi = \text{composition} \cdot \text{thickness} / \text{shutterduration}$ Fig. 41c   $\text{Temperature} = \text{BEPintercept} - \text{BEPslope}/\ln\Phi$

Fig. 41d $$\text{process gain} = \sqrt{\frac{\frac{1}{\text{range}} \sum \Delta \text{ temperature}}{\sum \Delta \text{ input power}}}$$

HIERARCHICAL CONTROL SYSTEM FOR MOLECULAR BEAM EPITAXY

RIGHTS OF THE GOVERNMENT

The invention described herein may be manufactured and used by or for the Government of the United States for all governmental purposes without the payment of any royalty.

MICROFICHE APPENDIX

This application includes a microfiche appendix comprising computer source code listings. The total number of microfiche is 2, and the total number of frames is 102.

OTHER APPENDICES

Appendix A is a paper by Jeffrey J. Heyob titled "Trapezoidal Tuning & Adaptive Bandwidth Control" from Wright Laboratory, Material Directorate, Material Process Design Branch, Wright-Patterson AFB.

Appendix B is a set of flow charts (designated FIGS. B1–B51) for the programs of the microfiche appendix.

BACKGROUND OF THE INVENTION

The present invention relates generally to a hierarchical control system for Molecular Beam Epitaxy (MBE).

Numbers in square brackets [] refer to the Bibliography at the end of this "BackGround" section.

In MBE, the shutters and furnaces are commonly controlled by computer during growth. A recipe is input by the MBE operator. This recipe consists of a list of layers which will compose the thin-film. For each layer, the shutters that will be open and the time they will be open is specified. The operator chooses the furnace temperatures and layer growth times to obtain the specific thicknesses and compositions for each layer using calibration data manually obtained during a period of time prior to the Growth Period (Growth), called the Setup Period (Setup).

During the Setup, the operator prepares the machine and may run one or more of several experiments to calibrate the performance of the MBE machine. Calibration data includes Beam Equivalent Pressure (BEP) Curves which relate the Knudsen Cell Temperature and the flux, and Reflective High Energy Electron Diffraction (RHEED) measurements which indicate the rate of growth of different materials.

Beam Equivalent Pressure (BEP) curves are commonly measured manually. Measuring these curves takes a couple hours for each cell. As a result they are measured infrequently (sometimes only once a month). The temperature of the Knudsen Cell is stabilized at three or four different values within the operating range and the beam equivalent pressure, which corresponds to the flux, is measured using an ion gauge at each temperature.

The Proportional, Integral, Derivative (PID) Controllers are typically calibrated manually using Ziegler-Nichols Tuning Methods. A single set of constants (Proportional Band, Integral Time and Derivative Time) is determined and is used to control the temperatures over the entire operating range of the cell. Manually finding these values is time consuming and as a result the MBE system is tuned infrequently (rarely more than once per month), further reducing the performance of the MBE Machine.

The growth rate of different combinations of materials is also measured using Reflective High Energy Electron Diffraction (RHEED). Information on the stoichiometry and growth rate of different combinations of materials is obtained using this technique. These measurements are used to select the temperatures of the Knudsen Cells to obtain the desired compositions as well as the growth times for the layers in the recipe. To make the same thin-film three weeks later, most likely the furnace temperatures and growth times will have changed due to the changing characteristics of the MBE machine. For instance, as the material in a Knudsen Cell is consumed, the temperature of the Knudsen Cell must be increased to obtain the same flux.

Determining the furnace temperatures and layer growth times during Setup is a burden on the operator who sometimes makes mistakes. Also estimating the growth times to obtain a desired thickness is not optimal because the MBE machine's behavior changes, i.e. more or less time may be necessary to complete a layer.

A transient in the flux as shown in the typical flux wave in FIG. 1 occurs whenever the shutter is opened due to a reduction in the radiant heat reflected from the shutter after the shutter is opened. As a result, the composition of the thin-film is not correct at interfaces. Ideally the flux should immediately stabilize at one value when the shutter is open, as in the ideal flux wave in FIG. 1.

FIG. 2 shows the basic layout of a Knudsen Cell 20, which comprises a crucible 22 having an aperture 23 and a shutter 26. A heater 24 surrounds the lower part of the crucible 22 containing a melt 25. A thermocouple 28 senses the temperature of the melt. The amount of flux emitted from the cell is largely a function of the surface temperature of the melt. The melt temperature is controlled by a PID controller that regulates the amount of power sent to the heaters around the outside of the crucible. As shown in FIG. 3, the PID controller 34 observes the thermocouple temperature signal via line 33 and controls the power sent to the heaters so that the thermocouple signal follows the setpoint command signal via line 31. The output from the PID controller 34 is a power command on line 35 to an SCR power controller 36, which supplies a signal on line 37 to control the heater power in the Knudsen cell 20. The aperture in the Knudsen cell helps to provide a coherent flux beam, and the shutter allows the operator to block the flux beam when growth is not desired.

When the shutter opens, additional power is lost from the Knudsen Cell to the surrounding environment via the flux beam. This results in an increased temperature gradient from the back of the cell to the melt surface. The PID controller compensates for this increased thermal loading by increasing the average power sent to the cell to maintain a constant thermocouple reading at the back of the cell. However, since the PID controller typically senses only the back of the cell, it cannot detect the drop in melt surface temperature with respect to the thermocouple temperature. Thus, even though the PID controller maintains a nearly constant thermocouple reading throughout the shutter opening disturbance, the melt surface cools because of the increase in thermal power lost to the environment. This cooling results in an exponential drop in flux from the cell immediately after shutter opening as shown in FIG. 6.

Ideally, in situ sensing of beam flux will allow accurate closed-loop compensation of this cooling phenomenon. Unfortunately, no such in situ sensing scheme presently exists that does not interfere with satisfactory growth of thin-films on the substrate. For example, sensing the flux accurately may require the sensor to be placed directly in the flux beam; this would result in a significant disturbance in the flux beam on its way to the substrate. In the case of hot filament sensors such as ion gauges, the outgassing from these filaments could result in contamination of the film growth. Therefore, feedforward or open-loop compensation techniques are required for this situation.

Mechanical modifications are being explored by various MBE equipment manufacturers in order to reduce the shutter transient problem. For instance the shape of the shutter facing the aperture can be convex so that heat is not reflected directly back into the Knudsen Cell. This would reduce the difference in load between when the shutter is open and when the shutter is closed. Mechanical modifications to the Knudsen Cell will reduce flux transients however they will not remove them. Also hardware upgrade of existing machines is costly.

Software modifications have been explored as described by Chilton [2] and Vlcek [3] with good success. They have not however addressed in the literature the issues necessary to incorporate this capability into a manufacturing system. Integration with a recipe growth routine, automation of the process identification routine and data validity checking are issues that they have not addressed.

Even after the transient dies out, the flux is not completely stable. Noise on the thermocouple signal, non-optimal choice of parameters for the PID Controllers and the accuracy limit of the PID controllers cause the flux to vary. In current MBE applications, the PID Controllers are loaded with one set of P,I and D values for the entire temperature range.

Recipes for new materials are developed to a large extent by trial and error. An estimate of the recipe to obtain a desired behavior is grown. The thin-film is then removed from the MBE machine and characterized. If the behavior is not achieved, then the recipe is adjusted and another wafer is grown. This process is continued until the behavior is achieved. In well known material systems the number of cycles of this procedure is not very high (perhaps 3 or 4), but for new material systems 30 repetitions may be necessary. These calibration runs are very expensive because both the machine time and the substrate material are expensive.

The following United States patents are of interest.

U.S. Pat. No. 5,205,900—Inoue et al

U.S. Pat. No. 5,185,288—Cook et al

U.S. Pat. No. 5,169,798—Eaglesham et al

U.S. Pat. No. 5,096,533—Igarashi

The patent to Igarashi describes a molecular beam epitaxial growth device and molecular beam control method for exactly controlling thickness and composition of epitaxial film. The remaining patents are of less interest.

BIBLIOGRAPHY

[1] Heyob, J. J., *The Process Discovery Autotuner*, Master's Thesis, Department of Electrical and Computer Engineering, University of Cincinnati, June 1991; hereby incorporated by reference.

[2] Chilton, P. A., Truscott, W. S., Wen, Y. F., *Elimination of the flux transients from molecular-beam epitaxy source cells following shutter operation*, Journal of Vacuum Science and Technology, B 6 (4), Jul/Aug 1988, pp. 1099–1103.

[3] Vlcek, J. C., Fonstad, C. G., *Precise Computer Control of the MBE Process—Application to Graded InGaAlAs/InP Alloys*, Journal of Crystal Growth, Vol. 111 1991, pp 55–60.

[4] Patterson, O. D., Qualitative Control of Molecular Beam Epitaxy, *Self Directed Control Workshop*, WRDC-TR-90-4123, Dayton, Ohio, May 22–23, 1990.

[5] Griffith, G., Evans, K., Eyink K., *Manufacturing Science for Advanced Sensors for MBE Growth*, Internal Program Plan, Wright Laboratory, Jun. 14, 1991.

[6] Currie, K. R., LeClair, S. R., & Patterson, O. D., *Self-Improving Process Control for Molecular Beam Epitaxy*, International Journal of Advanced Manufacturing Technology, Special Issue on Neural Networks in Design and Manufacturing, (in press).

(8) Aspnes, D. E., Quinn, W. E., U.S. Pat. No. 5,091,320, Ellipsometric Control of Material Growth, Feb. 25, 1992.

[9] Garrett, P. H., *Analog I/O Design, Acquisition: Conversion: Recovery*, Reston Publishing Company, Reston, Va., 1981.

[10] Horn, R. A., Johnson, C. R., "Matrix Analysis", Cambridge University Press, Cambridge, England, 1991.

SUMMARY OF THE INVENTION

An objective of the invention is to provide a Control System to improve the manufacturing capability of MBE.

The invention relates to a multi-featured control system which improves the manufacturing capability of the thin-film semiconductor growth process. This system improves the repeatability and accuracy of the process, reduces the manpower requirements to operate MBE, and improves the MBE environment for scientific investigation. This system has three levels of feedback control. The first level improves the precision and tracking of the process variables, flux, and substrate temperature. The second level comprises an expert system that uses sensors to monitor the status of the product in order to tailor the process plan in real time so that the exact qualities desired are achieved. The third level features a continuously evolving neural network model of the process which is used to recommend the recipe and command inputs to achieve a desired goal. The third level is particularly useful during the development process for new materials. All three levels require models of the process which are updated during automatic process identification experiments.

The MBE Control System integrates a number of improvements to the MBE process in a robust manner so that they are accessible to the MBE operators in production and material research environments.

The consistency and quality of material grown with MBE is improved. Qualities addressed are layer thicknesses, composition and interfacial sharpness.

The manpower requirements for operating the process are reduced.

The MBE environment is improved as a research tool.

The number of growth runs necessary to develop a new material system is reduced.

FEATURES

A. Hierarchial Control System

A1. A hierarchial control system for controlling and improving the epitaxial films grown with molecular beam epitaxy (MBE). The control system, shown in FIG. 4, is arranged in a hierarchy composed of: input-output control modules for MBE instrumentation; inner-control-loop that qualifies MBE process dynamics prior to MBE growth; self-directed-control-loop that quantifies MBE growth progress in-situ for precise film thickness, composition, and interfacial sharpness; and the ex-situ-control-loop that guides future recipe design with an artificial neural network.

The inner-control-loop contains: the adaptive gain bandwidth (AGB) module to quantify the thermal dynamics of the MBE Knudsen cells; the beam equivalent pressure (BEP) calibrator to quantify the flux emission from each cell; the shutter opening transient compensator (SOTC) to quantify the effects of shutter cycle loading on the effective flux emission from each cell shown in FIG. 5.

The self-directed-control-loop contains: the growth control module for essential recipe execution; flux setpoint control module to calculate precise Knudsen cell thermal setpoints for required flux output density; an expert system inference engine to guide recipe flux requirements via in-situ sensor data shown in FIG. 5.

The ex-situ-control-loop contains: an artificial neural network that processes the acquired MBE calibration and growth data to form material-process models to guide future recipe design in FIG. 5.

A2. A hierarchical control system of feature A1, which combines all MBE instrumentation onto a single organized work platform. MBE set-up, calibration, and growth can be controlled from a central location. MBE parameters can be monitored in real-time and compared for process interactions and boundary conditions.

A3. A hierarchical control system of feature A1, which combines all MBE instrumentation for centralized data logging purposes. Operator set machine parameters are automatically recorded and accessible for duplicating MBE growth conditions. The recorded data contains all calibration variables to facilitate duplication of said machine parameters for later analysis.

A4. A hierarchical control system of feature A3, which provides set-up, calibration and growth data to an expert inference engine and to an artificial neural network to process and validate new MBE recipe designs with reduced recipe trials.

A5. A hierarchical control system of feature A1, which uses inter-application communication to transfer data to and from individual modules. This data transfer method allows each instrumentation module, inner-loop-control module, self-directed-control-loop module, and ex-situ-control-loop module to be developed independently of the other modules. This data transfer method allows the hierarchial control system to be configured uniquely for any MBE system.

A6. The adaptive gain bandwidth (AGB) module of feature A1, which extracts parameters about thermal properties of each MBE Knudsen cell using the trapezoidal tuning method. As detailed in FIG. 3 of Appendix A, this module measures the process lagtime, process period (frequency), rising rate falling rate, nominal power requirement, and process gain. (See the equation in FIG. 3 on page 9 of Appendix A.)

Where the process gain is equal to the square root of a quantity having a numerator and denominator, with the numerator being the reciprocal of range times the integral of Output Temperature Pulse & Noise Power, and the denominator being the integral of Input Pulse Power (see FIG. 40*a*).

The extracted parameters, shown in FIG. 8 on page 27 of Appendix A, are used in-situ to the MBE growth process to determine optimal values for the proportional band, integral time, derivative time, and cutback constants for each proportional-integral-derivative controller for each Knudsen cell associated with the MBE machine system.

A7. The beam equivalent pressure (BEP) calibrator of feature A1 automates the task of tabulating each Knudsen cell flux pressure equivalent to cell temperature across the operating range of each Knudsen cell shown in FIG. 15. The relationship between the flux pressure phi and the temperature T in each Knudsen cell is shown in the equation of FIG. 40*b*. These tabulations are data logged as set forth in feature A3 to facilitate the data availability for in-situ flux regulation via Knudsen cell temperature regulation during the MBE growth process.

A8. The shutter opening transient compensator (SOTC) as set forth in feature A1, is coupled with the AGB module of feature A6 and the BEP module of feature A7 to compensate load disturbances incurred on Knudsen cell flux emissions that result from cycling the shutters associated with each Knudsen cell. The equation of FIG. 40*c* profiles the effective flux $f_e(t)$ that results from a desired flux $f_d(t)$ in a single time constant system where A and B constitute gain and derivative terms. This effective flux profile is inverted in a compensation algorithm to reduce variation due to shutter load disturbances to 1% of the desired flux profile shown in FIG. 1.

B. Method Of Control

B1. A molecular beam epitaxy (MBE) control method consisting of a hierarchical control system shown in FIG. 16, for controlling and improving epitaxial thin-films grown with MBE comprising the steps of:

calibrating the MBE machine system to determine specific MBE machine characteristics to be used in optimizing a wafer growth recipe and precisely controlling the MBE machine actuators during thin-film wafer growth;

optimizing the growth recipe to the MBE machine calibration to accommodate machine boundary conditions for substrate temperature, cell temperature, beam flux, shutter timing, and chamber pressure;

growing the thin-film semiconductor wafer with precise substrate and cell temperature control, cell temperatures driven by individual cell flux requirements, and cell temperatures automatically adjusted to compensate cell shutter opening flux transients;

post-processing the thin-film wafer growth for future growth recipe enhancement by correlating actual substrate and cell temperatures with growth process temperature requirements and x-ray defraction properties to provide recipe design by electro-optical property requirements.

B2. A molecular beam epitaxy control method, of feature B1, wherein the step of calibrating an MBE machine system is carried out at a time before optimizing a growth recipe and before growing a thin-film wafer based on an optimized growth recipe is shown in FIG. 17 and comprises the steps of:

tuning each proportional-integral-derivative (PID) Knudsen cell and substrate temperature controller, as shown in FIG. 21, to calculate the K constants for the parameteric equations that describe the control variable requirements of each Knudsen cell and substrate controller for any temperature requirement within each Knudsen cell and substrate operating temperature range using the equations of FIG. 41*a*, where the parameteric equation for gain is $K_G$, period is $K_P$, lag is $K_L$, rising rate is $K_R$, falling rate is $K_F$, output demand power is $K_Q$, and T is the required temperature;

calibrating each Knudsen cell flux beam emission, as shown in FIG. 29, to determine the Beam Equivalent Pressure (BEP), flux control time constant, and shutter induced load change to determine the K constants for the following equation for each Knudsen cell, $$C_{(n)} = K_0 S_{(n)} - K_1 S_{(n-1)} + K_2 C_{(n-1)}.$$

B3. A molecular beam epitaxy control method, as described in feature B1, wherein the step of optimizing a growth recipe for the MBE machine calibration as described in feature B2 is carried out before growing a thin-film wafer, is shown in FIG. 18, and comprises the steps of:

adjusting open shutter duration for each recipe layer with shutter timing from previous growth data and previous MBE machine calibration;

calculating the required beam flux from each Knudsen cell for each recipe layer given the required layer thickness and percent composition of each species by the equation of FIG. 41b, shutter duration being in seconds;

calculating the required Knudsen cell temperature for beam flux for each recipe layer by the BEP equation of FIG. 41c.

B4. A molecular beam epitaxy control method, as described in feature B1, wherein the step of growing a thin-film semiconductor wafer in a calibrated MBE machine described in feature B2 with an optimized growth recipe described in feature 3 is shown in FIG. 19 and comprises the steps of:

setting the substrate and Knudsen cell temperatures, proportional band, integral time, derivative time, high cutback, and low cutback constants, as in FIG. 38, required for each layer by the optimized growth recipe;

setting the state and duration of each Knudsen cell shutter required for each layer by the optimized growth recipe;

compensating the flux beam emission from each Knudsen cell to minimize shutter load induce flux emission transients with the following equation, $$C_{(n)} = K_0 S_{(n)} - K_1 S_{(n-1)} + K_2 C_{(n-1)}$$

by tracking the previous $S_{(n-1)}$ and current $S_{(n)}$ shutter state and previous $C_{(n-1)}$ temperature compensation to calculate a current $C_{(n)}$ compensation temperature for each Knudsen cell required for each layer by the optimized growth recipe.

B5. A molecular beam epitaxy control method, as described in feature B1, wherein the step of post-processing a thin-film wafer grown by the MBE control method described in feature 4 is shown in FIG. 20 and comprises the steps of:

correlating each Knudsen cell growth process temperature record with the optimized growth recipe setpoint temperature record and the flux emission compensation temperature record;

correlating properties determined by x-ray defraction of each thin-film wafer layer with the required layer properties of the optimized growth recipe.

B6. A molecular beam epitaxy control method, as described in feature B2, wherein the step of tuning proportional-integral-derivative (PID) temperature controllers is shown in FIG. 21 and comprises the steps of:

initializing the temperature process tuning zones, as in FIG. 22, by dividing a process range from a minimum operating temperature to a maximum operating temperature into five temperature tuning zonepoints equally spaced by 20% of the range with the first tuning zonepoint and setpoint set equal to 10% of the process range below the maximum operating temperature and setting the controller's P,I,D coefficients to 10,0,0 respectively;

monitoring the process until a stable temperature, as in FIG. 23, is determined by the following equation, $$|K3|+|K2|+|K1| < 0.001$$

by continuously fitting the last 15 seconds of the process temperature data to a 3rd-Order Least-Squares-Estimation until the sum of the magnitudes of the K3, K2, and K1 coefficients minimizes below 0.1%;

applying a disturbance to the process, as in FIG. 24, by increasing the process setpoint by 10% of the process range and then determining an initial temperature reaction as in the previous step with the following equation, $$|K3|+|K2|+|K1| > 0.01$$

when the equation is satisfied, the process setpoint is lowered by 30% of the process range in preparation for the next tuning zonepoint;

measuring the process reaction, as in FIG. 25, by recording the process temperature data and the process input power data until the process temperature decreases below the current tuning zonepoint temperature;

extracting the six process parameters, as in FIG. 26, by determining the maximum rising temperature rate vector with a 3rd-Order Least-Squares-Estimation of the leading temperature data, determining the maximum falling temperature rate vector with a 3rd-Order Least-Squares-Estimation of the trailing temperature data, determining a noise filtered temperature peak with a 3rd-Order Least-Squares-Estimation of the peak temperature data, determining process lag as the time delay from the initial disturbance to an intercepting tangent from the maximum rising rate vector, determining process period as the time separation from where the rising rate vector intercepts the maximum value of the noise filtered temperature peak and where the falling rate vector intercepts the same temperature peak, determining process gain by the equation of FIG. 41d (also see equation 4 on page 10 of Appendix A), and determining steady-state power as the input power to the process at the stable temperature prior to applying the disturbance;

advancing to the next tuning zone, as in FIG. 27, by decreasing the tuning zonepoint by 20% of the process range if the current zonepoint is greater than 10% of the process range above a minimum operating temperature for the process and then repeating with the monitoring of the process for stable temperature;

assimilating the six process parameters from all tuning zones, as in FIG. 28, by fitting the five extracted values for each parameter to six separate 2nd-Order Least-Squares-Estimated parametric equations for later use to calculate proportional band, integral time, derivative time, high cutback, and low cutback constants as in feature B2.

B7. A molecular beam epitaxy control method, as in feature B2, wherein the step of calibrating flux emission from Knudsen cells is shown in FIG. 29 and comprises the steps of:

initializing the flux calibrating zones, as in FIG. 30, by dividing a process range from a minimum flux operating temperature to a maximum flux operating temperature into five flux calibrating zonepoints equally spaced by 20% of the range with the first calibrating zonepoint equal to 10% of the process range below the maximum flux operating temperature;

baking out excess flux species from the Knudsen cell, as in FIG. 31, by idling the Knudsen cell temperature setpoint at the maximum flux operating temperature for a preset bake-out period and then decreasing the temperature setpoint by 10% of the process range to the first flux calibrating zonepoint;

monitoring the process until a stable temperature, as in 32, is determined by the following equation, $$|K3|+|K2|+|K1| < 0.001$$

by continuously fitting the last 15 seconds of the process temperature data to a 3rd-Order Least-Squares-Estimation until the sum of the magnitudes of the K3, K2, and K1 coefficients minimizes below 0.1%;

measuring the flux emission shutter load and beam equivalent pressure (BEP), as in FIG. 33, by opening the Knudsen cell shutter and recording the flux magnitude data and temperature data until the flux measurement reaches a steady-state condition as determined by the equation, $$|K3|+|K2|+|K1| < 0.001$$

where the last 15 seconds of flux data is fitted to a 3rd-Order Least-Squares-Estimation until the K3, K2, and K1 coefficients minimize below 0.1% and then record the BEP value and calculate the StepUp temperature as a function of the change in flux magnitude for the shutter opening load change;

measuring the flux emission StepUp response, as in FIG. 34, by applying the StepUp temperature to the Knudsen cell setpoint and recording the flux magnitude data and temperature data until the flux measurement reaches a steady-state condition as determined in the first flux measuring step;

measuring the flux emission StepDown response, as in FIG. 35, by applying the zonepoint temperature to the Knudsen cell setpoint and recording the flux magnitude data and temperature data until the flux measurement reaches a steady-state condition as determined in the first flux measuring step;

advancing to the next flux calibrating zone, as in FIG. 36, by closing the Knudsen cell shutter and then decreasing the calibrating zonepoint and setpoint by 20% of the process range if the current zonepoint is greater than 10% of the process range above a minimum flux operating temperature for the process and then repeating with the monitoring of the process for stable temperature;

assimilating the flux emission parameters from all calibrating zones, as in FIG. 37, by correlating the shutter-load flux data to the shutter opening time and converting into a difference equation D(z) and correlating the StepUp and StepDown flux data with Knudsen cell delay time and converting into a difference equation H(z), calculating C(z) by the following equation, $$C(z) = \frac{-D(z)}{H(z)}$$

and then converting C(z) into C(n), $$C_{(n)} = K_0 S_{(n)} - K_1 S_{(n-1)} + K2 C_{(n-1)}$$

then fitting the coefficients $K_0$, $K_1$, and $K_2$ of C(n) and the BEP value for each of the five flux calibration zones to four separate 2nd-Order Least-Squares-Estimated parametric equations for later use in flux transient compensation during MBE thin-film wafer growth as described in feature B4.

BRIEF DESCRIPTION OF THE DRAWING

FIG. 8 is a graph showing Pulse Data;

FIG. 9a is a graph showing Flux at shutter opening without Shutter Opening Transient Compensation;

FIG. 9b is a graph showing Flux at shutter opening with Shutter Opening Transient Compensation;

FIG. 10 shows a Configuration Window for BEP Curve Measurement;

FIG. 11 comprises graphs showing The Expert System Inference Engine Module Running an MBE Simulator;

FIG. 12 is a section of computer code for an Expert System Rule Base;

FIG. 13 shows a Gallium PID Controller Main and Auxiliary Windows;

FIG. 14 is a flow chart showing an Event Sequence of Generic Module;

FIGS. 16–38 are flow charts of the control methods for MBE;

FIGS. 39a–39i inclusive are equations for the DETAILED DESCRIPTION below;

FIGS. 40a–40a are equations for the section FEATURES—A. Hierarchial Control System above; and FIGS. 41a–41d are equations for the section FEATURES—B. Method of Control above.

DETAILED DESCRIPTION

Figure 4:
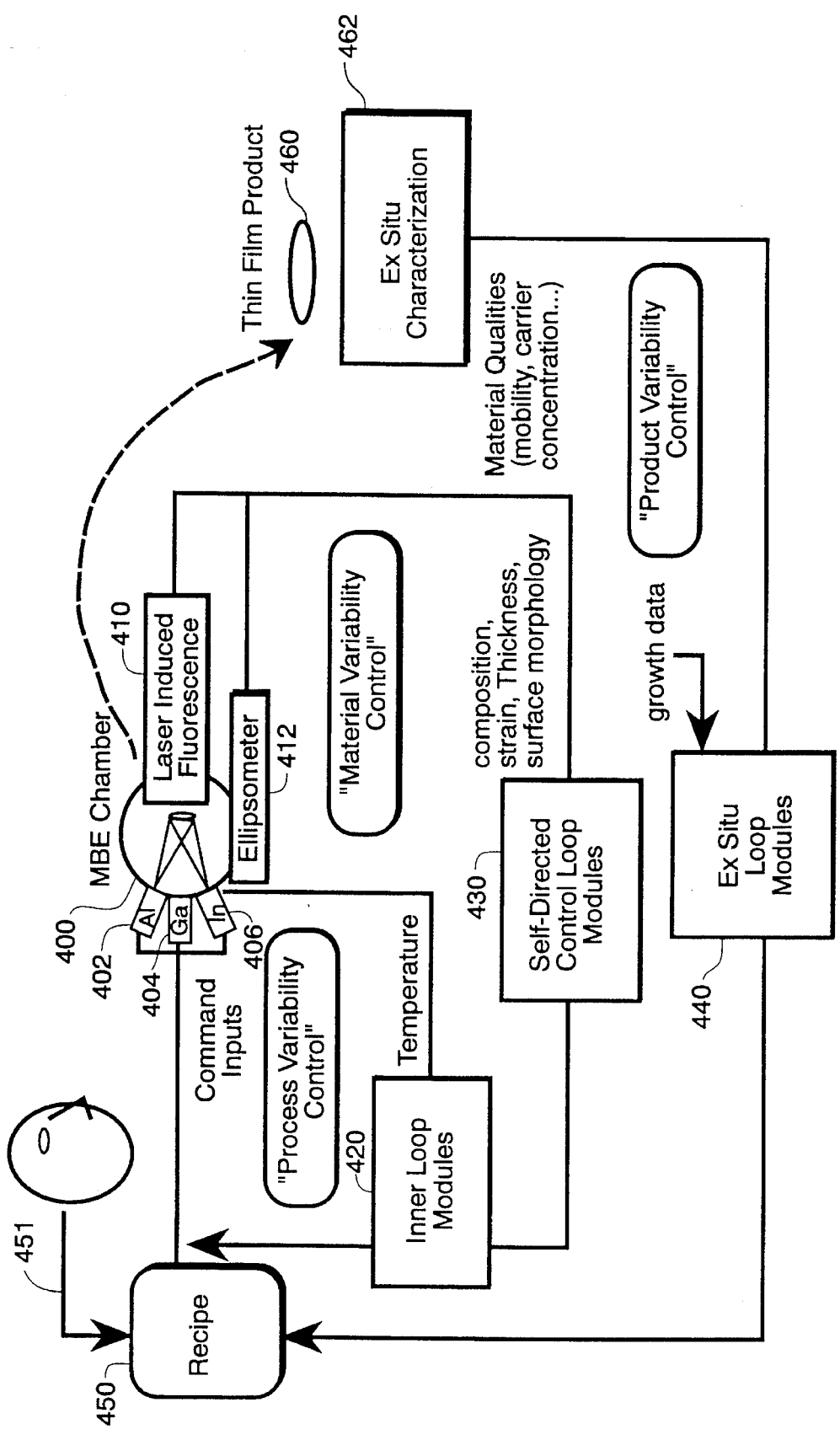
FIG. 4 is a block diagram showing The Three Loops of the MBE block diagram of a PID Control Loop; Control System.
Figure 5:
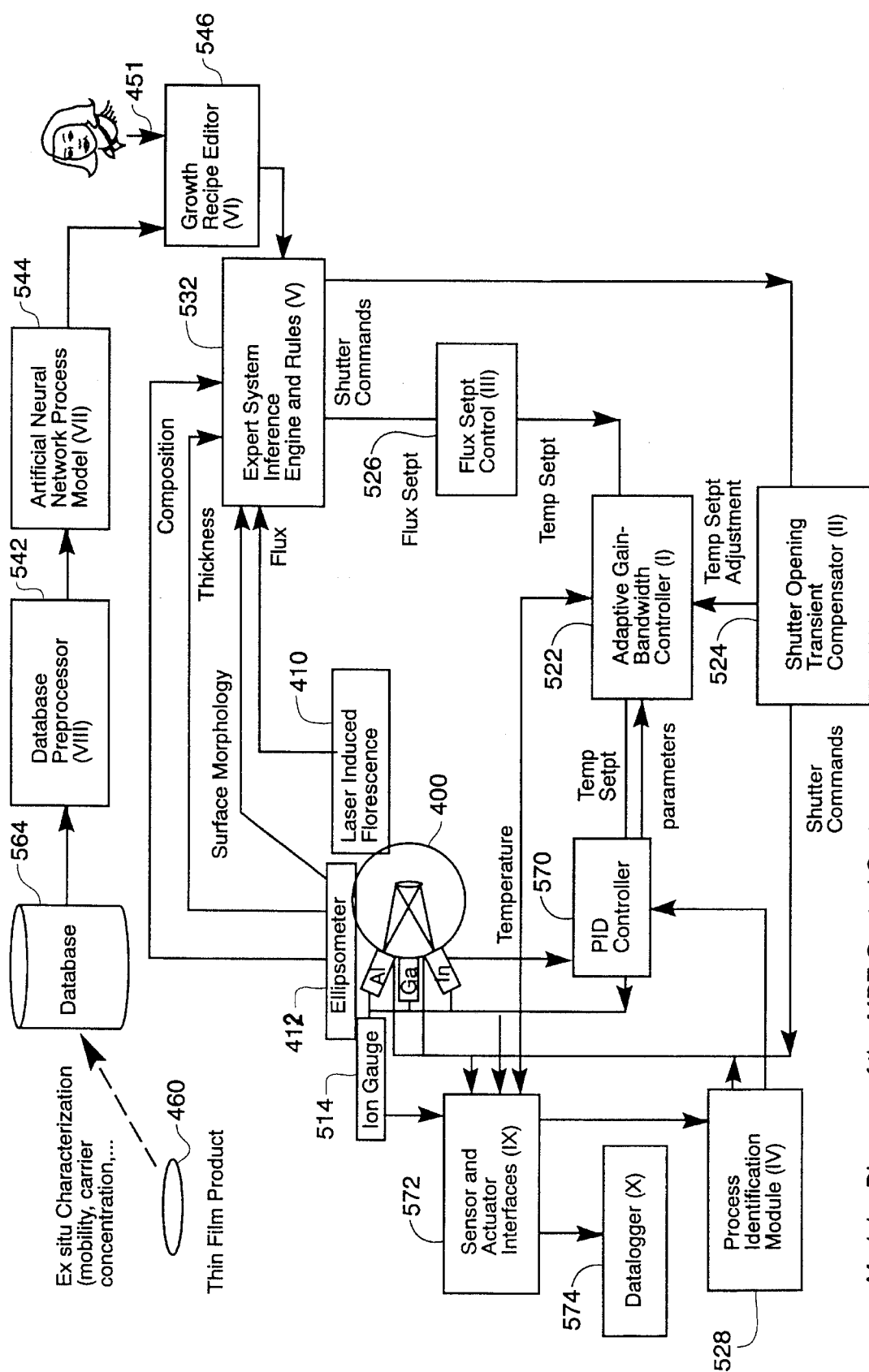
FIG. 5 is a Modular Diagram of the MBE Control System.

The MBE Control System consists of ten modules which together improve a number of shortcomings of current MBE technology. The System, shown in FIG. 4, has three feedback loops: the Inner Loop, the Self-Directed Control Loop and the Ex Situ Loop. An MBE chamber 400 has three Knudsen cells 402, 404 and 406 for Al, Ga and In respectively. Output sources for signals relating to the growth process are shown as a laser induced fluorescence unit 410 and an ellipsometer 412; which provide composition, strain, thickness, and surface morphology information. The Inner Loop comprising inner loop modules 420 (modules 522, 524, 526 and 528 in FIG. 5) improves the consistency and accuracy of the flux beams and substrate temperature. The Self-Directed Control Loop comprising self-directed control loop modules 430 (modules 532 in FIG. 5) generates the ideal process control path to obtain the specified recipe in real time, using an expert system and advanced sensor feedback. The contributions of the Inner Loop provide the Self-Directed Control Loop the ability to consistently produce a specified recipe. The Ex Situ Loop comprising E x Situ loop modules 440 (modules 542, 544 and 546 in FIG. 5) reduces the time to develop a recipe in a new material system by recommending recipe input parameters based on data from past growths. A thin film product such as a wafer 460 produced by the MBE chamber 400 is analyzed by means shown as an Ex Situ characterization block 462 to provide input information to the Ex Situ loop modules 440. Output from the Ex Situ loop modules 440 is supplied to a recipe unit 450, which also has human inputs shown as a line 451. The interaction of the modules of the System is shown in FIG. 5.

Inner Loop

The main goal of the Inner Loop is to provide transient free, highly stable flux, even in the case of overlapping events, i.e. events which do not fully decay before being repeated. The Inner Loop also maintains a stable substrate temperature. The Inner Loop consists of four modules: The Adaptive Gain-Bandwidth Controller (I) 522, the Shutter Opening Transient Compensator (II) 524, the Flux Setpoint Controller (III) 526 and the Automatic Process Identification Module (IV) 528.

The Adaptive Gain-Bandwidth Controller (I) 522 is described in Appendix A titled "Trapezoidal Tuning & Adaptive Bandwidth Control".

The principal control inputs to the MBE process are the temperatures of the source and substrate furnaces and the shutters. These inputs are used to generate flux beams. The stability of these flux beams is reflected in the consistency and accuracy of the product. The alloy concentration and dopant concentration variation in the depth direction correspond to the flux variation. Also variation in the fluxes affect layer thicknesses. Inconsistency in the flux will probably even effect the crystallinity and defect levels.

The effectiveness of the PID compensator to control the cell or substrate temperature depends on how well it is tuned. A major component of the Automatic Process Identification Module (IV) 528, named the Process Discovery Autotuner, and the Adaptive Gain-Bandwidth Controller (I) 522 have been developed to utilize the capability of the PID controllers effectively.

The Process Discovery Autotuner automatically determines the characteristics of all the Knudsen Cells over their entire operating ranges. This information is used by the Adaptive Gain-Bandwidth Controller 522 during growth to select ideal PID controller parameters depending on the situation. Under static conditions the Adaptive Gain/Bandwidth Controller operates as a gain scheduler (i.e. the P, I and D parameters are chosen depending on the temperature.)

An open loop compensator called the Shutter Opening Transient Compensator (II) 524 complements the Adaptive Gain/Bandwidth Controller 522. As the name suggests, this module compensates for shutter opening induced flux transients. A model of the Knudsen Cell is used to anticipate the power requirements to maintain a constant flux after shutter opening. The Shutter Opening Transient Compensator 524, similar to the Adaptive Gain/Bandwidth Controller 522, relies on automatic process identification experiments such as measurement of the response of the Knudsen Cell to shutter opening to calibrate the process models. These models are used by the compensator to calculate a series of temperature setpoints so the correct energy to maintain the surface temperature of the melt is delivered each second.

In the references cited above, the S (continuous frequency) domain was used to determine the compensation waveform; the Shutter Opening Transient Compensator instead uses the z (discrete frequency) domain. Since data from process identification is in discrete form and command data sent out to the PID controller is also in discrete form, conversion to and from the S domain is necessary in order to determine the compensation waveform in the S domain. These conversions to and from the S domain introduce error in the model and final output control parameters. Eliminating these conversions by analyzing the process identification data in the discrete domain removes these error components. Also analysis in the z domain is more suitable for data which does not readily fit to a sum of exponential terms in the S domain. In the z domain analysis, curve fitting to a series of terms is not required.

Figure 7:
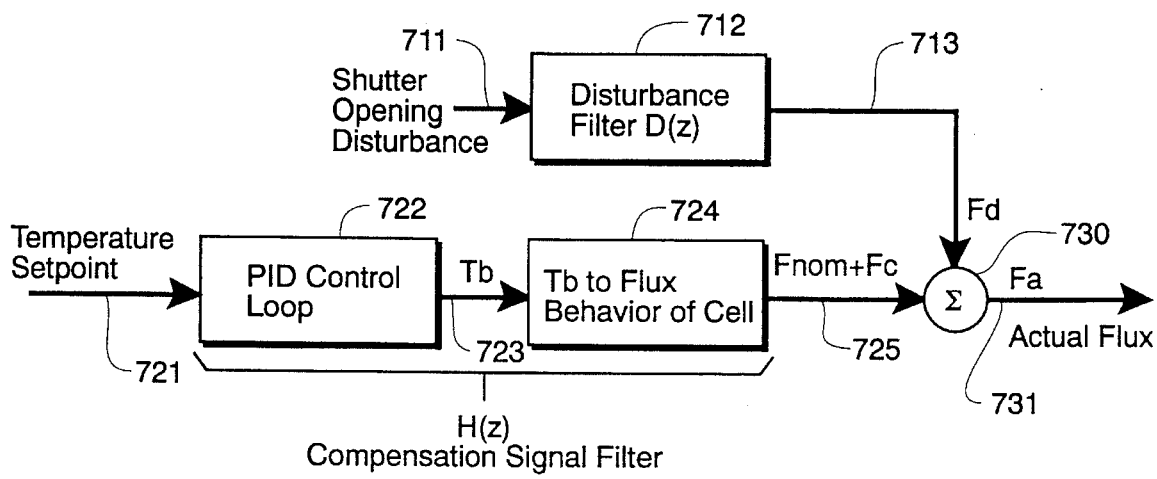
FIG. 7 is a diagram showing a Model of cell and PID controller.
Figure 15:
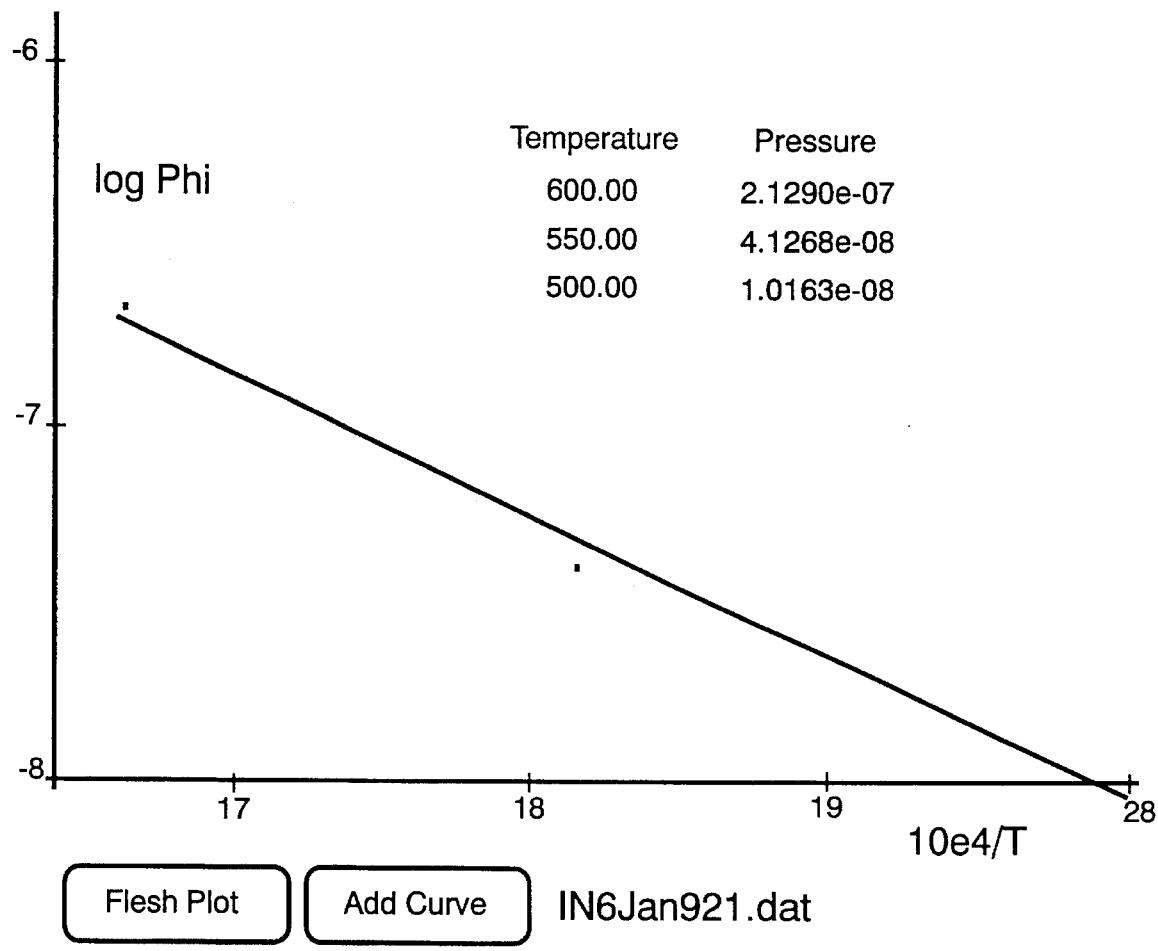
FIG. 15 is a graph showing BEP Data and Curvefit.

A conceptual linear model of the cell and PID controller is shown in FIG. 7. Temperature Setpoint on line 721 (shown as an input to block 722 representing the PID control loop) is the temperature reference signal from the host computer controlling the MBE system. The setpoint signal is a combination of the compensation temperature, $T_c$, and the nominal temperature of the cell, $T_{nom}$. $T_b$ at the output of block 722 on line 723 represents the temperature at the back of the cell or in the vicinity of the thermocouple. The $T_b$-to-flux behavior of the cell, shown as block 724, represents the flux response to a small change in $T_b$ only (i.e., no shutter disturbance). $F_{nom}$ represents the nominal flux that one would like from the cell during a growth. $F_c$ is the flux added by the compensation signal which is added to the nominal temperature setpoint. $F_{nom}+F_c$ (at the output of block 724 on line 725) is the sum of these two flux signals. A shutter opening disturbance signal on line 711 is an input to a disturbance filter D(z) shown as block 712. $F_d$ from block 712 on line 713 is the flux disturbance or droop caused by melt surface cooling. The summing node 730 yields $F_a$ on line 731 which represents the actual flux leaving the cell. The shutter opening disturbance is considered to be a step signal with a value of zero before shutter opening and a value of one after opening. It represents the act of opening the shutter, not the effect of such action on the process. The shutter opening step signal is filtered through the disturbance filter dynamics, D(z), which results in signal $F_d$. D(z) is a z-domain linear transfer function that mathematically represents the flux response to a shutter opening. H(z) is a transfer function representing the flux response to a small change in temperature setpoint.

Figure 1:
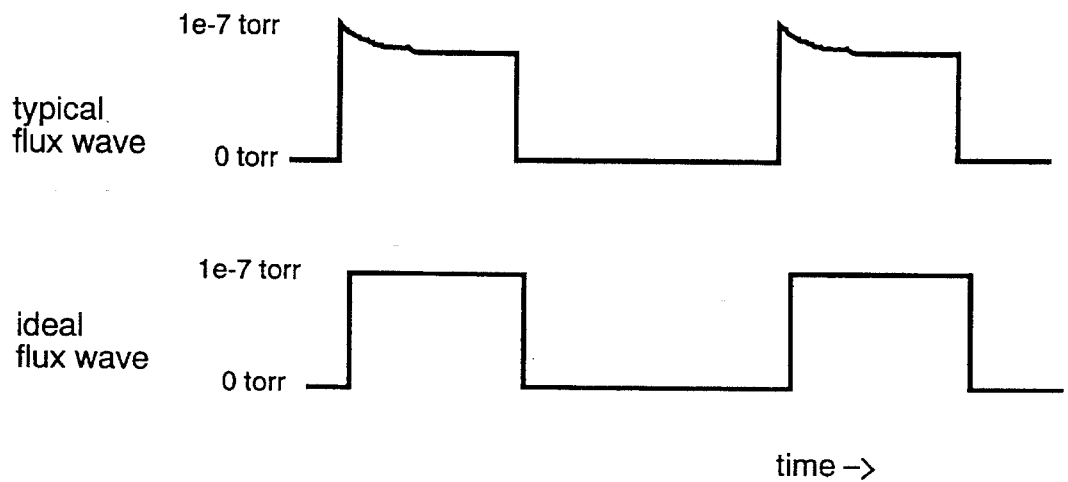
FIG. 1 is a diagram showing a Sketches of Typical and Ideal Flux Waveforms.
Figure 2:
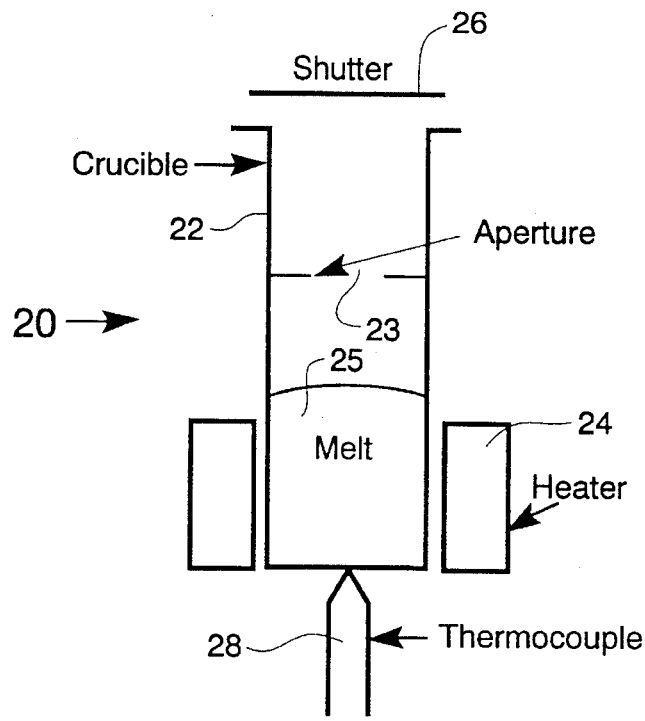
FIG. 2 is a diagram of a Knudsen Cell.
Figure 3:
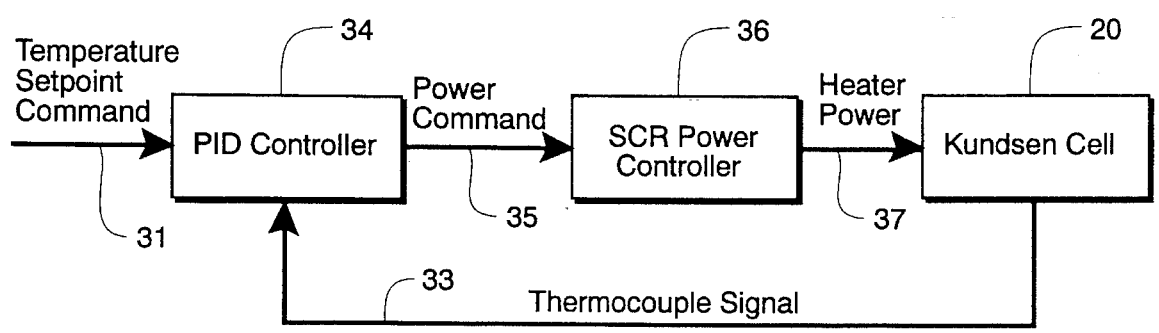
FIG. 3 is a block diagram of a PID Control Loop.

In order to compensate for a shutter opening induced flux transient, two important unknowns in the system represented in FIG. 7 must be measured. These are D(z), the disturbance filter, and H(z), the compensation filter. Once these two transfer functions are known, the Z domain representation of the feedforward compensation signal can be calculated as shown in FIGS. 39-1, where C(z) has the partial fraction expansion as shown in FIGS. 39-2. Here the $K_i$'s are the gain factors for the various exponential terms in the compensation signal, and the $P_i$'s are the poles of the exponential terms (i.e., the $p_i$'s indicate the time constants).

C(z) is the needed alteration of the nominal setpoint that will eliminate the unwanted disturbance to $F_a$. C(z) is added to the nominal temperature setpoint such that C(z)H(z)= Fc(z)= −Fd(z). Thus Fc(z) and Fd(z) will sum to zero so that the actual flux is undisturbed from its desired nominal value, or $F_a = F_{nom}$. By taking the inverse-Z transform of C(z), a time-domain compensation signal can be found. The output of this time-domain equation can be added to the nominal setpoint value to yield the actual setpoint value which would be sent to the PID controller.

To convert C(z) to C(n) the only Z-Transform needed is shown by the equation of FIG. 39c. Converting the equation of FIG. 39b yields the equation of FIG. 39d.

To discover H(z) and D(z), least-squares system identification is used. We assume that the time-domain representation of H(z) and D(z) are difference equations of the form shown in the equation of FIG. 39e, where d is a pure delay term that represents the distributed-parameter nature of the true system. This augments our assumed lumped-parameter mathematical model which is a simple finite-order difference equation. Here y(n) and x(n) are the output and input respectively. The identification problem is to find the best set of a's and b's (difference equation coefficients) that minimizes the mean-squared error between the experimental input-output behavior of the system and that predicted by the difference equation model. Test signals are applied to the system and the output responses are recorded to gather the input-output data necessary to calculate the difference equation coefficients. Because there are many more equations then unknowns, the matrix calculation of FIG. 39f is used to calculate these coefficients [10]. In other words, the columns of D are delayed versions of the recorded input-output data streams. Q is the vector of a and b coefficients, and Y is the undelayed output data stream vector. Once the difference equations are known, H(z) and D(z) can be found by taking the z-transform of the difference equations. For example, the equation of FIG. 39e transforms as shown by the equations of FIGS. 39g and 39h, where Y(z)/X(z) is the transfer function model H(z) or D(z).

The flow diagram in FIG. 29 describes the process identification experiment necessary for shutter opening transient compensation. First experiments to determine D(z) and H(z) are run. Next D(z), H(z) and C(z) are calculated using the data from these two experiments. To collect the data to find D(z) and H(z), the flux emanating from the cell is monitored with an ion gauge while shutter opening disturbances and setpoint variations are executed.

Figure 6:
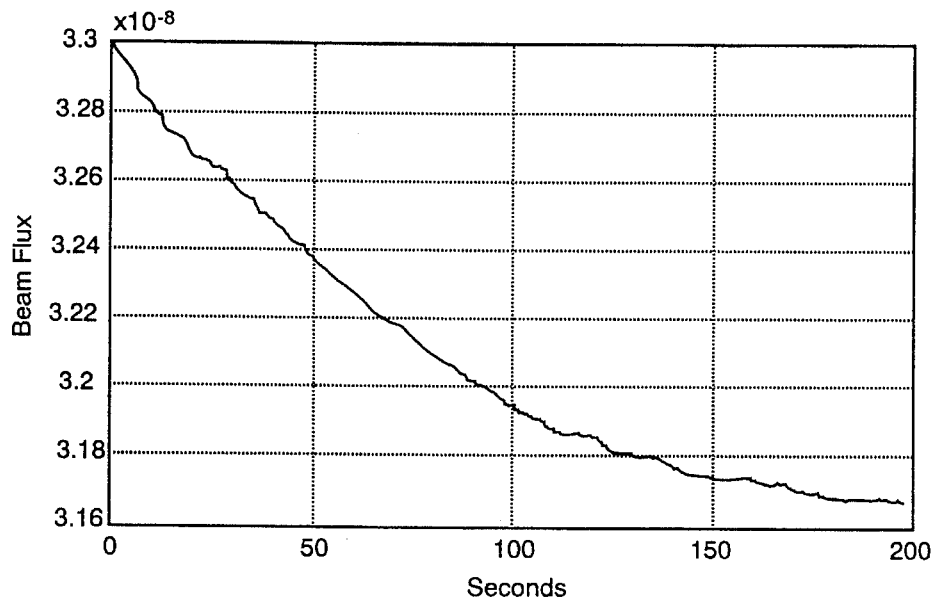
FIG. 6 is a graph showing Shutter Disturbance

The experiment to determine D(z) is illustrated by FIG. 33. The first step is to allow the cell to reach the operating temperature and stabilize. The shutter is then opened and the beam flux and the temperature at the back of the cell are recorded. The beam flux rate of change is monitored to determine when it has reached steady state. At this point the front of the cell temperature has reached equilibrium. The shutter and the data file are closed. FIG. 6 shows an example of flux signal during this experiment. When the shutter was opened the initial beam flux value was approximately $3.3\times 10^{-8}$. After 200 seconds the rate of change reached a minimum at $3.17\times 10^{-8}$.

The experiment to gather data for the H(z) equation is described in FIG. 35. The first step is to open the shutter and wait until the beam flux rate of change has reached a minimum. This first step can be performed directly after the data collection of the D(z) data. Once the beam flux has reached steady-state, a pulse of amplitude approximately equal to the expected steady-state flux drop is applied to the setpoint of the PID controller. The width of the pulsed is determined by monitoring the beam flux and measuring the rate of change. When the rate of change has reached a minimum, the setpoint is then restored to its initial value. The beam flux is monitored until the rate of change reaches a new minimum. Then, the shutter and data file are closed. An example of the flux waveform during this experiment is shown in FIG. 8. At 5 seconds the beam flux is at the first steady-state. At 90–100 seconds the beam flux has reached the second steady-state, and at 190–200 seconds the beam flux has reached the last steady-state.

FIG. 37 illustrates the steps to calculate D(z), H(z) and C(z) from the recorded data. The first step is to find the first and last points of the data needed to perform the D(z) calculation. Only data from immediately after the shutter opening event through three time constants of delay is desired. When the shutter is opened on some MBE machines, the sudden change in the flux causes a glitch in flux data; the mantissa and exponent components of the value in the ion gauge are not synchronously transferred into the computer. To avoid this glitch, the first two data points after shutter opening are replaced with estimates of what they should be using interpolation. The data is then normalized and difference equations are formed.

The equation of FIG. 39e shows the form of the difference equations. The difference matrix, D, is formed from these equations. N and M are chosen based on the characteristics of each Knudsen Cell and by the amount of noise present in the data signal. Usually a value of 1 for N and M is adequate. The delay d from setpoint change to response in the thermocouple signal. By applying the difference equation matrix to the equation of FIG. 39f the coefficients can be calculated. The coefficients are then used to form H(z) and D(z).

To be integrated into a control system, the Compensator must be robust enough to work with a variety of cell sizes and materials. It must be able to handle noisy data and inconsistent performance by the flux sensor. To meet these requirements, a history of coefficients is stored. The last n coefficient vectors are used to obtain a consensus as to the correct set of coefficients.

In order to filter out spurious results, the z-domain root locus of the resulting C(z) is examined. If C(z) has a dominant pole (one with a large gain factor) on the negative real axis, this indicates the algorithm is corrupted by noise. Poles on the negative real axis imply signals that alternate positive and negative every sampling period. Dominant poles should be strictly on the positive real axis and have values less than one. These poles yield decaying exponential signals which will counteract the flux disturbance. If C(z) has poles outside the unit circle, the results are certainly in error because these poles represent unstable signals that will grow without bound.

For certain thin-film growths the shutter of a cell might be opened and closed and opened again within a time span of less than five time constants of the cell. This will render the compensation signal C(n) invalid because the derivation of C(n) assumes a unit step input to D(z). In other words, C(n) expects $F_d$ (flux desired) to reach steady state after shutter opening and to be zero prior to shutter opening. A solution to this problem is to use H(z) and D(z) to derive a functional relationship between the shutter signal and the compensation signal. This technique would not assume a fixed shutter signal, but would yield C(n) regardless of the nature of the shutter signal.

FIG. 19 illustrates the steps of an actual growth using the Growth Module and the Shutter Opening Transient Compensator. The Growth Module sends a signal to the Shutter Opening Transient Compensator telling it to open the shutter. The Shutter Opening Transient Compensator then sends a signal back to the Growth Module when the shutter has been opened. The Shutter Opening Transient Compensator maintains a constant flux for the duration the Growth Module requires the shutter to be open. Once the shutter closed command is received by the Shutter Opening Transient Compensator the shutter is closed and the setpoint is returned to the initial value ($T_{nom}$). The shutter must remain closed until the cell temperature has stabilized at $T_{nom}$. When the next shutter-open command is sent by the Growth Module, these steps are repeated.

Electronic compensation is important because it can easily be added to existing machines. Also electronic compensation appears to be less expensive. A comparison of performance has yet to be made.

FIGS. 9a and 9b compare the Indium flux with and without Shutter Opening Transient Compensation.

The relationship of the flux to setpoint temperature for all the Knudsen Cells over their entire range, commonly referred to as the Beam Equivalent Pressure (BEP) curve, is also measured during Process Identification. The Flux Setpoint Controller III uses this information so that the operator only needs to specify the desired flux rather then a temperature setpoint. By specifying a flux in the flux box of the Setup Window and hitting return, the temperature to achieve that flux appears in the temperature box.

A history of BEP curves can be used to track the level of material left in each Knudsen Cell. The rate that the BEP curve shifts increases as the Knudsen Cell runs out of material. By reviewing the curve history, a skilled operator can predict the amount of material left in the Knudsen Cell. Past BEP curves can be displayed by selecting the "recover curve" command in the Setup Menu.

To obtain accurate models for the Adaptive Gain/Bandwidth Controller (I) 522, the Shutter Opening Transient Compensator (II) 524 and the Flux Setpoint Controller (III) 526, the Automatic Process Identification Module (IV) 528 conducts process identification experiments during Setup. The experiments to be conducted are selected by the MBE operator. Information includes the response of the Knudsen Cell for temperature and shutter input and the temperature-to-flux relationship. The Process Discovery Autotuner is a the component of this Module that determines thermal characteristics of the Knudsen Cell and substrate processes.

The configuration window shown in FIG. 10 describes the BEP Experiment. First, the temperature of the Knudsen Cell is raised to the "Calibration Max", the maximum temperature in the operating range, plus "Boost" degrees. This temperature is maintained for "Flux Settling Wait" seconds so that the material deposited on the shroud around the Knudsen Cell can be baked off. Next the temperature is lowered to the "Calibration Max" and allowed to stabilize. The shutter is then opened and the flux is again allowed to stabilize before a flux measurement is recorded. The temperature is changed to another temperature where another flux measurement is recorded. Flux measurements are made spanning the entire operating range of the Knudsen Cell. The MBE operator specifies the number of measurements, the operating range and the boost temperature using the Configuration Menu. The relationship between the pressure caused by the flux and the temperature is described by the equation of FIG. 39i, where M and B are constants. This relationship can be linearized by setting 'x' equal to the inverse of temperature and setting 'y' equal to the natural log of pressure. A linear approximation using the least squares technique is used to find M and B.

The Configuration Menu contains items which enable the specifics of the machine and preferences of the MBE operator to be easily loaded. This information is stored in a resource file so that once the operator makes a change, it will remain regardless of whether the application is restarted.

Self-Directed Control Loop

The Inner Loop provides good control of the fluxes and substrate temperature, however additional feedback is necessary to improve the accuracy and consistency of material qualities such as composition, thickness and interface sharpness. The Expert System Rules (V) 532 control the process based on material quality feedback, i.e. composition at the surface, growth rate and surface morphology. This feedback loop is called the Self-Directed Control Loop because the quality of the material is used to select the next actuation. This system will tailor each growth run, overcoming process disturbances, to exactly obtain the thin-film specified by the recipe to the limit of sensor accuracy and process variable controllability. The practicality of such control depends on the availability of advanced sensors which monitor the material behavior and knowledge to adjust the process trajectory in situ given the process state. [7]

In addition to tailoring the growth run to obtain the exact material qualities desired, the Self-Directed Control Loop can monitor the health of the MBE machine. Rules are included in the Expert System Rules which check for thermocouple failure, temperature setpoints that are outside the normal operating range, adequate liquid nitrogen flow through the cooling shroud and adequate vacuum. Other checks can be added as deemed necessary.

The software has been written and sensor technology for this system is currently under development. A demonstration of the Self-Directed Control Loop controlling a simulation of the MBE process is shown in FIG. 11, with a recipe described at the top. Four signals are plotted: Aluminum (Al) temperature, Gallium (Ga) temperature, composition and Layer Thickness. A process disturbance is invoked in this simulation; the amount of material in the Al Knudsen Cell is suddenly changed from 100 to 95 units. The simulator determines that since there is less material in the Al cell, the Al flux will also be less. Less Al flux causes the composition, the proportion of Al to all Group III molecules, to decrease. The expert system is monitoring the instantaneous composition. Since the target composition is $Al_{0.5}Ga_{0.5}As$, the expert system recommends an action to restore the composition, "Increase Al temperature". Eventually the target composition is restored.

The Layer Thickness which is the number of monolayers deposited in the current constituent layer is reinitialized and a new set of shutters is opened after each layer is completed. In FIG. 11, when Layer Thickness was reinitialized after 40 monolayers, the Si shutter was opened.

The Expert System Rule Base is easily implemented in C code using a series of "if" statements as shown in FIG. 12. The "Think" procedure is called by the main program every cycle.

Ex Situ Loop

Although the Self-Directed Control Loop is capable of growing the recipe specified, obtaining the desired product qualities (e.g. electron mobility, carrier concentration, transmissivity) is not ensured because product qualities can only be measured postprocess. For instance, the mobility of a material can only be measured using ex situ characterization techniques. In the case of an IR Detector, the frequency of light to which the material is most responsive can only be measured using ex situ characterization techniques. A third loop, the Ex Situ Loop, is included in the MBE Control System to make the connection between the desired product qualities and the command inputs in order to speed up the development process for new materials. The Ex Situ Loop is used before each growth run to recommend the recipe and MBE machine inputs.

A secondary but important motivation for the Ex Situ Loop is to learn new facts and trends about the growth process. For example, a trend relating vacancy formation and the control inputs may be identified. With this knowledge, a strategy for minimizing crystalline defects can be formulated and implemented thus improving material quality.

The Ex Situ Loop consists of the Database Preprocessor (VIII) 542, the Artificial Neural Network Process Model (VII) 544 and the Growth Recipe Editor (VI) 546. The specifics of each growth run including the source temperatures, substrate temperature, background pressure, growth recipe, type of substrate, RHEED and BEP calibration data and the wafer characterization results are stored in a database. The Data Preprocessor (VIII) 542 is used to select a family of growths similar to the growth currently being planned. This family of growths is used to train the Artificial Neural Network Process Model (VII) 544. Once trained, the Process Model recommends process inputs, including the recipe, to obtain the desired product qualities.

The database and Database Preprocessor are built from DBASE II and currently run on a Sun Sparc Workstation. The wafer characterization data and growth data is input manually. DBASE II has the facility to sort the data sets to find the appropriate family of data matching the next planned growth run. The Artificial Neural Network Process Model is implemented in the commercial software package CAD/Chem by AIWARE, Inc. A functional link network with one hidden layer containing 10 processing units is used. The operator selects the sorting algorithm for the Database Preprocessor. The operator also supervises the training of the Artificial Neural Network. The Network makes control input recommendations which the operator notes and inputs into the Growth Recipe Editor (VI) 546. Eventually this connection will be automatic. The operator will review what the Network recommends and make adjustments where necessary.

To test the Artificial Neural Network Process Model, it was asked to predict product qualities given a set of process inputs. A Network was trained with data from a family of 13 growths of bulk, silicon doped, GaAs. The model was used to predict the layer thickness and mobility of 5 other growths of bulk, silicon doped, GaAs. The Mean Absolute Percent Error for layer thickness was 11.79% and the Mean Absolute Percent Error for mobility was 7.52%. A portion of this error is due to the accuracy limitations of the characterization techniques used to compile the training set. For instance, the accuracy of the Photo Hall Measurement which is used to determine the mobility is 5%. The size of the training set is very important; a larger training set will reduce the error. Selection of a complete set of inputs is also very important. For example, an input that reflects the quality of the substrate is currently not included. Assuming all substrates are of equal quality may not be sufficient. Also, the temporal variation of the command inputs is not included. A variation due to a power surge cannot be represented by the input set. A lack of significant temporal variation is assumed.

The Ex Situ Loop will be most effective when one MBE machine is used to develop a new material system during a short period of time. Eventually, full implementation of the Ex Situ loop should allow for rapid convergence to appropriate growth conditions for new material systems that have not previously been grown by MBE.

Together the Inner Loop, Self-Directed Control Loop and Ex Situ Loop form the core of a comprehensive control system for MBE, however other important modules exist. The Sensor and Actuator Interface Modules, Ion Gauge Interface Module (X), PID Controller Interface (XI), Shutter Interface (XII), Cryoshroud Interface (XIII) and Ellipsometer Interface (XIV) handle all communication with the MBE machine.

The Datalogger Module provides plots of the last thirty minutes of data viewable in five minute segments for any signal desired as shown in FIG. 13. The principle function of the Datalogger(X) is MBE process data logging. This module is operator configured to store all data received by it in a compressed binary file that can be later viewed by the DataReader Module and exported as needed to several different formats for post analysis by either MATLAB by Mathworks, Inc, Mathematics by Wolfram Research, Inc. or Excel by Microsoft, Inc.

Implementation

The System is written in Symantec's Think C, Version 5.0 on a Macintosh IIfx. Each module is written as an independent application which enables shorter design cycles and simpler program troubleshooting over one large program containing all the modules. Communication between modules is through the Macintosh inter-application communication (IAC) capability provided with System 7. Each application is able to accept user input and communicate with other applications in addition to its specific functions.

The simpler program troubleshooting extends from a consistent program design, shown in FIG. 14, that involves four basic program blocks common to all modules. An Initialization block (IB) performs basic program start-up initialization of internal data structures, and peripheral communication channels, and builds the programs unique user interface. The User Interface block (UIB) handles user input events for direct user control and passes the information in these events to specialized routines. Also the UIB displays the status of the MBE machine for a particular program and observation of the programs operation. The "Inter-Application Communication" Block (IAC) block handles the transmission of data and commands to and from all of the other multi-tasking programs in the MBE control system. The Execution block (EB) is the unique function of the particular program that depends on the initialization, user commands, and IAC data from other programs to perform its designed task. The grouping of program function into defined blocks allows reusability of the general program functions; such as the IAC block which contains generic code to post and accept IAC transmissions.

The modular approach in the development of the MBE control system provides a protected environment for each program's unique and often complex data structures, and also provides a consistent data communication channel to any other programs required for data inter-action in the multi-tasking MBE control environment. Each module is modified and debugged as a stand-alone program using simulated data to represent the external multi-tasking environment. When the module is installed as a functional unit of the MBE control system, a graphical window in its user interface provides operator control to switch off the simulated data used for debugging and establish the connections needed for data exchange with other programs. The IAC connections between the various program modules are very flexible to allow making, breaking, and re-establishing data links with any combination of programs with as many as 128 simultaneous data links. This modular design through IAC data linking allows new or enhanced program modules to be incorporated into the MBE system as simple as loading the program and establishing the links. These links can provide a program's unique data to other programs within 1.5 milli-seconds, and if a program requires another program to reply to a special request, the reply is available in 30 milli-seconds on a Macintosh IIfx. Specific data flow through the system achieves better organization during special sequences of the MBE operation, such as during set-up, tuning, calibration, or growth, by having non-involved program modules idle.

The user communicates to the MBE Control System using menu s and buttons. For example, menu items exist to start, pause and exit the setup and growth procedures. A shutter button opens and closes the shutter. The setpoint can be input by selecting the setpoint text edit box and typing. Other parameters listed in the PID Control window can be changed similarly. Each application contains configuration menus which enable the user to tailor the application to suit the situation. For instance, the user can specify the "boost temperature" and "boost time" for BEP Curve Process Identification or change communication addresses of the Eurotherm PID Controllers.

ADVANTAGES AND NEW FEATURES

The System is user-friendly, immediately providing new users a great deal of control.

The System is a complete package, integrating numerous improvements in a complementary manner.

The operator is freed from Process Identification experimentation. As a result the experiments are done more frequently. Also the accuracy of data is improved.

Effective use of the PID controllers.

Flux Setpoint Control where the computer translates the flux into a temperature using the stored BEP data.

At least an 80% reduction of shutter opening induced transients.

Improved flux stability.

Improved composition control.

A health monitor.

Real time control capability which will improve the control of the process as sensor technology becomes available.

Faster new recipe development.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

APPENDIX

TC-DOC

Function vs File Table-of-Contents
*****************************

| | | |
|---|---|---|
| BlanketWasher:: | 26 | WASHER.H |
| BlanketWasher::BlanketWasher | 30 | WASHER.CPP |
| BlanketWasher::Build | 83 | WASHER.CPP |
| BlanketWasher::CanUse | 714 | WASHER.CPP |
| BlanketWasher::ConditionBrushes | 726 | WASHER.CPP |
| BlanketWasher::DispInit | 826 | WASHER.CPP |
| BlanketWasher::Hide | 855 | WASHER.CPP |
| BlanketWasher::MakePush | 862 | WASHER.CPP |
| BlanketWasher::Max | 931 | WASHER.CPP |
| BlanketWasher::Maxed | 938 | WASHER.CPP |
| BlanketWasher::Min | 947 | WASHER.CPP |
| BlanketWasher::TestActivity | 84 | WASHER.H |
| BlanketWasher::Touched | 1137 | WASHER.CPP |
| BlanketWasher::UpdateSetup | 1163 | WASHER.CPP |
| BlanketWasher::WashBlankets | 1171 | WASHER.CPP |
| BlanketWasher::runIO | 954 | WASHER.CPP |
| BlanketWasher::~BlanketWasher | 73 | WASHER.CPP |
| Button:: | 21 | BUTTONS.H |
| Button::Button | 31 | BUTTONS.CPP |
| Button::Light | 130 | BUTTONS.CPP |
| Button::Off | 146 | BUTTONS.CPP |
| Button::On | 153 | BUTTONS.CPP |
| Button::Once | 162 | BUTTONS.CPP |
| Button::Set | 174 | BUTTONS.CPP |
| Button::Tag | 183 | BUTTONS.CPP |
| Button::Touched | 218 | BUTTONS.CPP |
| Button::Unlatch | 267 | BUTTONS.CPP |
| Button::draw | 57 | BUTTONS.CPP |
| Button::reDraw | 45 | BUTTONS.H |
| Button::~Button | 51 | BUTTONS.CPP |
| Dryers:: | 24 | DRYERS.H |
| Dryers::Build | 83 | DRYERS.CPP |
| Dryers::CanUse | 210 | DRYERS.CPP |
| Dryers::DispInit | 224 | DRYERS.CPP |
| Dryers::Dryers | 24 | DRYERS.CPP |
| Dryers::Hide | 241 | DRYERS.CPP |
| Dryers::MakePush | 252 | DRYERS.CPP |
| Dryers::Max | 294 | DRYERS.CPP |
| Dryers::Maxed | 302 | DRYERS.CPP |
| Dryers::Min | 312 | DRYERS.CPP |
| Dryers::TestActivity | 70 | DRYERS.H |
| Dryers::Touched | 438 | DRYERS.CPP |
| Dryers::UpdateSetup | 449 | DRYERS.CPP |
| Dryers::runIO | 320 | DRYERS.CPP |
| Dryers::setInterLock | 432 | DRYERS.CPP |
| Dryers::~Dryers | 74 | DRYERS.CPP |
| FlushPipe | 22 | TP.H |
| GPoint:: | 29 | GOBJECTS.H |
| GPoint::GPoint | 48 | GOBJECTS.H |
| GRect:: | 114 | GOBJECTS.H |
| GRect::GRect | 142 | GOBJECTS.H |
| GRect::Union | 226 | GOBJECTS.H |
| GRect::contains | 234 | GOBJECTS.H |
| GRect::grow | 194 | GOBJECTS.H |
| GRect::growTo | 206 | GOBJECTS.H |
| GRect::intersect | 218 | GOBJECTS.H |
| GRect::isEmpty | 252 | GOBJECTS.H |
| GRect::move | 162 | GOBJECTS.H |
| GRect::moveTo | 178 | GOBJECTS.H |

C-DOC

| | | |
|---|---|---|
| GetKP | 32 | SFCONFIG.CPP |
| Heptad:: | 21 | HEPTAD.H |
| Heptad::Display | 36 | HEPTAD.CPP |
| Heptad::Heptad | 25 | HEPTAD.CPP |
| Heptad::LED | 122 | HEPTAD.CPP |
| Heptad::draw | 48 | HEPTAD.CPP |
| Heptad::reDraw | 131 | HEPTAD.CPP |
| KnifeSprayerFiller:: | 26 | KNIFE.H |
| KnifeSprayerFiller::Build | 113 | KNIFE.CPP |
| KnifeSprayerFiller::CanUse | 349 | KNIFE.CPP |
| KnifeSprayerFiller::DispInit | 373 | KNIFE.CPP |
| KnifeSprayerFiller::Hide | 405 | KNIFE.CPP |
| KnifeSprayerFiller::KnifeSprayer | 27 | KNIFE.CPP |
| KnifeSprayerFiller::MakePush | 416 | KNIFE.CPP |
| KnifeSprayerFiller::Max | 509 | KNIFE.CPP |
| KnifeSprayerFiller::Maxed | 520 | KNIFE.CPP |
| KnifeSprayerFiller::Min | 533 | KNIFE.CPP |
| KnifeSprayerFiller::TestActivity | 75 | KNIFE.H |
| KnifeSprayerFiller::Touched | 784 | KNIFE.CPP |
| KnifeSprayerFiller::UpdateSetup | 805 | KNIFE.CPP |
| KnifeSprayerFiller::getInterLock | 396 | KNIFE.CPP |
| KnifeSprayerFiller::runIO | 544 | KNIFE.CPP |
| KnifeSprayerFiller::~KnifeSpraye | 98 | KNIFE.CPP |
| MatrixDisplay:: | 57 | HEPTAD.H |
| MatrixDisplay::Display | 67 | HEPTAD.H |
| MatrixDisplay::MatrixDisplay | 146 | HEPTAD.CPP |
| MatrixDisplay::reDraw | 199 | HEPTAD.CPP |
| MatrixDisplay::~MatrixDisplay | 175 | HEPTAD.CPP |
| Panel:: | 79 | PANEL.H |
| Panel::DispVal | 695 | PANEL.CPP |
| Panel::Display | 663 | PANEL.CPP |
| Panel::DrawLogo | 730 | PANEL.CPP |
| Panel::Light | 849 | PANEL.CPP |
| Panel::Max | 860 | PANEL.CPP |
| Panel::Maxed | 891 | PANEL.CPP |
| Panel::Min | 897 | PANEL.CPP |
| Panel::OneShot | 929 | PANEL.CPP |
| Panel::Panel | 166 | PANEL.CPP |
| Panel::Switch | 951 | PANEL.CPP |
| Panel::Tag | 970 | PANEL.CPP |
| Panel::TempLight | 999 | PANEL.CPP |
| Panel::TempSwitch | 1010 | PANEL.CPP |
| Panel::TempTag | 981 | PANEL.CPP |
| Panel::Touched | 1020 | PANEL.CPP |
| Panel::UnLatch | 1042 | PANEL.CPP |
| Panel::addButton | 248 | PANEL.CPP |
| Panel::addLabel | 590 | PANEL.CPP |
| Panel::addMatDisp | 633 | PANEL.CPP |
| Panel::addReadOut | 648 | PANEL.CPP |
| Panel::drawMax | 766 | PANEL.CPP |
| Panel::drawMin | 807 | PANEL.CPP |
| Panel::~Panel | 204 | PANEL.CPP |
| ReadOut:: | 37 | HEPTAD.H |
| ReadOut::Display | 363 | HEPTAD.CPP |
| ReadOut::LED | 384 | HEPTAD.CPP |
| ReadOut::ReadOut | 239 | HEPTAD.CPP |
| ReadOut::char2Heptad | 287 | HEPTAD.CPP |
| ReadOut::reDraw | 393 | HEPTAD.CPP |
| ReadOut::~ReadOut | 279 | HEPTAD.CPP |
| RemoteStation | 1965 | ARCNET.CPP |
| RemoteStation:: | 22 | ARCNET.H |
| RemoteStation::ConfigIO | 72 | ARCNET.CPP |

C-DOC

| | | |
|---|---|---|
| RemoteStation::GetAnalog | 134 | ARCNET.CPP |
| RemoteStation::GetAnalogInput | 148 | ARCNET.CPP |
| RemoteStation::GetDataBlock | 207 | ARCNET.CPP |
| RemoteStation::GetDataSpace | 233 | ARCNET.CPP |
| RemoteStation::GetDigital | 289 | ARCNET.CPP |
| RemoteStation::GetInputs | 305 | ARCNET.CPP |
| RemoteStation::NetworkDog | 374 | ARCNET.CPP |
| RemoteStation::RemoteStation | 35 | ARCNET.CPP |
| RemoteStation::ResetBoard | 398 | ARCNET.CPP |
| RemoteStation::Responding | 55 | ARCNET.H |
| RemoteStation::ReverseValue | 422 | ARCNET.CPP |
| RemoteStation::SetAnalog | 454 | ARCNET.CPP |
| RemoteStation::SetAnalogOutput | 468 | ARCNET.CPP |
| RemoteStation::SetDataBlock | 506 | ARCNET.CPP |
| RemoteStation::SetDataSpace | 529 | ARCNET.CPP |
| RemoteStation::SetDigital | 556 | ARCNET.CPP |
| RemoteStation::SetIOStatus | 572 | ARCNET.CPP |
| RemoteStation::SetOutput | 609 | ARCNET.CPP |
| RemoteStation::StopProgram | 633 | ARCNET.CPP |
| RemoteStation::doIOscan | 99 | ARCNET.CPP |
| RemoteStation::~RemoteStation | 57 | ARCNET.CPP |
| Reset | 354 | SHEETFED.CPP |
| SText:: | 68 | PANEL.H |
| SText::SText | 117 | PANEL.CPP |
| SText::reDraw | 151 | PANEL.CPP |
| SText::~SText | 130 | PANEL.CPP |
| SheetFedConfig:: | 24 | SFCONFIG.H |
| SheetFedConfig::Adjust | 82 | SFCONFIG.CPP |
| SheetFedConfig::BuildTerminal | 780 | SFCONFIG.CPP |
| SheetFedConfig::Configure | 1138 | SFCONFIG.CPP |
| SheetFedConfig::Confirm | 1175 | SFCONFIG.CPP |
| SheetFedConfig::FixConfig | 1243 | SFCONFIG.CPP |
| SheetFedConfig::GetBuffer | 1332 | SFCONFIG.CPP |
| SheetFedConfig::GetDataBlock | 1455 | SFCONFIG.CPP |
| SheetFedConfig::GetID | 1490 | SFCONFIG.CPP |
| SheetFedConfig::MakeCheckSum | 1525 | SFCONFIG.CPP |
| SheetFedConfig::RecallSetup | 1539 | SFCONFIG.CPP |
| SheetFedConfig::SaveSetup | 1567 | SFCONFIG.CPP |
| SheetFedConfig::SetDataBlock | 1616 | SFCONFIG.CPP |
| SheetFedConfig::Setup | 1650 | SFCONFIG.CPP |
| SheetFedConfig::SheetFedConfig | 60 | SFCONFIG.CPP |
| SheetFedConfig::Update | 1715 | SFCONFIG.CPP |
| SheetFedConfig::Valid | 1727 | SFCONFIG.CPP |
| SheetFedConfig::~SheetFedConfig | 71 | SFCONFIG.CPP |
| SheetFeed:: | 44 | SHEETFED.H |
| SheetFeed::ChangeText | 230 | SHEETFED.CPP |
| SheetFeed::ChooseColor | 247 | SHEETFED.CPP |
| SheetFeed::ChooseFont | 285 | SHEETFED.CPP |
| SheetFeed::GetMsg | 312 | SHEETFED.CPP |
| SheetFeed::GetMsgColor | 71 | SHEETFED.H |
| SheetFeed::GetMsgFont | 72 | SHEETFED.H |
| SheetFeed::GetMsgText | 73 | SHEETFED.H |
| SheetFeed::HideMsg | 331 | SHEETFED.CPP |
| SheetFeed::SheetFeed | 29 | SHEETFED.CPP |
| SheetFeed::ShowMsg | 678 | SHEETFED.CPP |
| SheetFeed::TP_Where | 76 | SHEETFED.H |
| SheetFeed::run | 363 | SHEETFED.CPP |
| SheetFeed::runIO | 625 | SHEETFED.CPP |
| SheetFeed::~SheetFeed | 209 | SHEETFED.CPP |
| ThermoStat:: | 53 | BUTTONS.H |
| ThermoStat::Tag1 | 363 | BUTTONS.CPP |
| ThermoStat::Tag2 | 379 | BUTTONS.CPP |

C-DOC

| Symbol | Line | File |
|---|---|---|
| ThermoStat::ThermoStat | 283 | BUTTONS.CPP |
| ThermoStat::draw | 294 | BUTTONS.CPP |
| Timer:: | 20 | TIMER.H |
| Timer::Expired | 93 | TIMER.CPP |
| Timer::Set | 101 | TIMER.CPP |
| Timer::TimeRemaining | 33 | TIMER.H |
| Timer::Timer | 27 | TIMER.CPP |
| Timer::TimerInt | 108 | TIMER.CPP |
| Timer::~Timer | 76 | TIMER.CPP |
| TouchPanel:: | 59 | TP.H |
| TouchPanel::FindTP | 114 | TP.CPP |
| TouchPanel::InitTP | 208 | TP.CPP |
| TouchPanel::PanelSize | 86 | TP.H |
| TouchPanel::Pushed | 87 | TP.H |
| TouchPanel::SendCommand | 225 | TP.CPP |
| TouchPanel::SetScaling | 239 | TP.CPP |
| TouchPanel::TouchInt | 247 | TP.CPP |
| TouchPanel::TouchPanel | 43 | TP.CPP |
| TouchPanel::Where | 308 | TP.CPP |
| TouchPanel::~TouchPanel | 93 | TP.CPP |
| WasherStation:: | 62 | ARCNET.H |
| WasherStation::BlanketWasher | 694 | ARCNET.CPP |
| WasherStation::BroadcastStart | 768 | ARCNET.CPP |
| WasherStation::BroadcastStop | 822 | ARCNET.CPP |
| WasherStation::MakeProgram | 918 | ARCNET.CPP |
| WasherStation::SendGeneratorPLC | 1654 | ARCNET.CPP |
| WasherStation::SendHeaderPLC | 1695 | ARCNET.CPP |
| WasherStation::SendProgramPLC | 1742 | ARCNET.CPP |
| WasherStation::SetBit | 1839 | ARCNET.CPP |
| WasherStation::StartPLC | 1897 | ARCNET.CPP |
| WasherStation::StopPLC | 1928 | ARCNET.CPP |
| WasherStation::WasherStation | 672 | ARCNET.CPP |
| WasherStation::doIOscan | 876 | ARCNET.CPP |
| WaterLessTemperature:: | 23 | WATERLES.H |
| WaterLessTemperature::Build | 127 | WATERLES.CPP |
| WaterLessTemperature::CanUse | 583 | WATERLES.CPP |
| WaterLessTemperature::DispInit | 595 | WATERLES.CPP |
| WaterLessTemperature::Hide | 628 | WATERLES.CPP |
| WaterLessTemperature::MakePush | 635 | WATERLES.CPP |
| WaterLessTemperature::Max | 700 | WATERLES.CPP |
| WaterLessTemperature::Maxed | 707 | WATERLES.CPP |
| WaterLessTemperature::Min | 716 | WATERLES.CPP |
| WaterLessTemperature::TestActivi | 75 | WATERLES.H |
| WaterLessTemperature::Touched | 984 | WATERLES.CPP |
| WaterLessTemperature::UpdateSetu | 994 | WATERLES.CPP |
| WaterLessTemperature::WaterLessT | 49 | WATERLES.CPP |
| WaterLessTemperature::runIO | 726 | WATERLES.CPP |
| WaterLessTemperature::~WaterLess | 114 | WATERLES.CPP |
| WaterStation:: | 100 | ARCNET.H |
| WaterStation::Dcoefficients | 1972 | ARCNET.CPP |
| WaterStation::GetStatus | 2022 | ARCNET.CPP |
| WaterStation::GetTemp | 2129 | ARCNET.CPP |
| WaterStation::HeaterDelay | 2142 | ARCNET.CPP |
| WaterStation::Icoefficients | 2152 | ARCNET.CPP |
| WaterStation::Ncoefficients | 2176 | ARCNET.CPP |
| WaterStation::NewSetPoints | 2199 | ARCNET.CPP |
| WaterStation::Pcoefficients | 2207 | ARCNET.CPP |
| WaterStation::PreHeat | 2231 | ARCNET.CPP |
| WaterStation::SelectSensor | 2240 | ARCNET.CPP |
| WaterStation::SetStatus | 2247 | ARCNET.CPP |
| WaterStation::Tcoefficients | 2330 | ARCNET.CPP |
| WaterStation::WaterStation | 1964 | ARCNET.CPP |

C-DOC

WaterStation::doIOscan     1996 ARCNET.CPP
main                        700 SHEETFED.CPP
textheight                  136 PANEL.CPP

C-DOC GOBJECTS.H

```
1
2  /***************************\
3  *                            *
4  *   gobjects.h               *
5  *                            *
6  *   GPoint and GRect class ojects representing points  *
7  *   and rectangular regions in a graphics screen.      *
8  *                            *
9  *   (C) 1993 OXY-DRY CORPORATION                       *
11 *                            *
15
16 #ifndef __GObjects
17 | #define __GObjects
18 |
19 | typedef unsigned char byte;
20 | typedef unsigned short int uint;
21 |
22 | #ifndef Booleans
23 | | #define Booleans
24 | | #ifndef __TTYPES_H
25 | | | enum Boolean { False, True };
26 | | #endif              // __TTYPES_H
27 | #endif                // Booleans
28 |
29 | class GPoint
30 | {
31 | :
32 | public:
33 | :
34 | :   GPoint();
35 | :   GPoint( int X, int Y );
36 | :
37 // GPoint& operator + ( const GPoint& adder );    // vector addition
38 // GPoint& operator - ( const GPoint& subber );   // vector subtraction
39 | :   GPoint& operator += ( const GPoint& adder );// vector addition
40 | :   GPoint& operator -= ( const GPoint& subber );// vector subtraction
41 | :   Boolean operator == ( const GPoint& p ) const;
42 | :   Boolean operator != ( const GPoint& p ) const;
43 | :
44 | :   int x,y;
45 | :
46 | };
47 |
48 | inline GPoint::GPoint()
49 {
50 | }
51 |
52 | inline GPoint::GPoint( int X, int Y )
53 {
54 |    x = X;
55 |    y = Y;
56 | }
57 |
58 /*
59 inline GPoint& GPoint::operator + ( const GPoint& adder )
60 {
61 :   return GPoint( x + adder.x, y + adder.y );
62 }
```

C-DOC GOBJECTS.H

```
63
64  inline GPoint& GPoint::operator - ( const GPoint& subber )
65  {
66  :   return GPoint( x - subber.x, y - subber.y );
67  }
68 */
69 |
70 |  inline GPoint& GPoint::operator += ( const GPoint& adder )
71  {
72 |      x += adder.x;
73 |      y += adder.y;
74 ========return *this;
75 |  }
76 |
77 |  inline GPoint& GPoint::operator -= ( const GPoint& subber )
78  {
79 |      x -= subber.x;
80 |      y -= subber.y;
81 ========return *this;
82 |  }
83 |
84 |  inline Boolean GPoint::operator == ( const GPoint& p ) const
85  {
86 ====return Boolean( x == p.x && y == p.y );
87  }
88 |
89 |  inline Boolean GPoint::operator != ( const GPoint& p ) const
90  {
91 ====return Boolean( !( *this == p ) );
92  }
93 |
94 !#ifdef __ipstream
95 !
96 !inline ipstream& operator >> ( ipstream& is, GPoint& p )
97 !    { return is >> p.x >> p.y; }
98 !
99 !inline ipstream& operator >> ( ipstream& is, GPoint*& p )
100!    { return is >> p->x >> p->y; }
101!
102!#endif // __ipstream
103 |
104!#ifdef __opstream
105!
106!inline opstream& operator << ( opstream& os, GPoint& p )
107!    { return os << p.x << p.y; }
108!
109!inline opstream& operator << ( opstream& os, GPoint* p )
110!    { return os << p->x << p->y; }
111!
112!#endif // __opstream
113 |
114 |  class GRect
115 |  {
116 |  :
117 |  public:
118 |  :
119 |  :   GRect( int l, int t, int r, int b );
120 |  :   GRect( GPoint p1, GPoint p2 );
121 |  :   GRect();
122 |  :
123 |  :   void move( int dX, int dY );
124 |  :   void move( const GPoint& Vector );
```

C-DOC GOBJECTS.H

```
125|   :   void moveTo( int X, int Y );
126|   :   void moveTo( const GPoint& Anchor );
127|   :   void grow( int dX, int dY );
128|   :   void grow( const GPoint& Vector );
129|   :   void growTo( int X, int Y );
130|   :   void growTo( const GPoint& Size );
131|   :   void intersect( const GRect& r );
132|   :   void Union( const GRect& r );
133|   :   Boolean contains( const GPoint& p ) const;
134|   :   Boolean operator == ( const GRect& r ) const;
135|   :   Boolean operator != ( const GRect& r ) const;
136|   :   Boolean isEmpty();
137|   :
138|   :   int left, top, right, bottom;
139|   :
140|   };
141|
142|   inline GRect::GRect( int l, int t, int r, int b )
143|   {
144|       left   = ( ( l < r ) ? l : r );
145|       top    = ( ( t < b ) ? t : b );
146|       right  = ( ( l > r ) ? l : r );
147|       bottom = ( ( t > b ) ? t : b );
148|   }
149|
150|   inline GRect::GRect( GPoint p1, GPoint p2 )
151|   {
152|       left   = ( ( p1.x < p2.x ) ? p1.x : p2.x );
153|       top    = ( ( p1.y < p2.y ) ? p1.y : p2.y );
154|       right  = ( ( p1.x > p2.x ) ? p1.x : p2.x );
155|       bottom = ( ( p1.y > p2.y ) ? p1.y : p2.y );
156|   }
157|
158|   inline GRect::GRect()
159|   {
160|   }
161|
162|   inline void GRect::move( int dX, int dY )
163|   {
164|       left   += dX;
165|       top    += dY;
166|       right  += dX;
167|       bottom += dY;
168|   }
169|
170|   inline void GRect::move( const GPoint& Vector )
171|   {
172|       left   += Vector.x;
173|       top    += Vector.y;
174|       right  += Vector.x;
175|       bottom += Vector.y;
176|   }
177|
178|   inline void GRect::moveTo( int X, int Y )
179|   {
180|       bottom += Y - top;
181|       right  += X - left;
182|       top  = Y;
183|       left = X;
184|   }
185|
186|   inline void GRect::moveTo( const GPoint& Anchor )
```

C-DOC GOBJECTS.H

```
187 {
188 |     bottom += Anchor.y - top;
189 |     right += Anchor.x - left;
190 |     top = Anchor.y;
191 |     left = Anchor.x;
192 | }
193 |
194 | inline void GRect::grow( int dX, int dY )
195 {
196 |     right += dX;
197 |     bottom += dY;
198 | }
199 |
200 | inline void GRect::grow( const GPoint& Vector )
201 {
202 |     right += Vector.x;
203 |     bottom += Vector.y;
204 | }
205 |
206 | inline void GRect::growTo( int X, int Y )
207 {
208 |     right = left + X;
209 |     bottom = top + Y;
210 | }
211 |
212 | inline void GRect::growTo( const GPoint& Size )
213 {
214 |     right = left + Size.x;
215 |     bottom = top + Size.y;
216 | }
217 |
218 | inline void GRect::intersect( const GRect& r )
219 {
220 |     left = ( ( left > r.left ) ? left : r.left );
221 |     top = ( ( top > r.top ) ? top : r.top );
222 |     right = ( ( right < r.right ) ? right : r.right );
223 |     bottom = ( ( bottom < r.bottom ) ? bottom : r.bottom );
224 | }
225 |
226 | inline void GRect::Union( const GRect& r )
227 {
228 |     left = ( ( left < r.left ) ? left : r.left );
229 |     top = ( ( top < r.top ) ? top : r.top );
230 |     right = ( ( right > r.right ) ? right : r.right );
231 |     bottom = ( ( bottom > r.bottom ) ? bottom : r.bottom );
232 | }
233 |
234 | inline Boolean GRect::contains( const GPoint& p ) const
235 {
236 ====return Boolean(
237 |   :  p.x >= left && p.x < right && p.y >= top && p.y < bottom
238 | );
239 }
240 |
241 | inline Boolean GRect::operator == ( const GRect& r) const
242 {
243 ====return Boolean( left == r.left && top == r.top &&
244 |   :  right == r.right && bottom == r.bottom );
245 }
246 |
247 | inline Boolean GRect::operator != ( const GRect& r ) const
248 {
```

C-DOC GOBJECTS.H

```
249 ====return Boolean( !(*this == r) );
250 }
251 |
252 |   inline Boolean GRect::isEmpty()
253 {
254 ========return Boolean( left >= right | top >= bottom );
255 |   }
256 |
257!#ifdef __ipstream
258!
259!inline ipstream& operator >> ( ipstream& is, GRect& r )
260!   { return is >> r.left >> r.top >> r.right >> r.bottom; }
261!
262!inline ipstream& operator >> ( ipstream& is, GRect*& r )
263!   { return is >> r->left >> r->top >> r->right >> r->bottom; }
264!
265!#endif // __ipstream
266 |
267!#ifdef __opstream
268!
269!inline opstream& operator << ( opstream& os, GRect& r )
270!   { return os << r.left << r.top << r.right << r.bottom; }
271!
272!inline opstream& operator << ( opstream& os, GRect* r )
273!   { return os << r->left << r->top << r->right << r->bottom; }
274!
275!#endif // __opstream
276 |
277 #endif              // __GObjects
```

C-DOC KEYS.H

```
1
2  /************************\
3  *                         *
4  *   keys.h                *
5  *                         *
6  *   Constants for key codes.  *
7  *                         *
8  *   Returned by C getch() and getche() functions  *
9  *                         *
10 \************************/
11
12 /* getch() and getche() return the ASCII code for a key or one *\
13 \* of these INTRO's followed by the scan code in the next call */
14
15 #define INTROkey     0      // non ASCII keys common to all keyboards
16 #define INTRO2key    0xe0   // non ASCII keys unique to 101 keyboards
17
18 enum Keys {
19 :     BSkey = 8,           // 8
20 :     TABkey,              // 9
21 :     ENTERkey = 13,       // 13
22 :     ESCkey = 27,         // 27
23 :     NULLkey = 131,       // 3
24 :     SH_Tabkey = 143,     // 15
25 :     ALT_Qkey,            // 16
26 :     ALT_Wkey,            // 17
27 :     ALT_Ekey,            // 18
28 :     ALT_Rkey,            // 19
29 :     ALT_Tkey,            // 20
30 :     ALT_Ykey,            // 21
31 :     ALT_Ukey,            // 22
32 :     ALT_Ikey,            // 23
33 :     ALT_Okey,            // 24
34 :     ALT_Pkey,            // 25
35 :     ALT_Akey = 158,      // 30
36 :     ALT_Skey,            // 31
37 :     ALT_Dkey,            // 32
38 :     ALT_Fkey,            // 33
39 :     ALT_Gkey,            // 34
40 :     ALT_Hkey,            // 35
41 :     ALT_Jkey,            // 36
42 :     ALT_Kkey,            // 37
43 :     ALT_Lkey,            // 38
44 :     ALT_Zkey = 172,      // 44
45 :     ALT_Xkey,            // 45
46 :     ALT_Ckey,            // 46
47 :     ALT_Vkey,            // 47
48 :     ALT_Bkey,            // 48
49 :     ALT_Nkey,            // 49
50 :     ALT_Mkey,            // 50
51 :     F1key = 187,         // 59
52 :     F2key,               // 60
53 :     F3key,               // 61
54 :     F4key,               // 62
55 :     F5key,               // 63
56 :     F6key,               // 64
57 :     F7key,               // 65
58 :     F8key,               // 66
59 :     F9key,               // 67
60 :     F10key,              // 68
61 :     HOMEkey = 199,       // 71
62 :     UPkey,               // 72
```

C-DOC KEYS.H

```
 63 : PGUPkey,            // 73
 64 : LEFTkey = 203,      // 75
 65 : RIGHTkey = 205,     // 77
 66 : ENDkey = 207,       // 79
 67 : DOWNkey,            // 80
 68 : PGDNkey,            // 81
 69 : INSkey,             // 82
 70 : DELkey,             // 83
 71 : SH_F1key,           // 84
 72 : SH_F2key,           // 85
 73 : SH_F3key,           // 86
 74 : SH_F4key,           // 87
 75 : SH_F5key,           // 88
 76 : SH_F6key,           // 89
 77 : SH_F7key,           // 90
 78 : SH_F8key,           // 91
 79 : SH_F9key,           // 92
 80 : SH_F10key,          // 93
 81 : CTRL_F1key,         // 94
 82 : CTRL_F2key,         // 95
 83 : CTRL_F3key,         // 96
 84 : CTRL_F4key,         // 97
 85 : CTRL_F5key,         // 98
 86 : CTRL_F6key,         // 99
 87 : CTRL_F7key,         // 100
 88 : CTRL_F8key,         // 101
 89 : CTRL_F9key,         // 102
 90 : CTRL_F10key,        // 103
 91 : ALT_F1key,          // 104
 92 : ALT_F2key,          // 105
 93 : ALT_F3key,          // 106
 94 : ALT_F4key,          // 107
 95 : ALT_F5key,          // 108
 96 : ALT_F6key,          // 109
 97 : ALT_F7key,          // 110
 98 : ALT_F8key,          // 111
 99 : ALT_F9key,          // 112
100 : ALT_F10key,         // 113
101 : CTRL_PRTSCkey,      // 114
102 : CTRL_LEFTkey,       // 115
103 : CTRL_RIGHTkey,      // 116
104 : CTRL_ENDkey,        // 117
105 : CTRL_PGDNkey,       // 118
106 : CTRL_HOMEkey,       // 119
107 : ALT_1key,           // 120
108 : ALT_2key,           // 121
109 : ALT_3key,           // 122
110 : ALT_4key,           // 123
111 : ALT_5key,           // 124
112 : ALT_6key,           // 125
113 : ALT_7key,           // 126
114 : ALT_8key,           // 127
115 : ALT_9key,           // 128
116 : ALT_0key,           // 129
117 : ALT_minuskey,       // 130
118 : ALT_equalskey,      // 131
119 : CTRL_PGUPkey,       // 132
120 : F11key,             // 133
121 : F12key,             // 134
122 : SH_F11key,          // 135
123 : SH_F12key,          // 136
124 : CTRL_F11key,        // 137
```

C-DOC KEYS.H

```
125 :   CTRL_F12key,            // 138
126 :   ALT_F11key,             // 139
127 :   ALT_F12key,             // 140
128 :   CTRL_UPkey,             // 141
129 :   CTRL_DOWNkey = 273,     // 145
130 :   ALT_UPkey = 280,        // 152
131 :   ALT_DOWNkey = 288       // 160
132 };
```

C-DOC UART.H

```
 1 /*----------------------------------------
 2:    UART.H
 3 */
 4
 5 #ifndef _UART_H
 6 #define _UART_H
 7
 8 enum Interrupts { IRQ2 = 0x0A, IRQ3, IRQ4, IRQ5, IRQ6, IRQ7 };
 9 enum COMports { COM1 = 0x3F8, COM2 = 0x2F8, COM3 = 0x3E8, COM4 = 0x2E8,
10 :   COMA = 0x348, COMB = 0x340 };
11
12 enum UARTports {
13 :   uartRBR = 0,        // Receiver Buffer Register ( read only )
14 :   uartTHR = 0,        // Transmitter Holding Register ( write only )
15 :   uartIER = 1,        // Interrupt Enable Register
16 :   uartIIR = 2,   // Interrupt Identification Register ( read only )
17 :   uartLCR = 3,        // Line Control Register
18 :   uartMCR = 4,        // Modem Control Register
19 :   uartLSR = 5,        // Line Status Register ( read only )
20 :   uartMSR = 6,        // Modem Status Register ( read only )
21 :   uartDLL = 0,        // Divisor Latch Lsb
22 :   uartDLM = 1         // Divisor Latch Msb
23 };
24
25 const uartIER_RDA = 1;        // Receive Data Available
26 const uartIER_THRE = 2;       // Transmitter Holding Register Empty
27 const uartIER_RLS = 4;        // Receiver Line Status
28 const uartIER_MS = 8;         // Modem Status
29 const uartIIR_IID = 7;        // Interrupt IDentification bits
30 const uartIIR_None = 1;       // no interrupt from this uart
31 const uartIIR_RLS = 6;        // Receiver Line Status
32 const uartIIR_RDA = 4;        // Receive Data Available
33 const uartIIR_THRE = 2;       // Transmitter Holding Register Empty
34 const uartIIR_MS = 0;         // Modem Status
35 const uartLCR_5Bit = 0;       // 5 Data Bits
36 const uartLCR_6Bit = 1;       // 6 Data Bits
37 const uartLCR_7Bit = 2;       // 7 Data Bits
38 const uartLCR_8Bit = 3;       // 8 Data Bits
39 const uartLCR_STB = 4;        // number of STop Bits
40 const uartLCR_PEN = 8;        // Parity ENable
41 const uartLCR_EPS = 16;       // Even Parity Select
42 const uartLCR_SP = 32;        // Stick Parity
43 const uartLCR_SB = 64;        // Set Break
44 const uartLCR_DLAB = 128;     // Divisor Latch Access Bit
45 const uartMCR_DTR = 1;        // Data Terminal Ready
46 const uartMCR_RTS = 2;        // Request To Send
47 const uartMCR_Out1 = 4;
48 const uartMCR_Out2 = 8;
49 const uartMCR_Loop = 16;
50 const uartLSR_DR = 1;         // Data Ready
51 const uartLSR_OE = 2;         // Overrun Error
52 const uartLSR_PE = 4;         // Parity Error
53 const uartLSR_FE = 8;         // Framing Error
54 const uartLSR_BI = 16;        // Break Interrupt
55 const uartLSR_THRE = 32;      // Transmitter Holding Register Empty
56 const uartLSR_TSRE = 64;      // Transmitter Shift Register Empty
57 const uartMSR_DCTS = 1;       // Delta 0 Clear To Send
58 const uartMSR_DDSR = 2;       // Delta Data Set Ready
59 const uartMSR_TERI = 4;       // Trailing Edge Ring Indicator
60 const uartMSR_DDCD = 8;       // Delta Data Carrier Detect
61 const uartMSR_CTS = 16;       // Clear To Send
62 const uartMSR_DSR = 32;       // Data Set Ready
```

C-DOC UART.H

```
63 |   const uartMSR_RI = 64;          // Ring Indicator
64 |   const uartMSR_DCD = 128;        // Data Carrier Detect
65 |
66 |   #define BASE8259    0x20
67 |   #define EOI         0x20
68 |
69 #endif
```

C-DOC BUTTONS.H

```
  1
  2 /************************\
  3 *                        *
  4 *  buttons.h             *
  5 *                        *
  6 *  Push Button Graphics  *
  7 *                        *
  8 *  (C) 1993 OXY-DRY CORPORATION *
  9 *  all rights reserved   *
 10 *                        *
 11 \************************/
 12
 13 // 1993 october 10    change copyright for listing
 14
 15 #ifndef __buttons_h
 16 | #define __buttons_h
 17 |
 18 | #include <graphics.h>      // moveto(), line(), lineto(), set...
 19 | #include "gobjects.h"      // GPoint, GRect
 20 |
 21 | class Button
 22 | {
 23 | public:
 24 |   : enum ButtonState { Out, Latch, In, Release, New };
 25 |   : enum ButtonType { Momentary, Latching, Indicator };
 26 | private:
 27 |   : Boolean Pushed:1, WasPushed:1;
 28 |   : ButtonType Type;
 29 |   : char *Label;
 30 | protected:
 31 |   : ButtonState State;
 32 |   : COLORS Color;
 33 |   : font_names FONT;
 34 |   : GRect Region;
 35 |   : virtual void draw( void );
 36 | public:
 37 |   : Button( GRect& Box, ButtonType newType, char *Text = " ",
 38 |   : : font_names TextFont = SMALL_FONT );
 39 |   : ~Button();
 40 |   : COLORS Light( void );
 41 |   : void Light( COLORS NewColor );
 42 |   : Boolean Off( void );
 43 |   : Boolean On( void );
 44 |   : Boolean Once( void );
 45 |   : void reDraw( void ) { draw(); }
 46 |   : void Set( Boolean newState );
 47 |   : const char *Tag( void );
 48 |   : void Tag( const char *Text, font_names TextFont = SMALL_FONT );
 49 |   : Boolean Touched( const GPoint& Push );
 50 |   : void Unlatch( void );
 51 | };
 52 |
 53 | class ThermoStat : public Button
 54 | {
 55 |   : char buf0[6], buf1[6];
 56 |   : uint HowMany, Value[2], Which;
 57 | protected:
 58 |   : virtual void draw( void );
 59 | public:
 60 |   : ThermoStat( GRect& Box );
 61 |   : void Tag1( uint Value );        // display set point
 62 |   : void Tag2( uint Large, char *Value0, char *Value1 );// temp & time
```

C-DOC BUTTONS.H

```
63 |   :   void Tag2( uint Large, uint Value0, uint Value1 );// display sensors
64 | };
65 |
66 #endif                        // __buttons_h
```

C-DOC HEPTAD.H

```
1
2 /*************************\
3 *                          *
4 *   heptad.h               *
5 *                          *
6 *   Seven Segment Display Graphic   *
7 *                          *
8 *   (C) 1993 OXY-DRY CORPORATION    *
9 *   all rights reserved    *
10 *                          *
11 \*************************/
12
13 // 1993 october 10    change copyright for listing
14
15 #ifndef __Heptad_h
16 | #define __Heptad_h
17 |
18 | #include <graphics.h>       //  moveto(), line(), lineto(), set...
19 | #include "gobjects.h"       //  GPoint, GRect
20 |
21 | class Heptad
22 | {
23 |  : COLORS OffColor, OnColor;
24 |  : GPoint Anchor, size;
25 |  : uint digit;
26 | public:
27 |  : enum { Zero, One, Two, Three, Four, Five, Six, Seven, Eight, Nine, Ten,
28 |  :   Eleven, Twelve, Thirteen, Fourteen, Fifteen, Blank, smC, lgH, smH,
29 |  :   lgJ, lgL, smN, smO, lgP, smR, lgU, smU, lgY, Minus, Equal, Degree };
30 |  : Heptad( GRect& Region, COLORS segments = RED, COLORS face = BLACK );
31 |  : void Display( uint value );
32 |  : virtual void draw( void );
33 |  : void LED( COLORS segments );
34 |  : void reDraw( void );
35 | };
36 |
37 | class ReadOut
38 | {
39 |  : char *dispBuf;
40 |  : COLORS OnColor;
41 |  : GPoint Anchor, size;
42 |  : Heptad **Digit;
43 |  : uint digits;
44 |  : uint char2Heptad( char Chr );
45 | public:
46 |  : enum OnOff { Off, On };
47 |  : ReadOut( const GRect& Frame, const GPoint& Size,
48 |  :   const uint Digits, const COLORS segments = YELLOW );
49 |  : ~ReadOut();
50 |  : char const*Display( void );
51 |  : void Display( const char *msg );
52 |  : void Display( int num );
53 |  : void LED( OnOff Lit );
54 |  : void reDraw( void );
55 | };
56 |
57 | class MatrixDisplay
58 | {
59 |  : char **dispBuf;
60 |  : COLORS OnColor;
61 |  : GPoint Anchor, size;
62 |  : uint cols, rows;
```

C-DOC HEPTAD.H

```
63 |  public:
64 |  :   MatrixDisplay( const GRect& Frame, const uint Cols,
65 |  :   :   const uint Rows, const COLORS dots = YELLOW );
66 |  :   ~MatrixDisplay();
67 ========const char **Display( void ) { return dispBuf; }
68 |  :   void Display( const char **msg );
69 |  :   void Display( uint Row, uint Col, char *msg );
70 |  :   void reDraw( void );
71 |  };
72 |
73 #endif                  //  __Heptad_h
```

C-DOC TIMER.H

```
1
2 /*************************\
3 *                         *
4 *  timer.h                *
5 *                         *
6 *  55 mS Timers           *
7 *                         *
8 *  (C) 1993 OXY-DRY CORPORATION
9        all rights reserved *
10 *                         *
11 \*************************/
12
13 // 1993 october 10    change copyright for listing
14
15 #ifndef __timer_h
16 | #define __timer_h
17 |
18 | #include "gobjects.h"        // Boolean, False, True
19 |
20 | class Timer
21 | {
22 | private:       // these members are accessible only to other members
23 |  :  static void interrupt (far *oldTimer )(...);
24 |  :  static void interrupt TimerInt(...);
25 |  :  static byte far*ActiveTimers;
26 |  :  static uint MaxTimers, far*Timers;
27 |  :  uint index;
28 | public:                // these members are availabe to all
29 |  :  Timer( uint Ticks = 0 );    // the constructor
30 |  :  ~Timer();          // the destructor
31 |  :  Boolean Expired( void );
32 |  :  void Set( uint Ticks );
33 ========uint TimeRemaining( void ) { return Timers[index]; }
34 | };
35 |
36 #endif                  // __timer_h
```

C-DOC ARCNET.H

```
 1 |
 2 | /**********************************\
 3 | *                                  *
 4 | * arcnet.h                         *
 5 | *                                  *
 6 | * class declarations for communication with remote stations over an *
 7 | * arcnet cable                     *
 8 | *                                  *
 9 | * (C) 1993, OXY DRY CORPORATION   *
10 | * all rights reserved              *
11 | *                                  *
12 | \**********************************/
13 |
14 | // 1993 october 10   change copyright for listing
15 |
16 | #ifndef __Arcnet
17 | #define __Arcnet
18 |
19 | #include "gobjects.h"
20 | #include "timer.h"
21 |
22 | class RemoteStation
23 | {
24 | :    uint GetAnalogInput( uint Station, byte Input, uint *InputValue );
25 | :    uint GetDataSpace( uint Station, uint DataBank, byte *DataSpace );
26 | :    void ResetBoard( void );
27 | :    uint ReverseValue( uint Value );
28 | :    uint SetDataSpace( uint Station, uint DataBank, byte *DataSpace );
29 | :    uint SetOutput( uint Station, byte *Output );
30 | protected:
31 | :    enum { OK, Fail };
32 | :    enum { STATUS_REG = 0x2e0, COMMAND_REG };
33 | :    enum { CLEAR_TRANS = 1, SEND_OK, TRANS_PAGE_0, RECEIVE_OK = 0x80,
34 | :      CLEAR_RECEIVE = 0x8c };
35 | :    enum { TRY_COM = 3, WAIT_COM = 100 };
36 | :    Boolean PLCactive, Responded;
37 | :    byte ADconfig[3], IOconfig[3], IObits[3];
38 | :    Timer *IOscan;
39 | :    static uint LocalID;
40 | :    uint AnaVal[24], c, RemoteID;
41 | :    virtual void doIOscan( void );
42 | :    void (RemoteStation::*doNetIOscan)( void );
43 | :    uint GetInputs( uint Station, byte *InpTab );
44 | :    uint NetworkDog( uint Station );
45 | :    uint SetAnalogOutput( uint Station, uint Analog, byte OutNum );
46 | :    uint SetIOStatus( uint Station, byte *IOstatus );
47 | public:
48 | :    enum IOtype { DigitalInput, DigitalOutput, AnalogInput, AnalogOutput };
49 | :    RemoteStation( uint StationNumber );// a construction initializer
50 | :    ~RemoteStation();        // the destructive annihilator
51 | :    void ConfigIO( uint channel, IOtype Type );
52 | :    uint GetAnalog( uint channel );
53 | :    void GetDataBlock( uint size, void *Buffer );
54 | :    Boolean GetDigital( uint channel );
55 | ========Boolean Responding( void ) { return Responded; }
56 | :    void SetAnalog( uint channel, uint Value );
57 | :    void SetDataBlock( uint size, void *Buffer );
58 | :    void SetDigital( uint channel, Boolean State );
59 | :    uint StopProgram( void );
60 | };
61 |
62 | class WasherStation : public RemoteStation
```

C-DOC ARCNET.H

```
 63 | {
 64 | :   enum { OilFault, SolventRecovery, HydrolicMotor, BWInterLock,
 65 | : :   BrushMotorA = 0, SolventPumpA, ScrubA, WipeA, BrushMotorB,
 66 | : :   SolventPumpB, ScrubB, WipeB, BrushMotorC, SolventPumpC, ScrubC, WipeC,
 67 | : :   BrushMotorD, SolventPumpD, ScrubD, WipeD, BrushMotorE, SolventPumpE,
 68 | : :   ScrubE, WipeE, BrushMotorF, SolventPumpF, ScrubF, WipeF };
 69 | :   byte Header[256], Program[480];
 70 | :   struct { uint high, low; } Generator[8];
 71 | :   uint BlanketMask, CounterPreset[16], ProgramLength, TimerPreset[16];
 72 | :   void MakeProgram( Boolean AirBars );
 73 | :   uint SendGeneratorPLC( void );
 74 | :   uint SendHeaderPLC( void );
 75 | :   uint SendProgramPLC( void );
 76 | :   uint SetBit( byte BitMask, byte ByteNumber, Boolean SetFlag );
 77 | :   uint StartPLC( void );
 78 | :   uint StopPLC( void );
 79 | protected:
 80 | :   virtual void doIOscan( void );
 81 | public:
 82 | :   WasherStation( uint StatNumber );
 83 | :   void BlanketWasher( uint Mask,
 84 | : :   uint GeneratorBlanket0Low, uint GeneratorBlanket0High,
 85 | : :   uint GeneratorBlanket1Low, uint GeneratorBlanket1High,
 86 | : :   uint GeneratorBlanket2Low, uint GeneratorBlanket2High,
 87 | : :   uint GeneratorBlanket3Low, uint GeneratorBlanket3High,
 88 | : :   uint GeneratorBlanket4Low, uint GeneratorBlanket4High,
 89 | : :   uint GeneratorBlanket5Low, uint GeneratorBlanket5High,
 90 | : :   uint GeneratorFinalShotsLow, uint GeneratorFinalShotsHigh,
 91 | : :   uint SprayerShots0, uint SprayerShots1, uint SprayerShots2,
 92 | : :   uint SprayerShots3, uint SprayerShots4, uint SprayerShots5,
 93 | : :   uint ScrubTime, uint StartToEndFinalShot, uint BrushMotorTime,
 94 | : :   uint WiperRollerTime, uint ScrubDelay, uint WiperDelay,
 95 | : :   Boolean AirBars );
 96 | :   static void BroadcastStart( void );
 97 | :   static void BroadcastStop( void );
 98 | };
 99 |
100 | class WaterStation : public RemoteStation
101 | {
102 | :   struct water {
103 | : :   byte control, output;
104 | : :   uint WR_temperature, IR_temperature,// *.02°C
105 | : :        WR_setpoint, IR_setpoint,// 0 to 4095 *.02°C
106 | : :        WR_gain, IR_gain,   // 0 to 99
107 | : :        WR_integral, IR_integral,// 1 to 999
108 | : :        WR_derivative, IR_derivative,// 0 to 999
109 | : :        WR_sampleT, IR_sampleT,// 1 to 999 *50mS
110 | : :        WR_Nsample, IR_Nsample;// 0 to 199
111 | :   } WaterStatus[8];
112 | :   uint DeadBand, HeaterDelayTime, IRErrorFactor, PreHeatTime;// °F, minutes, seconds
113 | :   uint GetStatus( water Answer[] );
114 | :   uint SetStatus( byte Mask, water waterChannel[] );
115 | protected:
116 | :   virtual void doIOscan( void );
117 | public:
118 | :   enum { InfraRed = 0x80, ThermoCouple, Off, WarmUp };
119 | :   WaterStation( uint StationNumber );
120 | :   void Dcoefficients( uint Channel,
121 | : :   uint PlateCoefficient, uint WaterCoefficient );
122 | :   uint GetTemp( uint Channel, uint Sensor );
123 | :   void HeaterDelay( uint Time );
124 | :   void Icoefficients( uint Channel,
```

C-DOC ARCNET.H

```
125 |   :   :  uint PlateCoefficient, uint WaterCoefficient );
126 |   :  void NewSetPoints( uint Channel, uint PlateTemp, uint WaterTemp );
127 |   :  void Ncoefficients( uint Channel,
128 |   :   :  uint PlateCoefficient, uint WaterCoefficient );
129 |   :  void Pcoefficients( uint Channel,
130 |   :   :  uint PlateCoefficient, uint WaterCoefficient );
131 |   :  void PreHeat( uint Time );
132 |   :  void SelectSensor( uint Channel, uint Sensor );
133 |   :  void Tcoefficients( uint Channel,
134 |   :   :  uint PlateCoefficient, uint WaterCoefficient );
135 |   };
136 |
137 #endif                    //  __Arcnet
```

C-DOC PANEL.H

```
1
2  /*****************************\
3  *                              *
4  *   panel.h                    *
5  *                              *
6  *   Generic Control Panel      *
7  *                              *
8  *   (C) 1993 OXY-DRY CORPORATION *
9  *   all rights reserved        *
10 *                              *
11 \*****************************/
12
13 // 1993 october 10   change copyright for listing
14
15 #ifndef __panel_h
16 | #define __panel_h
17 |
18 | #include <graphics.h>   // closegraph, initgraph, registerbgidriver
19 | #include "buttons.h"    // Latching & Momentary Push Buttons & Indicators
20 | #include "gobjects.h"   // GPoint, GRect
21 | #include "heptad.h"     // 7 Segment Displays
22 |
23 | extern const GPoint AFminAnchor, AKminAnchor, BWminAnchor, ClockPoint,
24 |           D1minAnchor, D2minAnchor, D3minAnchor, DispAnchor, DispSize, Key0, Key1,
25 |           Key2, Key3, Key4, Key5, Key6, Key7, Key8, Key9, KeyA, KeyB, KeyBack, KeyC,
26 |           KeyCancel, KeyD, KeyE, KeyEnter, KeyF, KeyG, KeyH, KeyI, KeyJ, KeyK, KeyL,
27 |           KeyM, KeyN, KeyNext, KeyO, KeyP, KeyPrev, KeyQ, KeyR, KeyS, KeySpace, KeyT,
28 |           KeyU, KeyV, KeyW, KeyX, KeyY, KeyZ, LargePanelSize, MaxButton2ndRow,
29 |           MaxButton3rdRow, MaxButtonCol1of3, MaxButtonCol1of4, MaxButtonCol2of3,
30 |           MaxButtonCol2of4, MaxButtonCol3of3, MaxButtonCol3of4, MaxButtonCol4of4,
31 |           MaxButtonLowRow, MaxButtonSize, MaxButtonTopRow, MaxDecButton;
32 | extern const GPoint MaxDigitSize, MaxDispOffset, MaxDispSize, MaxIncButton,
33 |           MaxIncDecSize, MaxMatDispAnchor, MaxMatDispSize, MaxPanelAnchor,
34 |           MaxPanelSize, MaxSwitchCol1of3, MaxSwitchCol1of4, MaxSwitchCol2of3,
35 |           MaxSwitchCol2of4, MaxSwitchCol3of3, MaxSwitchCol3of4, MaxSwitchCol4of4,
36 |           MaxSwitchRow, MaxSwitchSize, MaxTemp1Anchor, MaxTemp1Dec, MaxTemp1Inc,
37 |           MaxTemp1Label, MaxTemp2Anchor, MaxTemp2Dec, MaxTemp2Inc, MaxTemp2Label,
38 |           MaxTemp3Anchor, MaxTemp3Dec, MaxTemp3Inc, MaxTemp3Label, MaxTemp4Anchor,
39 |           MaxTemp4Dec, MaxTemp4Inc, MaxTemp4Label, MaxTemp5Anchor, MaxTemp5Dec,
40 |           MaxTemp5Inc, MaxTemp5Label, MaxTemp6Anchor, MaxTemp6Dec, MaxTemp6Inc,
41 |           MaxTemp6Label, MaxTemp7Anchor, MaxTemp7Dec, MaxTemp7Inc, MaxTemp7Label,
42 |           MaxTemp8Anchor, MaxTemp8Dec, MaxTemp8Inc, MaxTemp8Label, MaxTempLabel,
43 |           MaxTempSize, MaxTStext, MaxUnit10Anchor, MaxUnit10Label, MaxUnit1Anchor,
44 |           MaxUnit1Label, MaxUnit2Anchor, MaxUnit2Label, MaxUnit3Anchor,
45 |           MaxUnit3Label, MaxUnit4Anchor, MaxUnit4Label, MaxUnit5Anchor;
46 | extern const GPoint MaxUnit5Label, MaxUnit6Anchor, MaxUnit6Label,
47 |           MaxUnit7Anchor, MaxUnit7Label, MaxUnit8Anchor, MaxUnit8Label,
48 |           MaxUnit9Anchor, MaxUnit9Label, MaxUnitLabel, MaxWLanchor, MaxWLsize,
49 |           MinButtonCol1of3, MinButtonCol1of4, MinButtonCol2of3, MinButtonCol2of4,
50 |           MinButtonCol3of3, MinButtonCol3of4, MinButtonCol4of4, MinButtonLowRow,
51 |           MinButtonSize, MinButtonTopRow, MinDigitSize, MinDispOffset, MinDispSize,
52 |           MinMatDispAnchor, MinMatDispSize, MinPanelSize, MinSwitchCol1of3,
53 |           MinSwitchCol1of4, MinSwitchCol2of3, MinSwitchCol2of4, MinSwitchCol3of3,
54 |           MinSwitchCol3of4, MinSwitchCol4of4, MinSwitchRow, MinSwitchSize,
55 |           MinTemp1Anchor, MinTemp1Label, MinTemp2Anchor, MinTemp2Label,
56 |           MinTemp3Anchor, MinTemp3Label, MinTemp4Anchor, MinTemp4Label,
57 |           MinTemp5Anchor, MinTemp5Label, MinTemp6Anchor, MinTemp6Label,
58 |           MinTemp7Anchor, MinTemp7Label, MinTemp8Anchor, MinTemp8Label, MinTempLabel,
59 |           MinTempSize, MinTStext, MinUnit10Anchor, MinUnit10Label, MinUnit1Anchor,
60 |           MinUnit1Label, MinUnit2Anchor, MinUnit2Label, MinUnit3Anchor,
61 |           MinUnit3Label;
62 | extern const GPoint MinUnit4Anchor, MinUnit4Label, MinUnit5Anchor, MinUnit5Label, MinUnit6Anchor,
```

C-DOC PANEL.H

```
63 |            MinUnit6Label, MinUnit7Anchor, MinUnit7Label, MinUnit8Anchor,
64 |            MinUnit8Label, MinUnit9Anchor, MinUnit9Label, MinUnitLabel, PanelAnchor,
65 |            PanelSize, RecallPoint, SavePoint, SetupPoint, SpaceBarSize, SpMinAnchor,
66 |            StackPoint, WLminAnchor;
67 |
68 | class SText
69 | {
70 | :  char *Text;
71 | :  GPoint Center;
72 | :  uint size;
73 | public:
74 | :  SText( const GPoint& Anchor, uint Psize, char *Label );
75 | :  ~SText();
76 | :  void reDraw( void );
77 | };
78 |
79 | class Panel
80 | {
81 | :  Boolean Quit:1, Shrunk:1;
82 | :  Button **MaxButton, **MinButton;
83 | :  char *Title;
84 | :  GPoint MaxAnchor, MaxSize, MinAnchor, MinSize;
85 | :  MatrixDisplay *MaxMatDisp, *MinMatDisp;
86 | :  ReadOut *MaxReadOut, *MinReadOut;
87 | :  SText **MaxLabel, **MinLabel;
88 | :  ThermoStat **MaxTemp, **MinTemp;
89 | :  uint MaxButtons, MaxLabels, MaxTemps, MinButtons, MinLabels, MinTemps;
90 | :  void DrawLogo( GPoint& Origin, GPoint& Size );
91 | :  void drawMax( void );
92 | :  void drawMin( void );
93 | public:
94 | :  enum { MaxTextHeight = 15, MinTextHeight = 9 };
95 | :  Panel( GRect& MaxRegion, GRect& MinRegion, char* Name );
96 | :  ~Panel();
97 | :  void addButton( Boolean Maxed, Button *newButton );
98 | :  void addButton( Boolean Maxed, GRect& Frame, Button::ButtonType Type,
99 | :  :  char *Text );
100| :  void addButton( Boolean Maxed, ThermoStat *newTemp );
101| :  void addButton( GRect& MaxFrame, GRect& MinFrame,
102| :  :  Button::ButtonType Type, char *Text );
103| :  void addButton( GRect& MaxFrame, GRect& MinFrame,
104| :  :  Button::ButtonType Type, char *MaxText, char *MinText );
105| :  void addLabel( Boolean Maxed, const GPoint& Anchor, char *Label );
106| :  void addMatDisp( Boolean Maxed, MatrixDisplay *newMatDisp );
107| :  void addReadOut( Boolean Maxed, ReadOut *newReadOut );
108| :  void Display( char *Text );
109| :  void Display( ReadOut::OnOffLit );
110| :  void Display( uint Row, uint Col, char *msg );
111| :  int DispVal( void );
112| :  void DispVal( int value );
113//   void Hide( void ) { Hidden = True; }
114| :  void Light( uint index, COLORS newColor );
115| :  void Max( void );
116| :  Boolean Maxed( void );
117| :  void Min( void );
118| :  Boolean OneShot( uint index );
119//   void reDraw( void );
120| :  Boolean Switch( uint index );
121| :  void Switch( uint index, Boolean State );
122| :  void Tag( uint index, const char *Text = " ",
123| :  :  font_names TextFont = SMALL_FONT );
124| :  void TempTag( uint index, uint Value );
```

C-DOC PANEL.H

```
125|  :   void TempTag( uint index, uint Which, uint Value0, uint Value1 );
126|  :   void TempLight( uint index, COLORS newColor );
127|  :   Boolean TempSwitch( uint index );
128|  :   Boolean Touched( const GPoint& Push );
129|  :   void UnLatch( uint index );
130|  };
131|
132 #endif                  // __panel_h
```

C-DOC SFCONFIG.H

```
1
2  /*************************************\
3  *                                     *
4  *  sfconfig.h                         *
5  *                                     *
6  *  Sheet Feed Printing Press Installation and Configuration Data  *
7  *                                     *
8  *  (C) 1993 OXY-DRY CORPORATION all rights reserved  *
9  *                                     *
10 \*************************************/
11
12 // 1993 october 10    change copyright for listing
13
14 #ifndef __sfconfig
15 | #define __sfconfig
16 |
17 | #include "gobjects.h"        // Boolean
18 | #include "panel.h"           // Panel
19 |
20 // extern const uint Psize;   // height of prompt text in configuration panel
21 |
22 | extern uint GetKP( void );
23 |
24 | class SheetFedConfig
25 | {
26 | public:
27 | :  uint
28 | :     BWcycles,         // blanket washer cycle counter
29 | :     BWunits,          // blanket washer scrubbing units
30 | :     DryerUnits,       // number of installed dryers
31 | :     FillInterval,     // seconds between fillings @ 100% application
32 | :     FillTime,         // fill time in 18.2Hz ticks
33 | :     InstallerPassword, // installer's access code
34 | :     PlateCoefficientD, // differential component for ir
35 | :     PlateCoefficientI, // integral component for ir
36 | :     PlateCoefficientN, // number of samples for ir
37 | :     PlateCoefficientP, // proportional component for ir
38 | :     PlateCoefficientT,// time interval for ir samples in milliseconds
39 | :     SetupPassword,    // operator's access code
40 | :     SprayDelay,       // delay from interlock to powder application
41 | :     TempUnits,        // waterless temperature controllers
42 | :     WarmUpTime,       // air knife preheat time in ticks
43 | :     WaterCoefficientD, // differential component for tc
44 | :     WaterCoefficientI, // integral component for tc
45 | :     WaterCoefficientN, // number of samples for tc
46 | :     WaterCoefficientP, // proportional component for tc
47 | :     WaterCoefficientT,// time interval for tc samples in milliseconds
48 | :     WLHeatDelayTime,  // water less heater delay time in seconds
49 | :     WLPreHeatTime;    // water less pre heat time in minutes
50 | :  Boolean
51 | :     BWairBars:1,      // blanket washer has air bars or wiper rollers
52 | :     BW16IOs:1,        // blanket washers use 16 channel i/o boards
53 | :     EvacInstalled:1,  // air knife evacuator option
54 | :     FillerInstalled:1, // auto filler for sprayer
55 | :     KnifeInstalled:1, // air knife option
56 | :     SprayerInstalled:1; // powder application option
57 | private:
58 | :  uint index;          // saved setup array position
59 | public:
60 | :  Boolean
61 | :     BWcoater:1,       // last blanket washer unit is coater
62 | :     Dryer1Full:1,     // dryer #1 full zone switch state
```

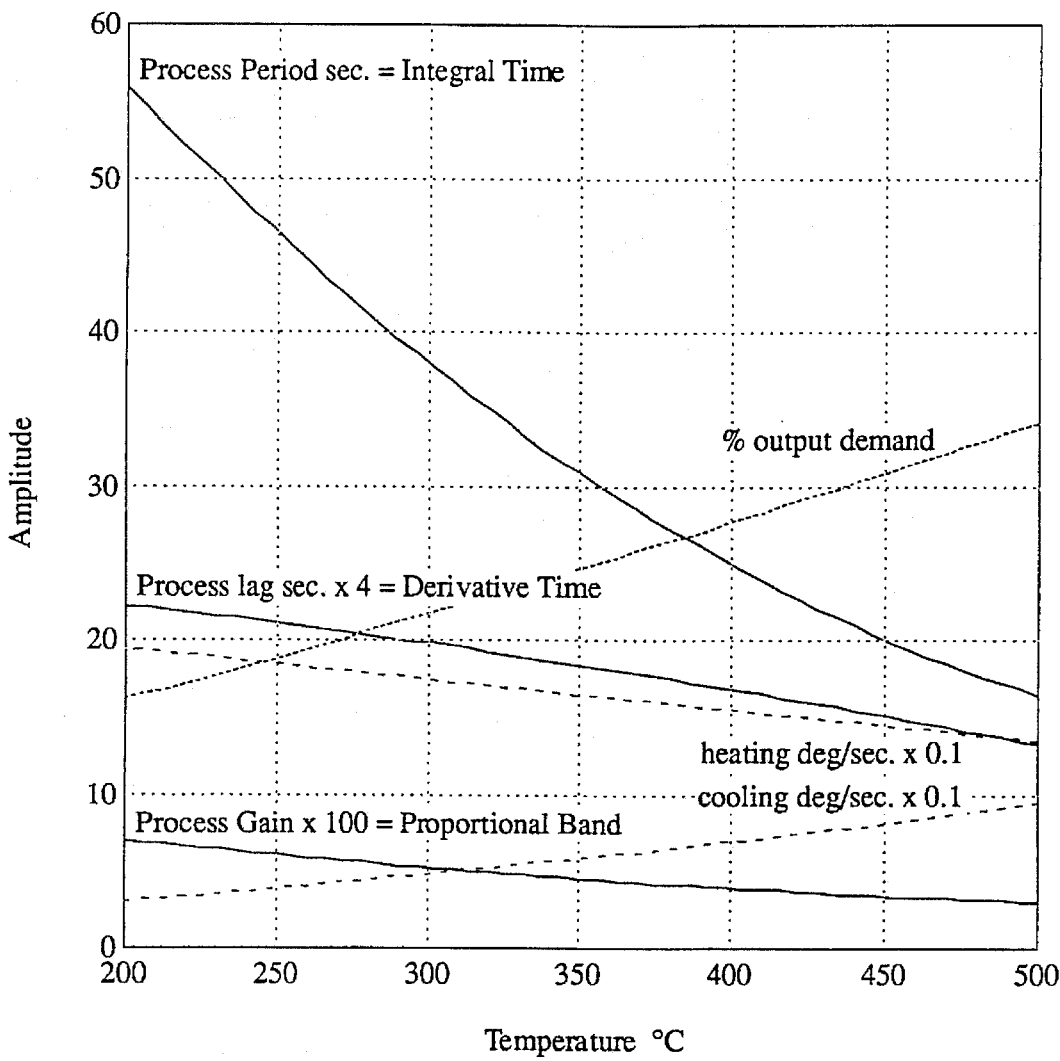

Figure 8. Trapezoidal Tuning Parametric Equations

The rising and falling rates of change, process lagtime, process period, process gain, and nominal output power demand are plotted as the process parametric equations in Figure 8. These equations are second-order least-square-estimations to the parameters acquired by trapezoidal tuning. Examination of these parameter curves shows the common tendency for a thermal process natural frequency to increase at higher temperatures. Also evident is the increased output power demand needed to offset higher thermal losses at elevated temperatures. These continuous parameter functions are saved as three coefficients of their respective second-order equations for extended use by the adaptive gain bandwidth control.

10. Conclusion.

Trapezoidal tuning and adaptive gain bandwidth control overcomes the limitations of previous tuning methods by maintaining a real parametric model of the process and utilizes this model to understand the specific needs of the process to accommodate any given demand. The adaptive gain bandwidth control is designed to recognize the dominant influence of a process for a given situation. For steady-state control, the dominant influence is process noise and load disturbances. The adaptive gain bandwidth control accommodates these factors by tuning to the process natural frequency and unity loop gain. For setpoint step changes, the dominant influence is the step change. The power amplitude of the step function and its high frequency characteristics dominate all other influences to the process during the step function. The adaptive gain bandwidth control estimates the required power change to execute the step function and the required time span needed for the process to accept the power change input.

REFERENCES (1) Åström, K. J. "Adaptive Feedback Control," Proceedings of the IEEE, Vol. 75, No. 2, February 1987.

(2) Baker, Louis, *C Tools for Scientists and Engineers*, New York: McGraw-Hill, 1989.

(3) Baker, P.H., *Computer Interface Engineering for Real-Time Systems: A Model-Based Approach*. Englewood Cliffs: Prentice-Hall, 1987.

(4) Minter, B. J., and Fisher, D. G. "A Comparison of Adaptive Controllers: Academic Vs. Industrial," American Control Conference Proceedings, 1988.

(5) Press, W. H., Flannery, B. P., Teukolsky, S. A., and Vetterling, W. T. *Numerical Recipes in C, The Art of Scientific Computing*, Cambridge: Cambridge University Press, 1989.

(6) Shinskey, F. G. "How Good are Our Controllers in Absolute Performance and Robustness?," Paper presented to United Kingdom Automatic Control Council, London, 6 March 1990.

(7) Tinham, Brian, "A New Era of Multi-Algorithm Control," Control & Instrumentation, May 1990.

(8) Wood, Dan, and Park, Jack, "Qualitative Process Discovery," SBIR final report to U.S. Air Force, Wright-Patterson AFB, Ohio, 1990.

APPENDIX "B"

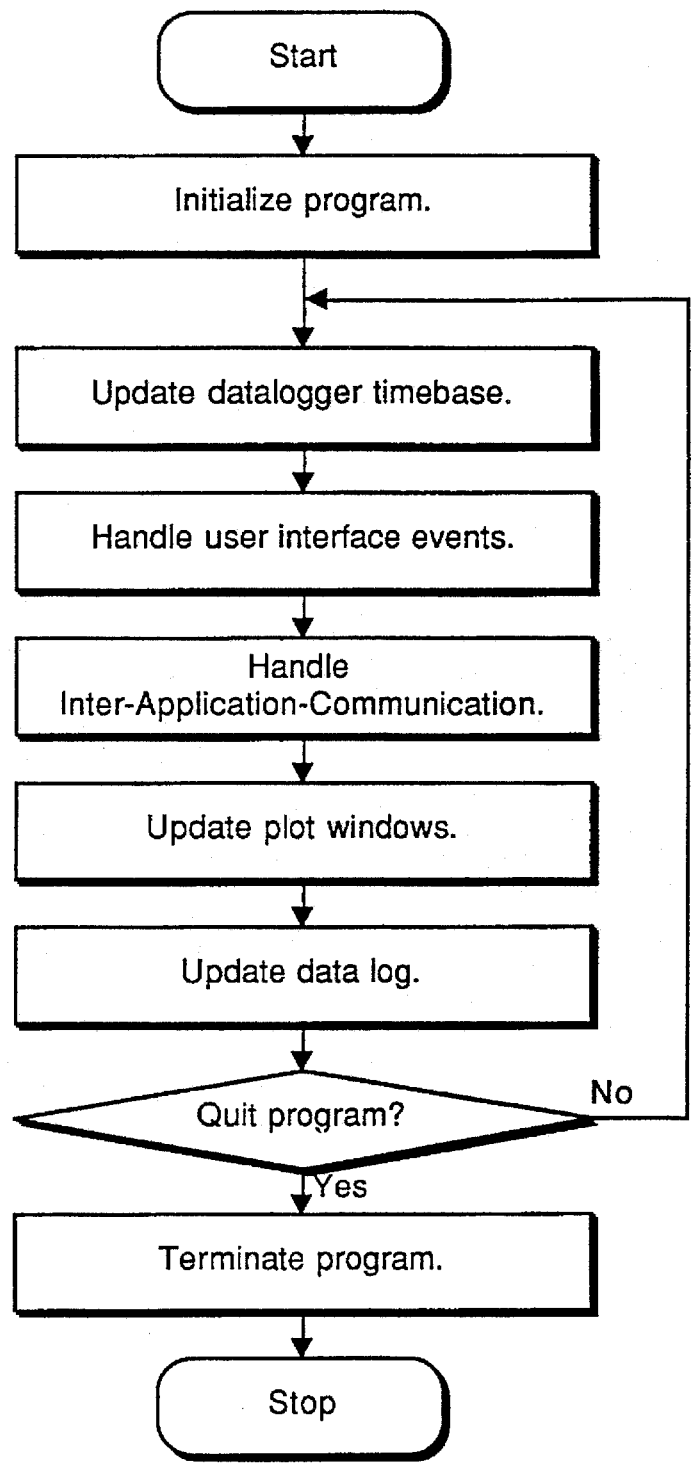
Figure B1. Data Logger Main Program Loop.

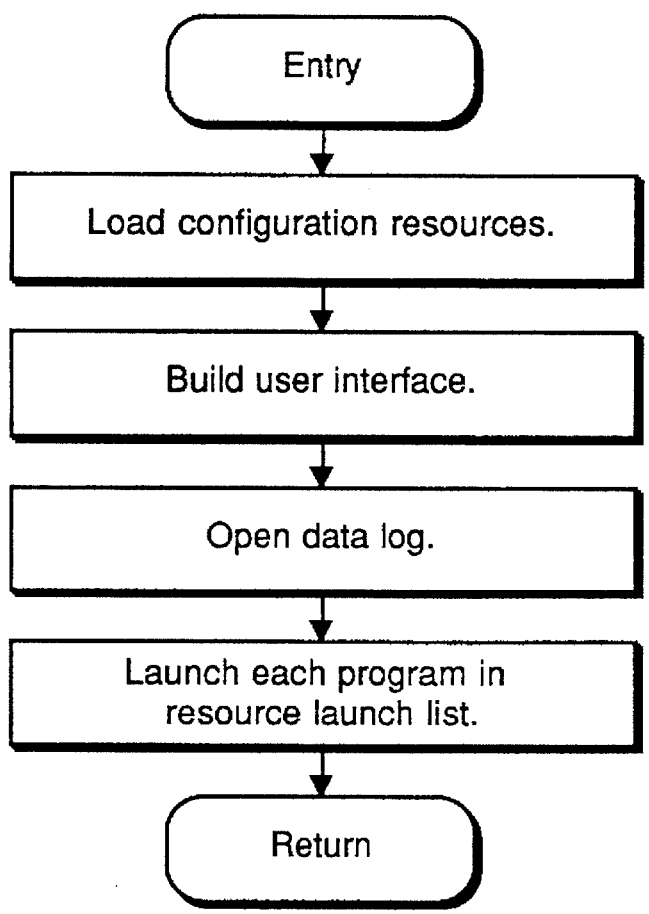
Figure B2. Initialize Program.

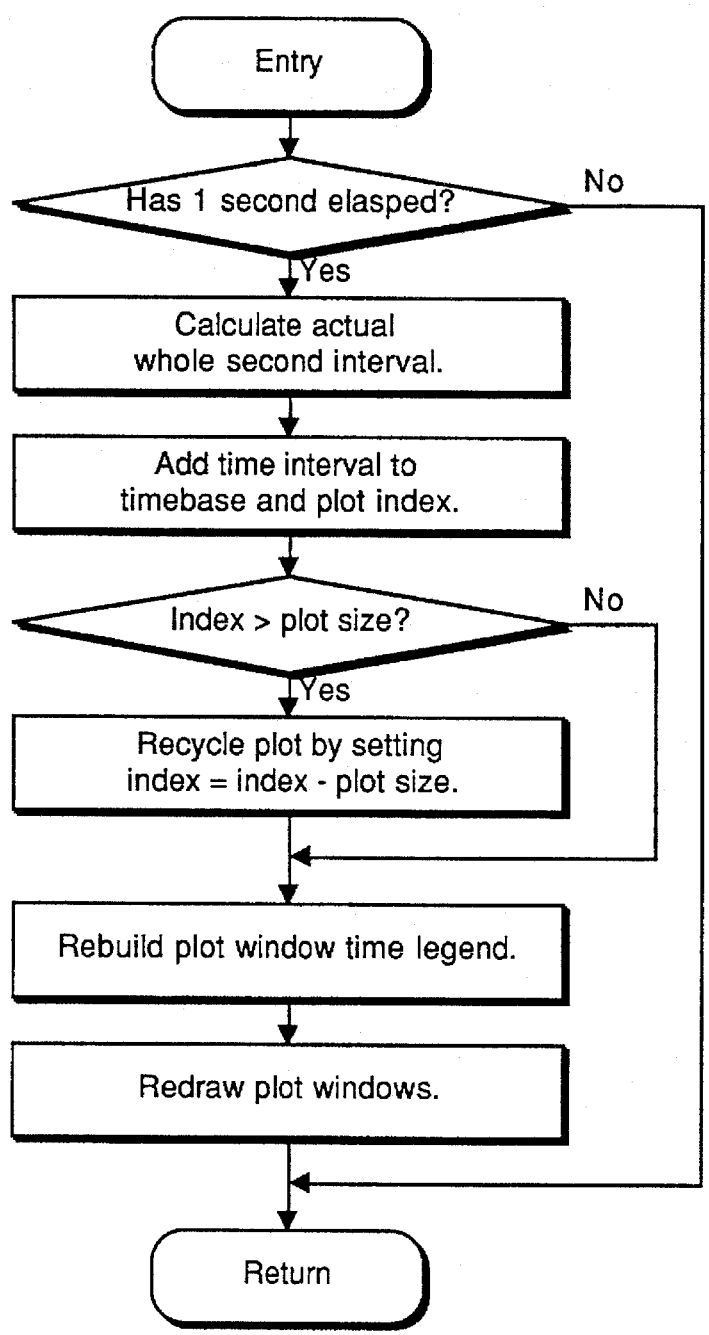
Figure B3. Update plotter-recorder timebase

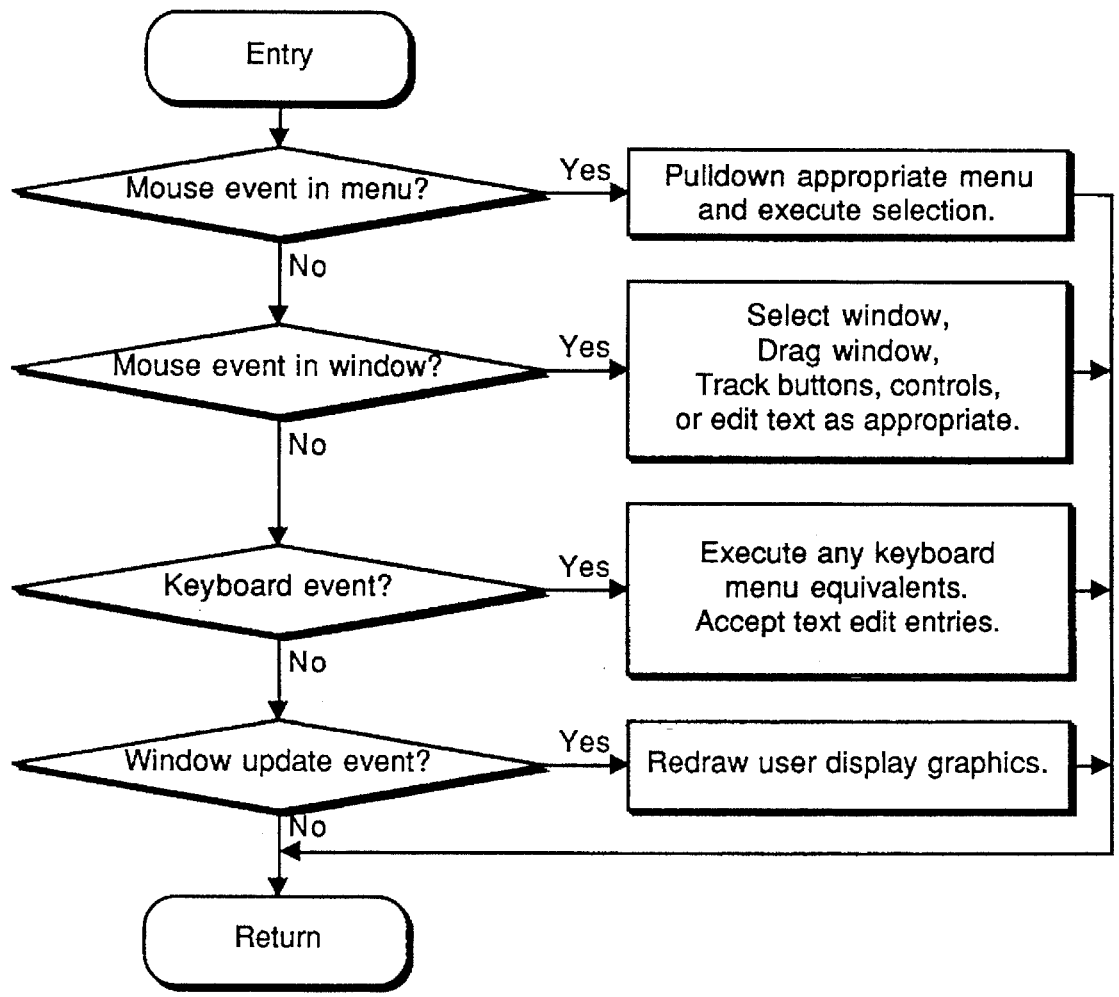
Figure B4. Handle user interface events.

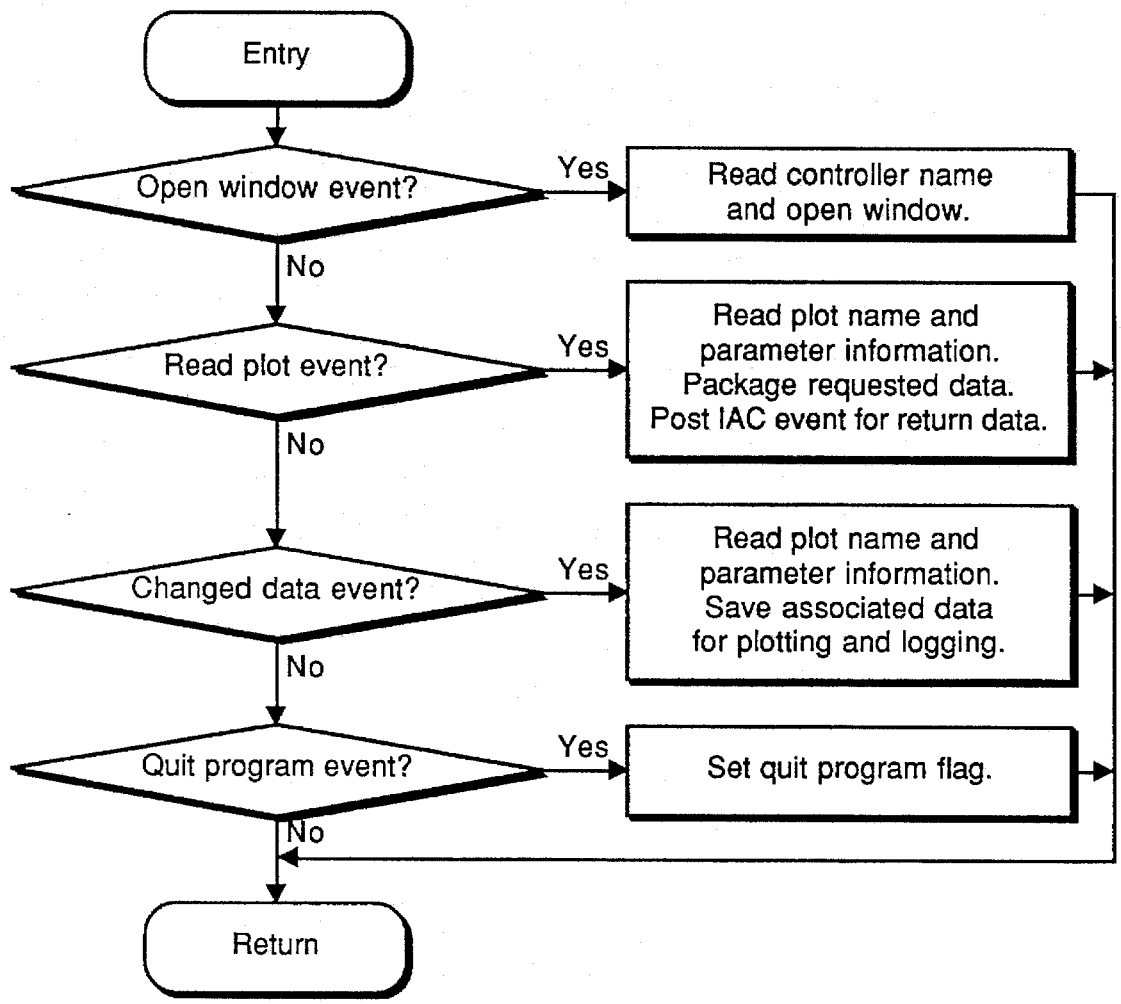
Figure B5. Handle Inter-Application-Communication.

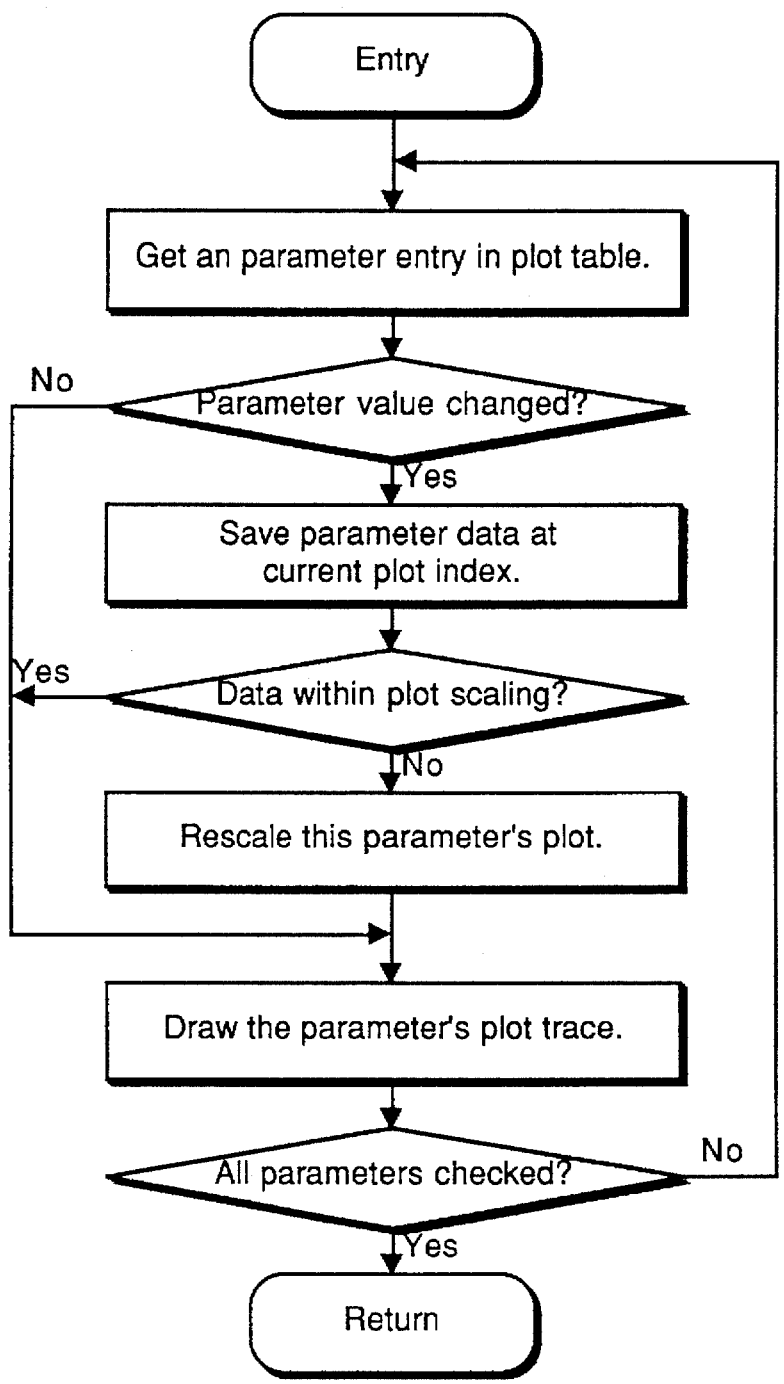
Figure B6. Update plot windows

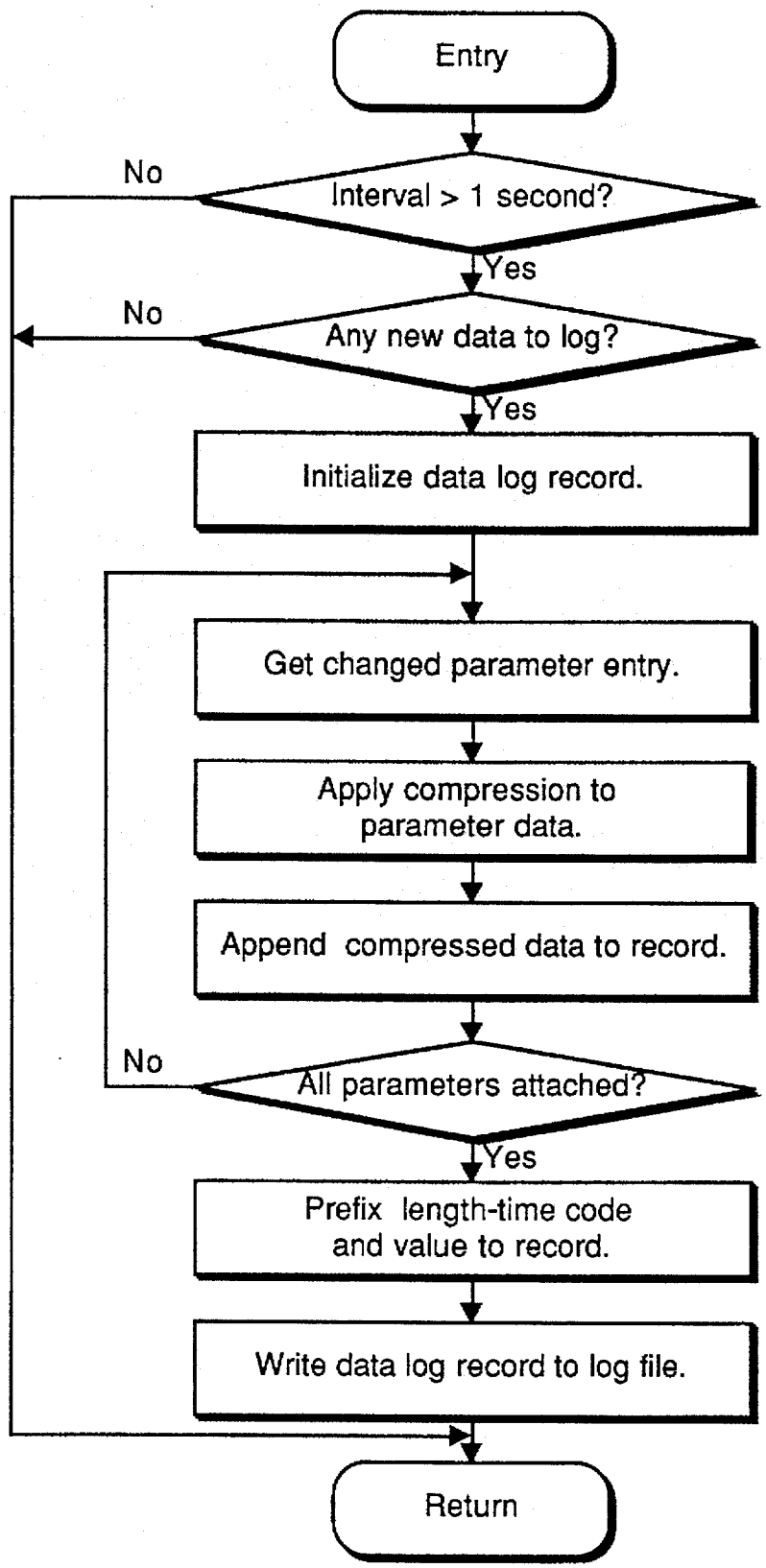
Figure B7. Update data log.

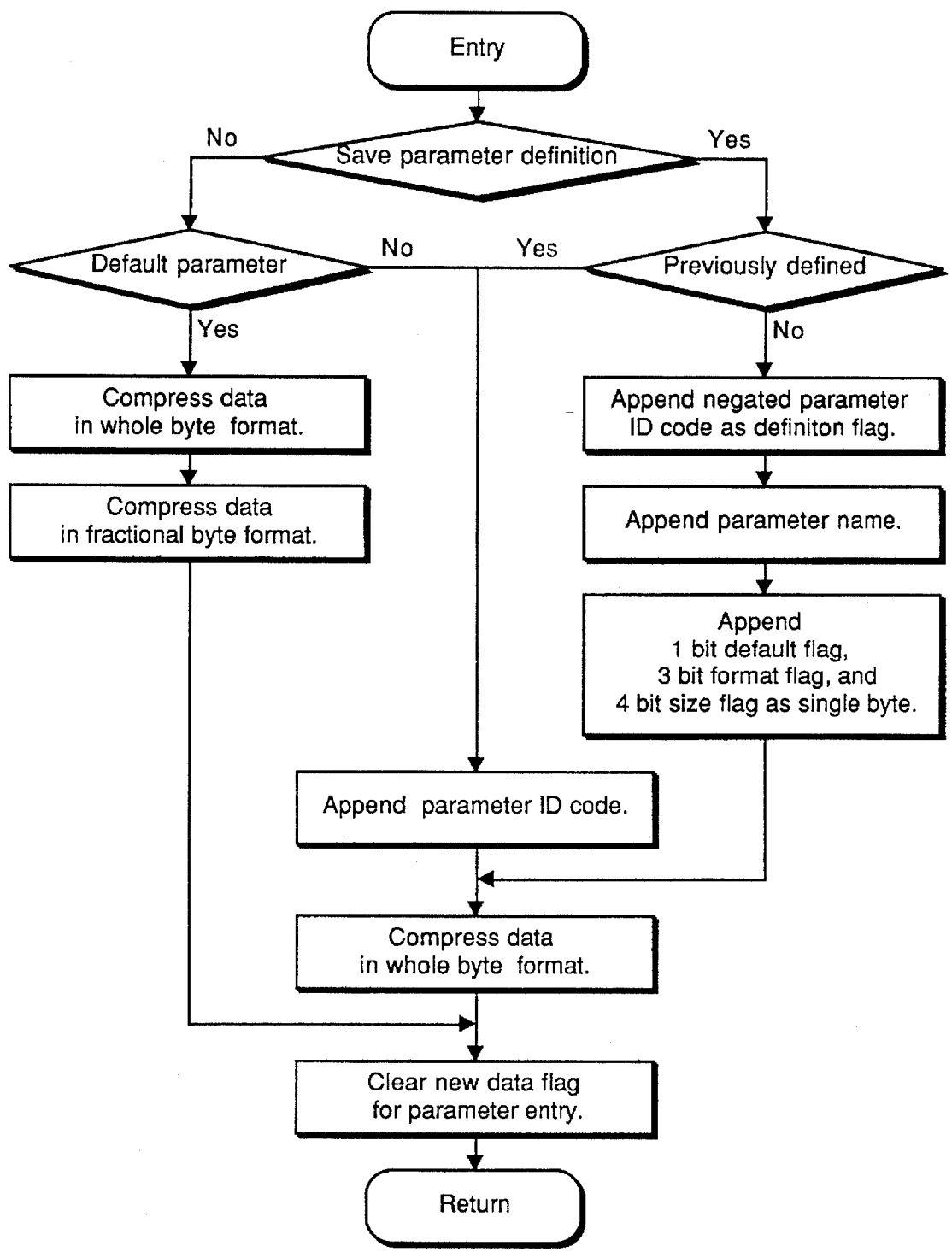
Figure B8. Apply compression to data value.

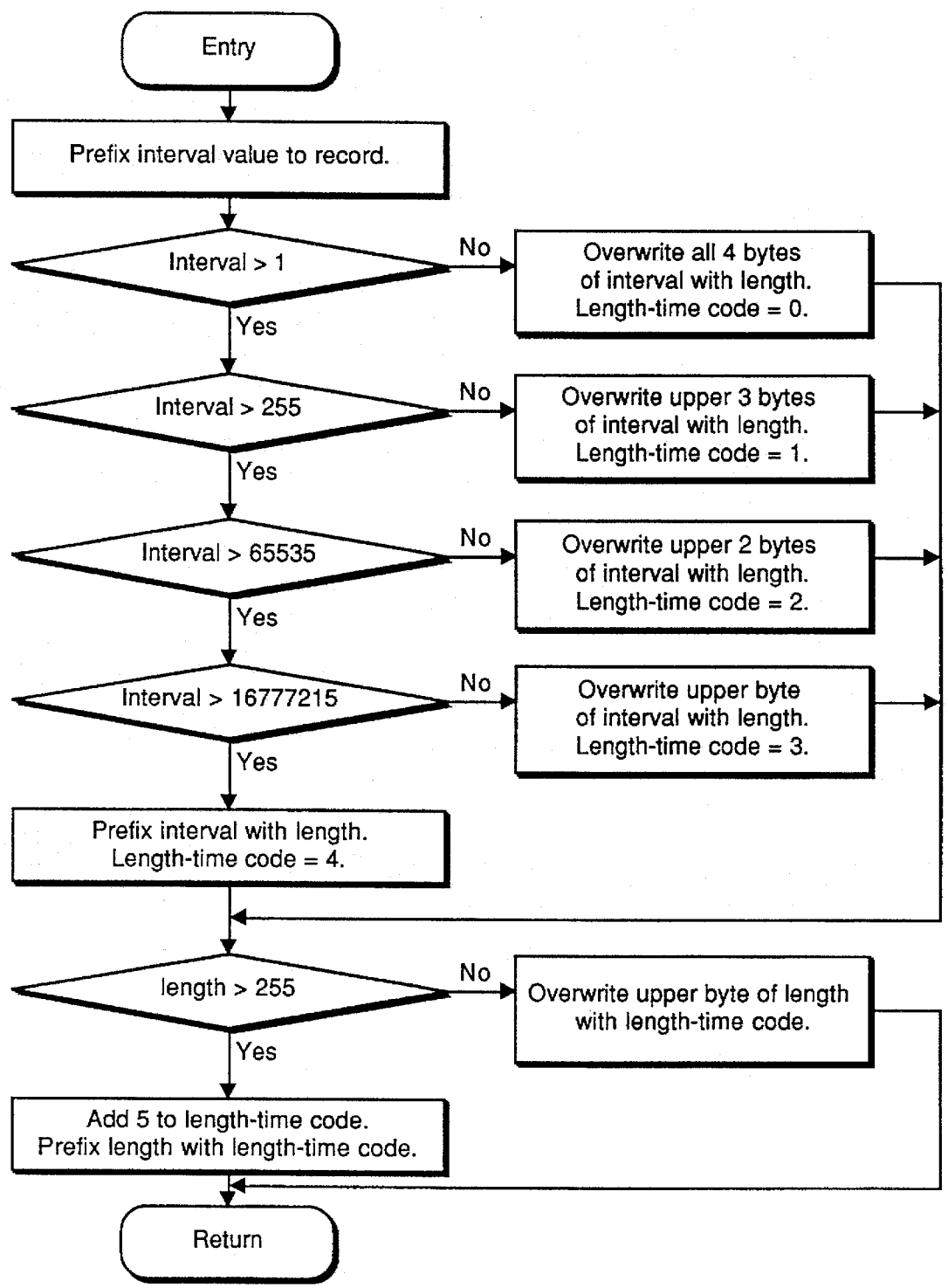
Figure B9. Prefix length-time & value to record.

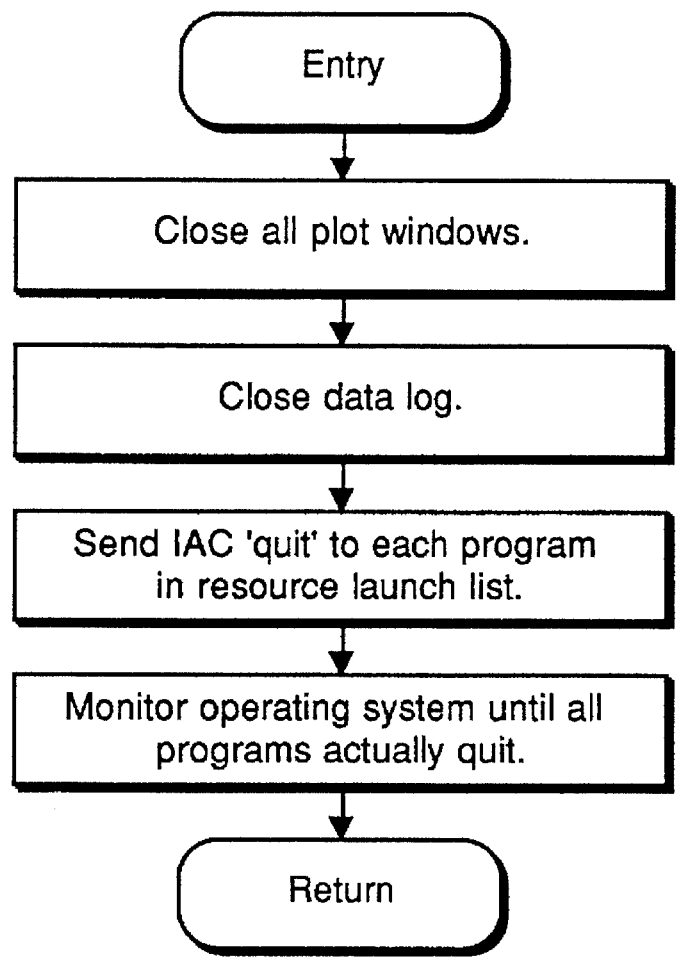
Figure B10. Terminate program.

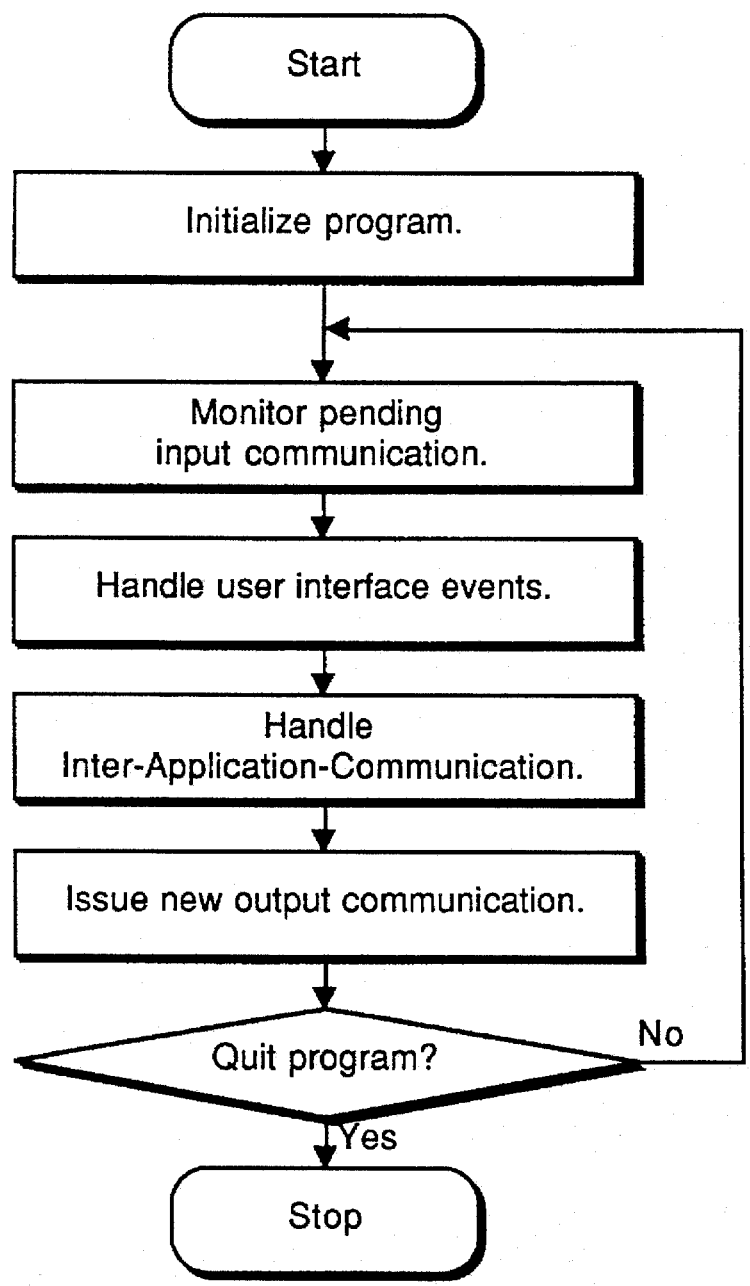
Figure B11. Eurotherm Main Program Loop.

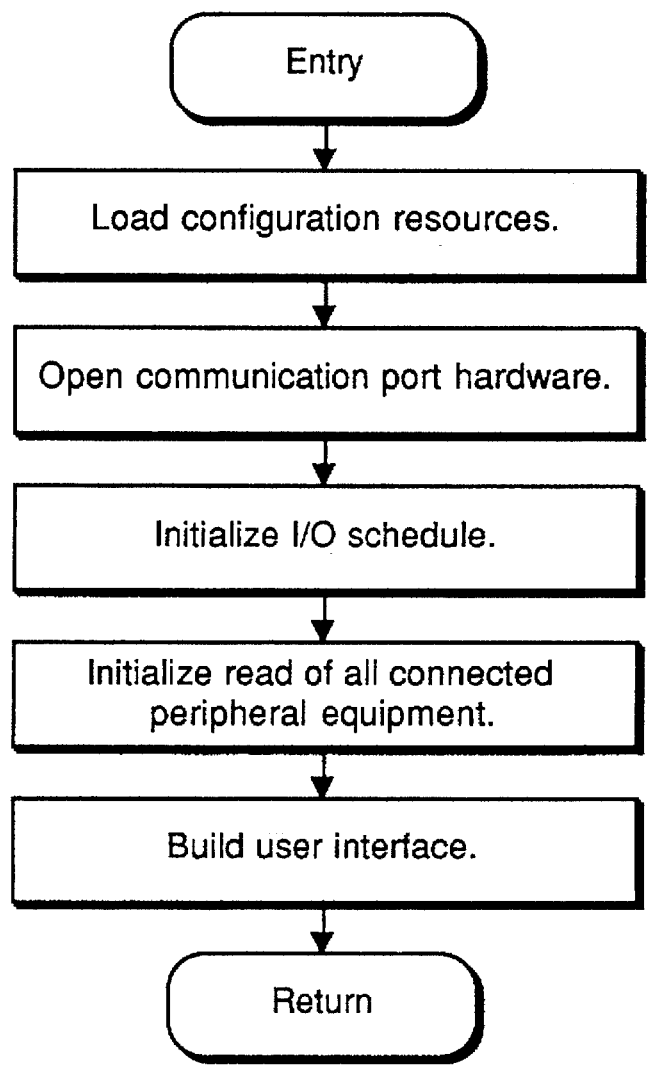
Figure B12. Initialize program.

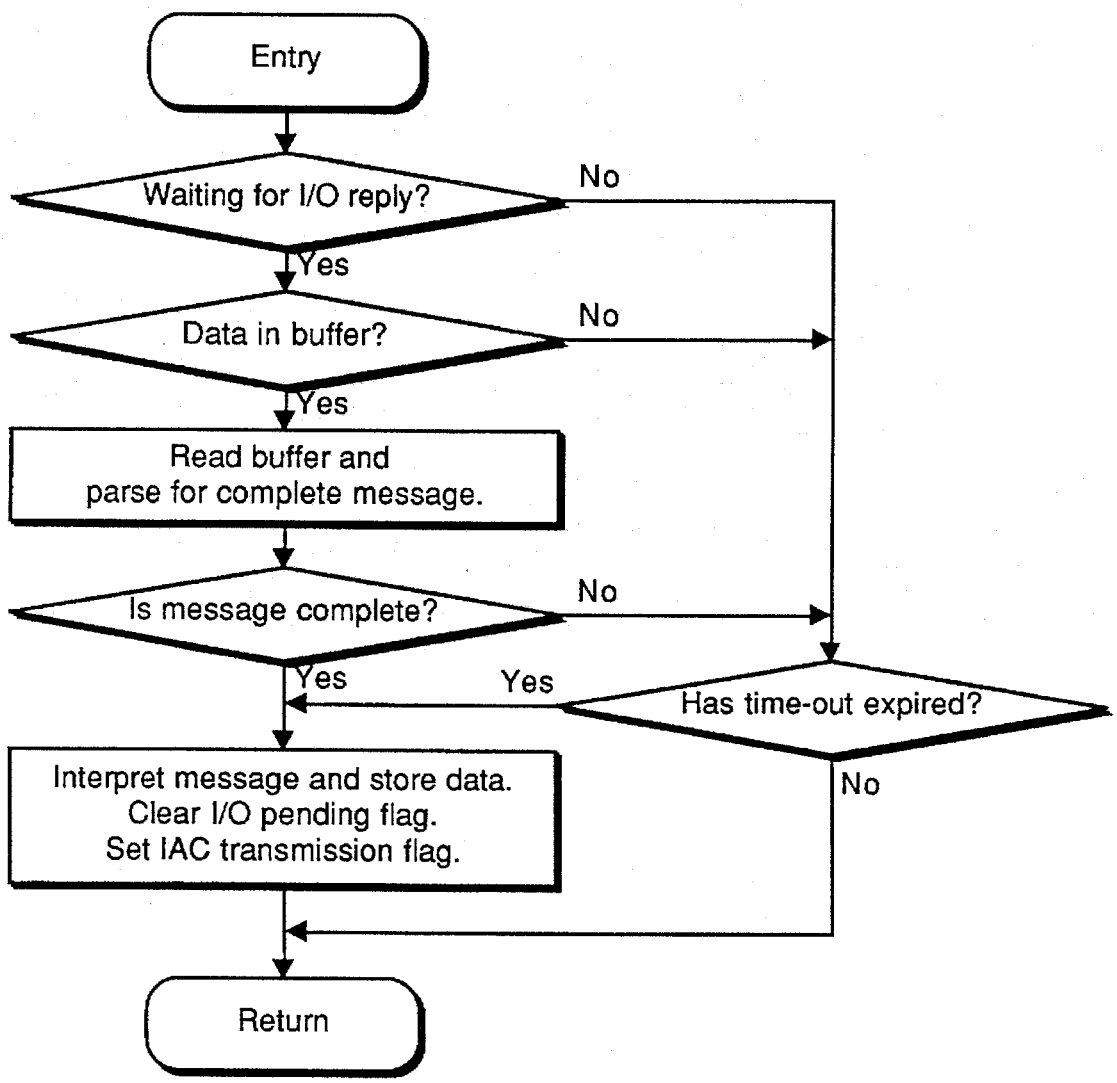
Figure B13. Monitor pending input communication.

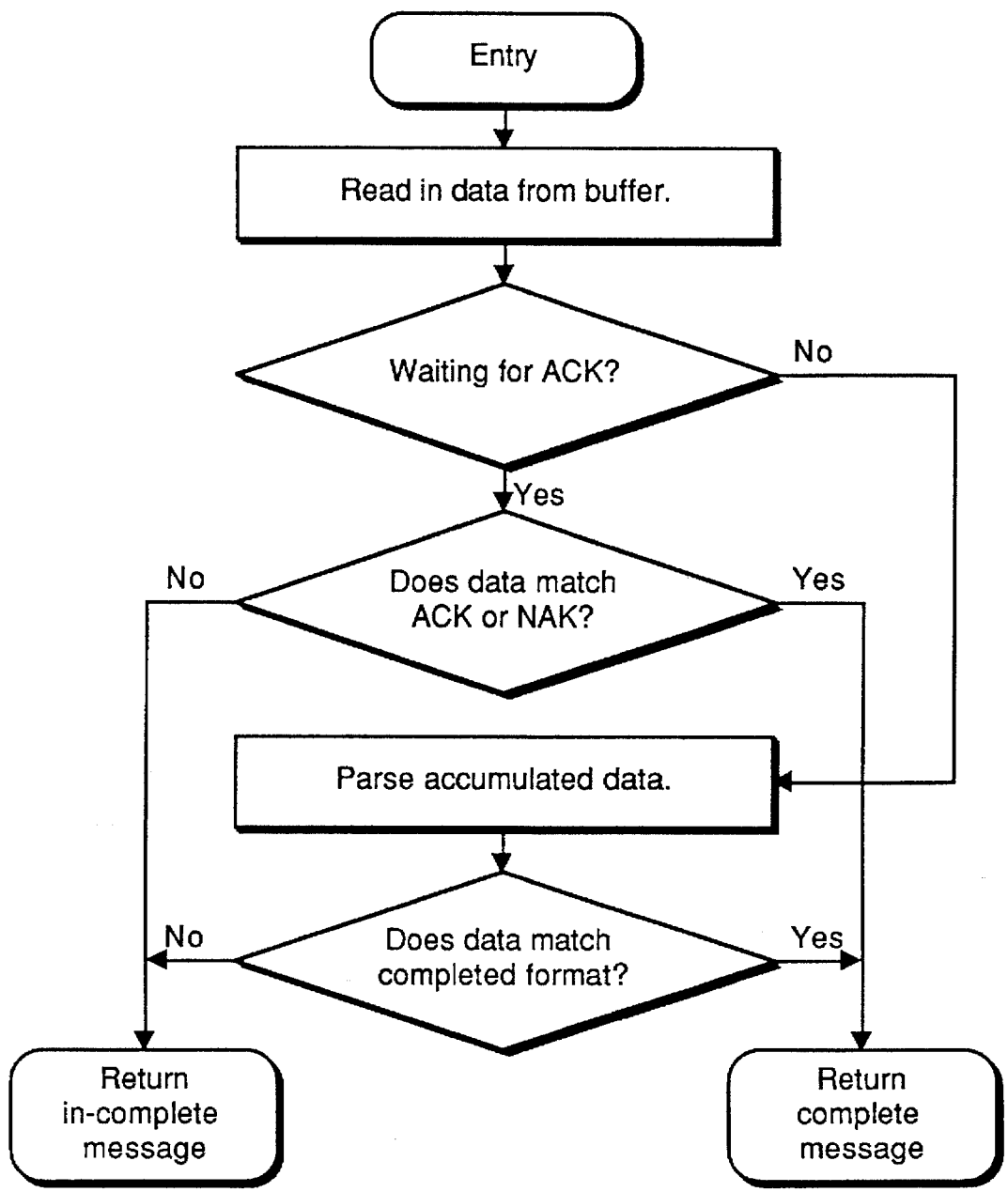
Figure B14. Read data and parse for complete message.

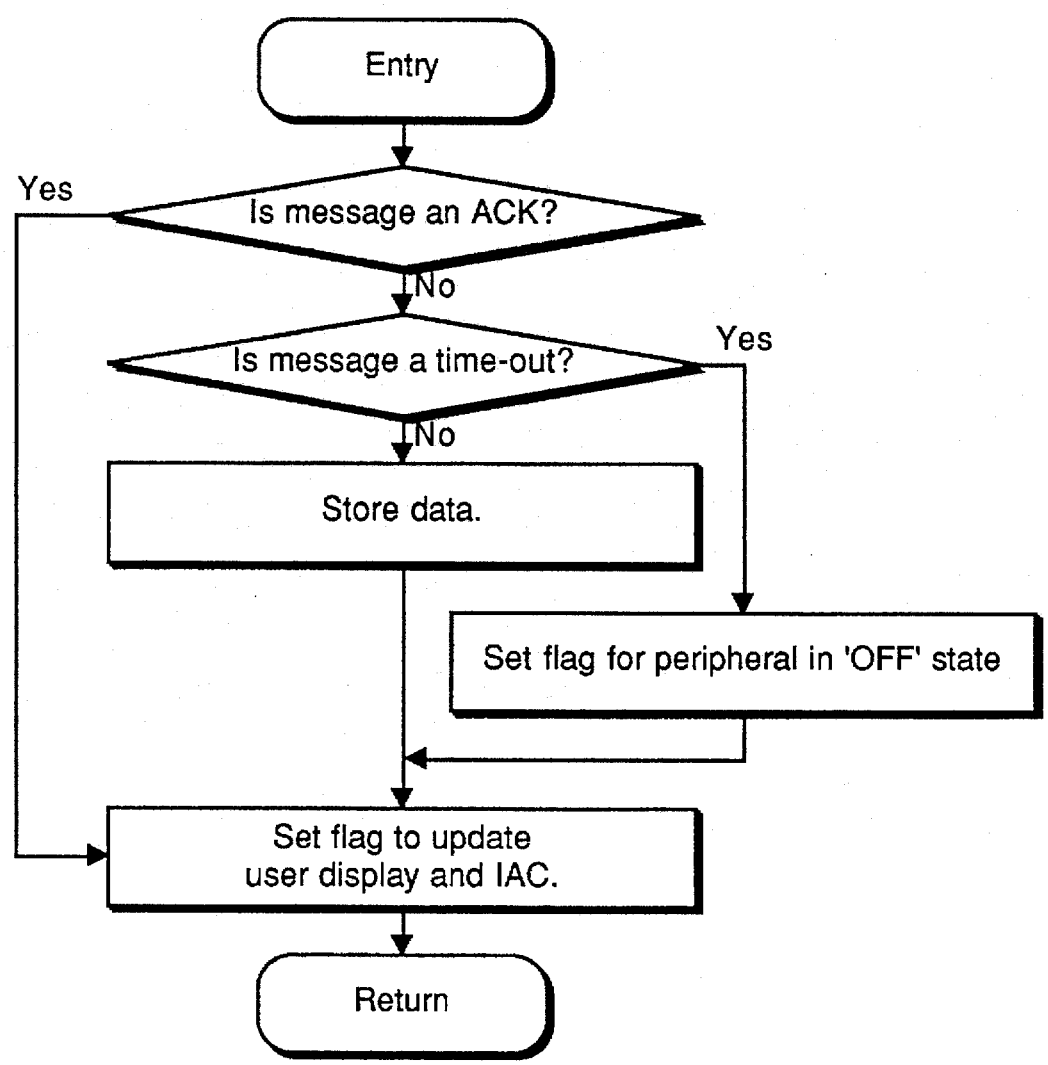
Figure B15. Interpret message, store data and clear I/O pending flag.

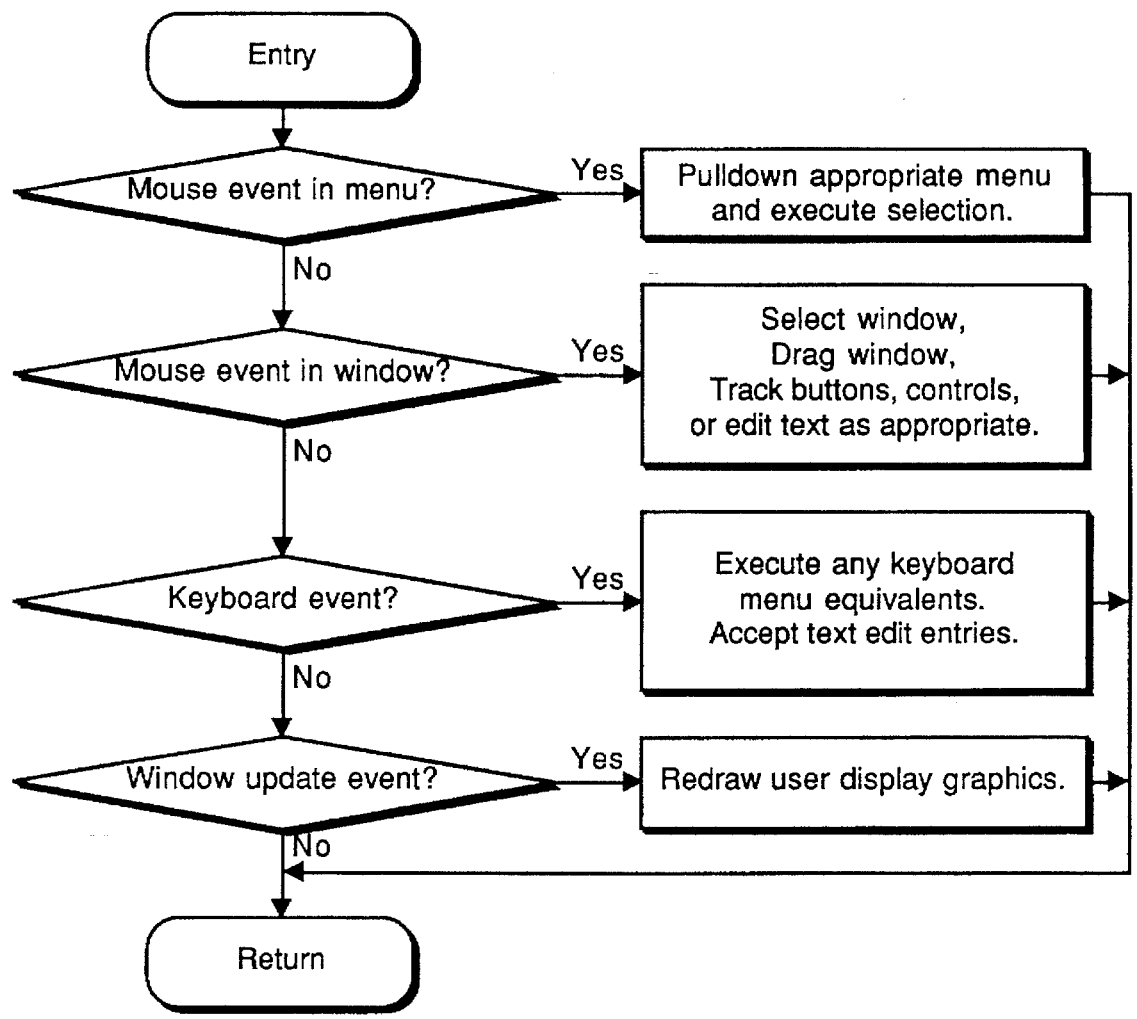
Figure B16. Handle user interface events.

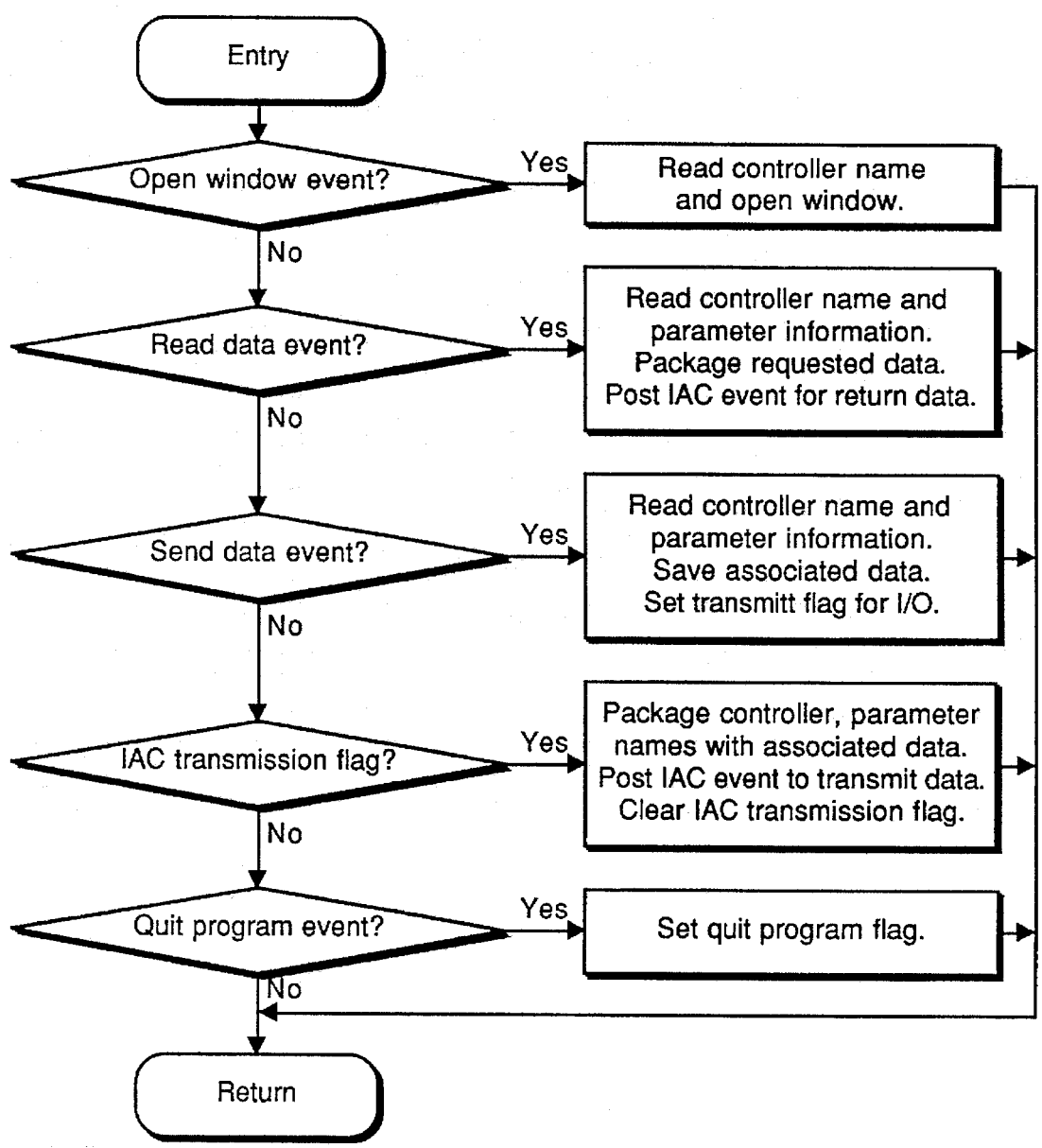
Figure B17. Handle Inter-Application-Communication.

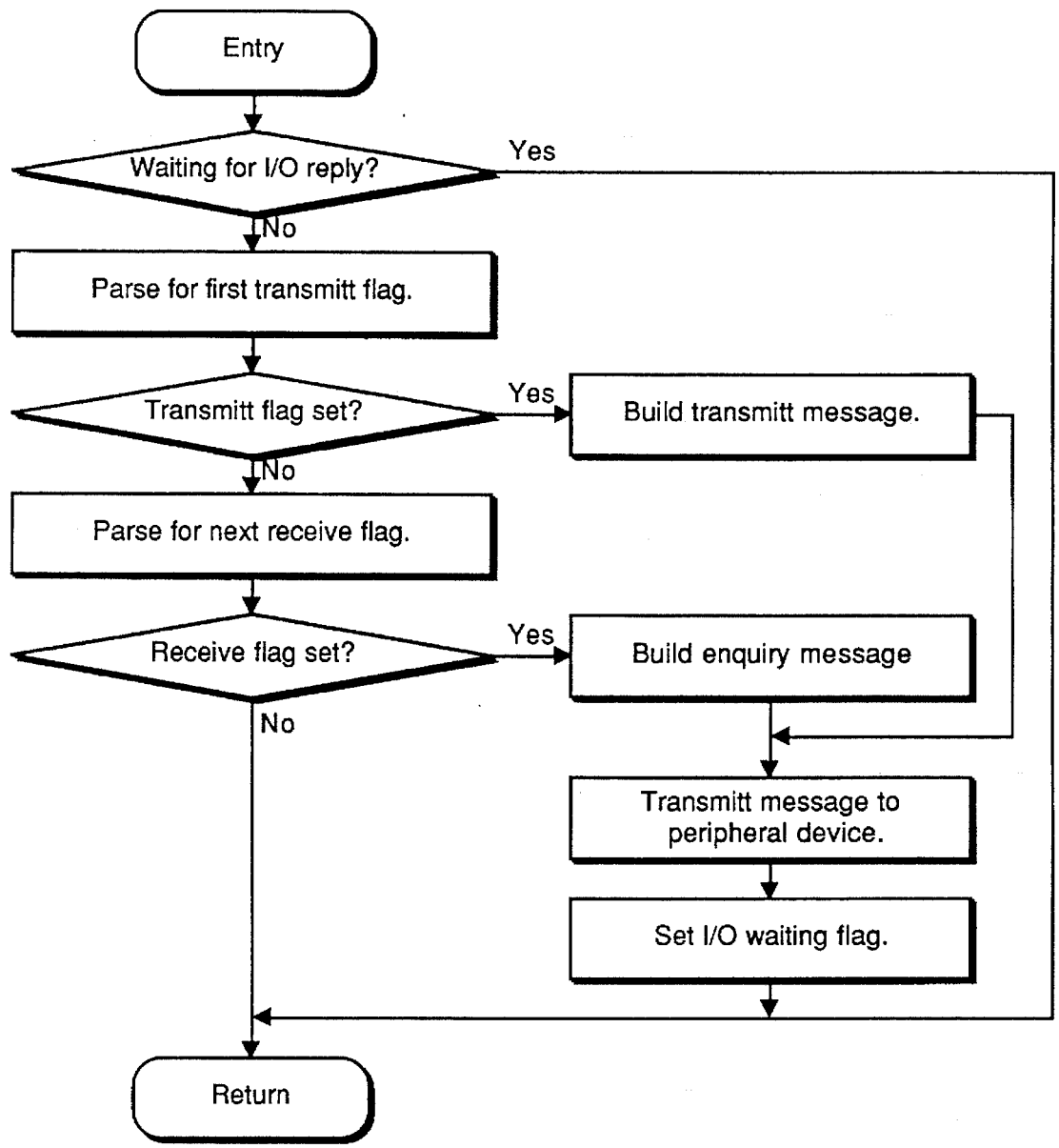
Figure B18. Issue new output communication.

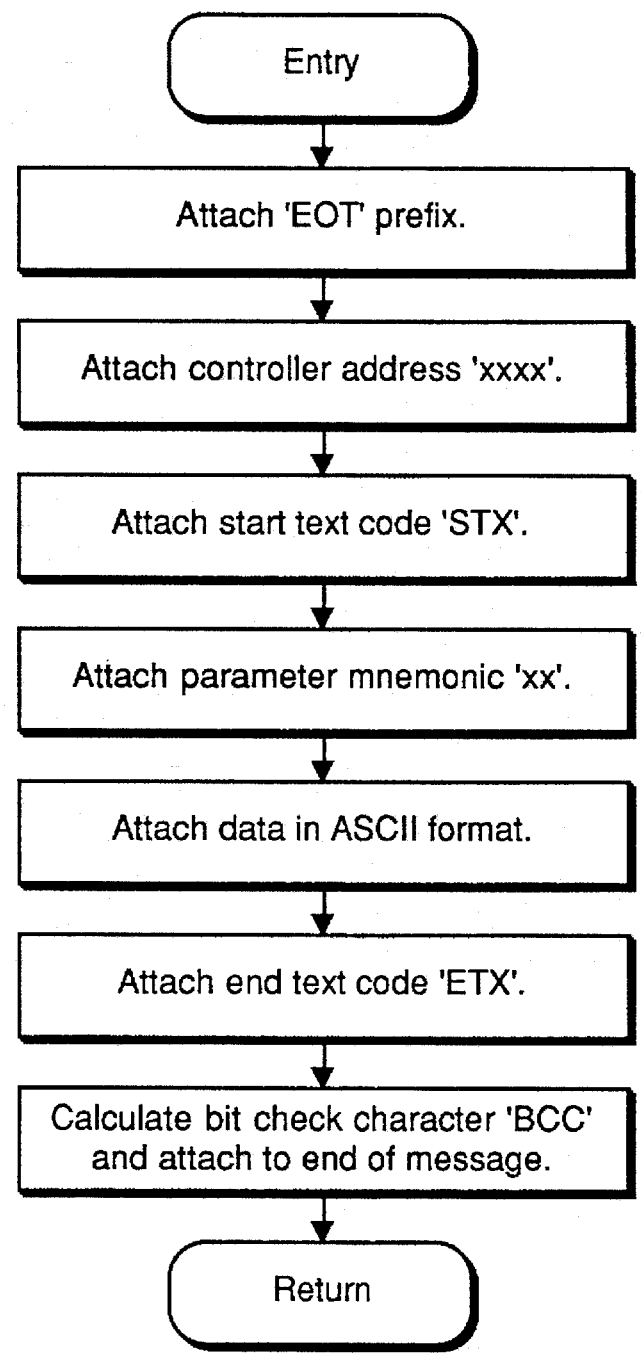
Figure B19. Build transmitt message.

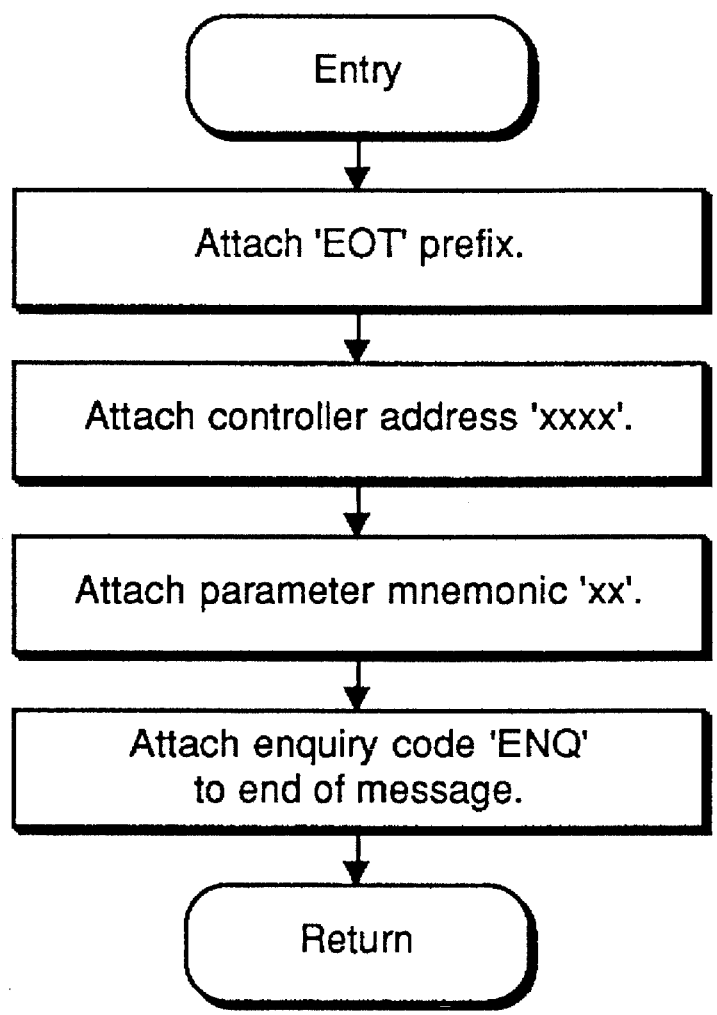
Figure B20. Build enquiry message.

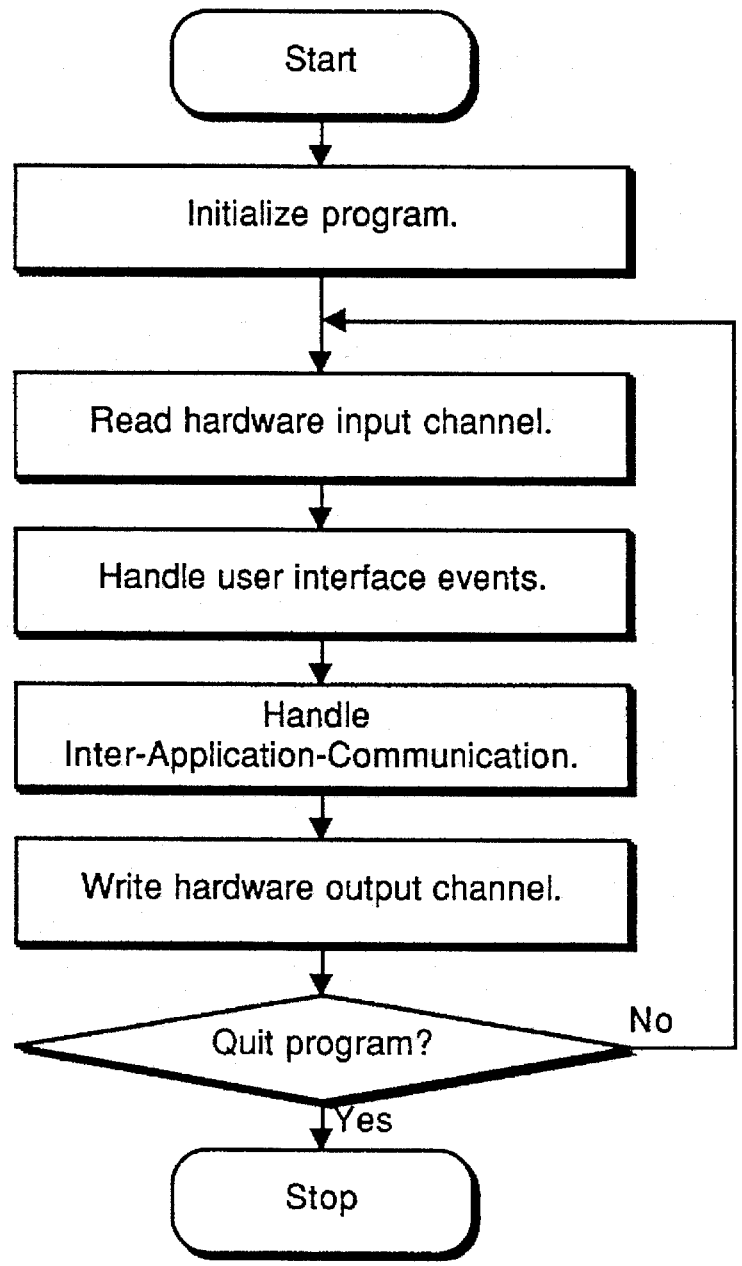
Figure B21. ShutterControl Main Program Loop.

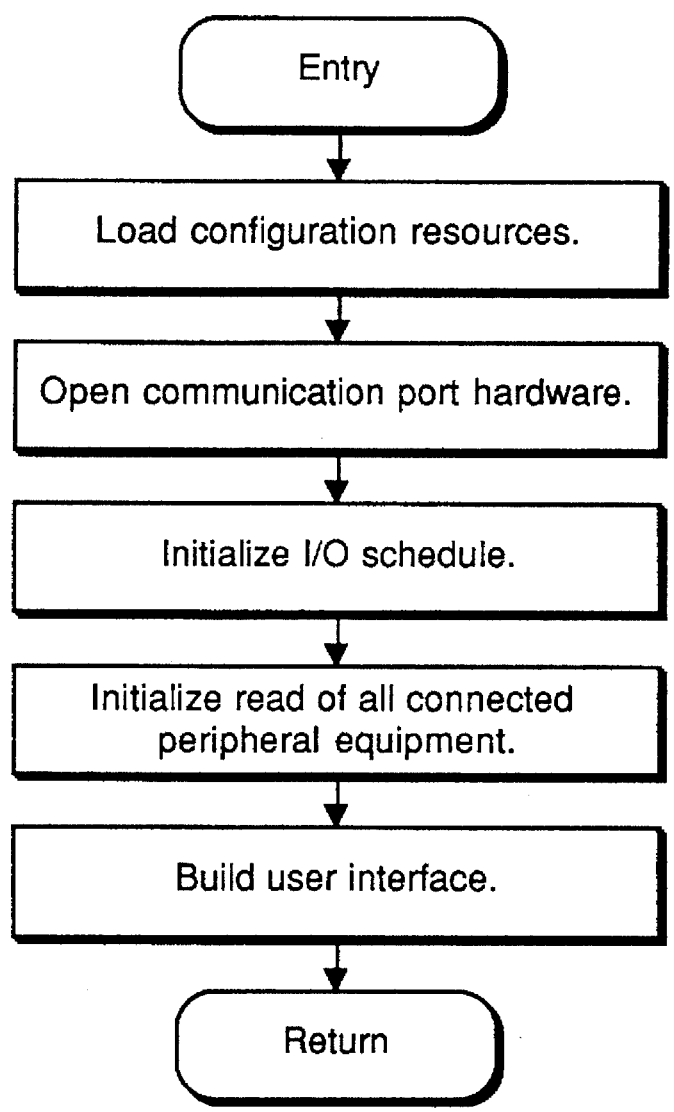
Figure B22. Initialize program.

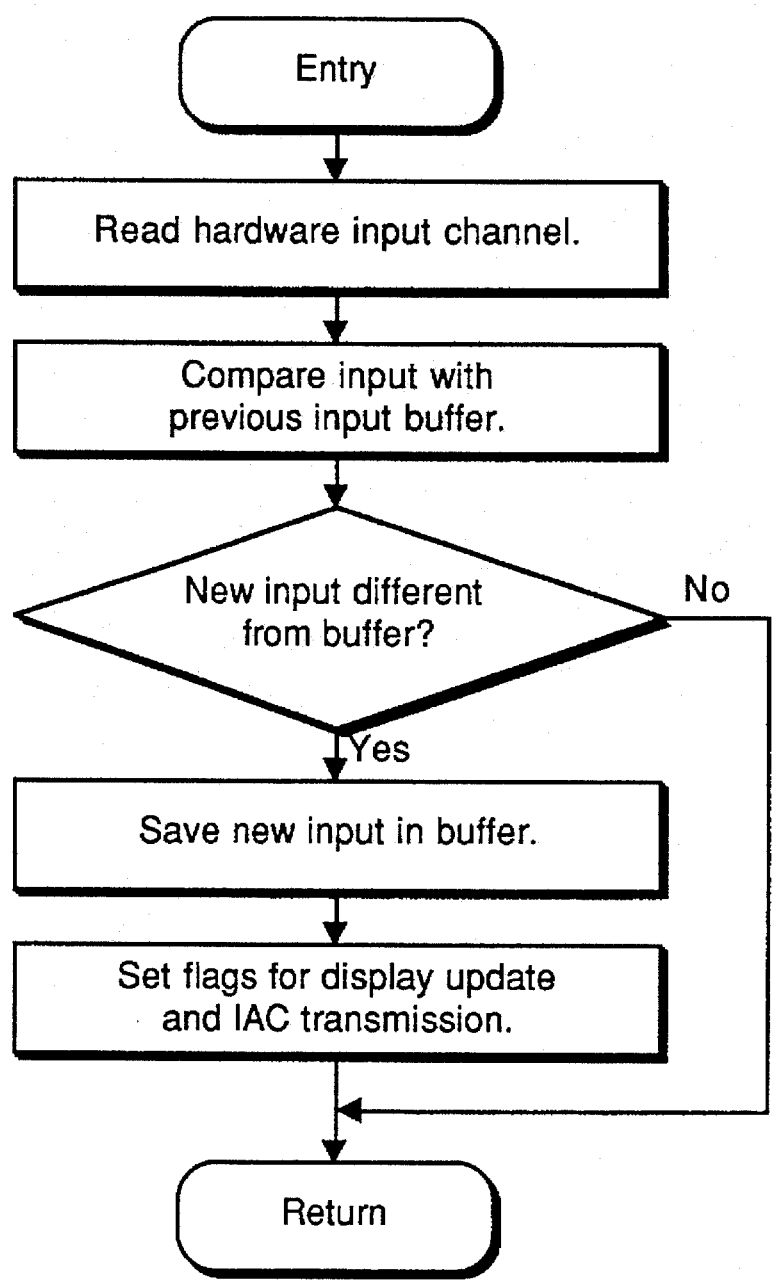
Figure B23. Read hardware input channel.

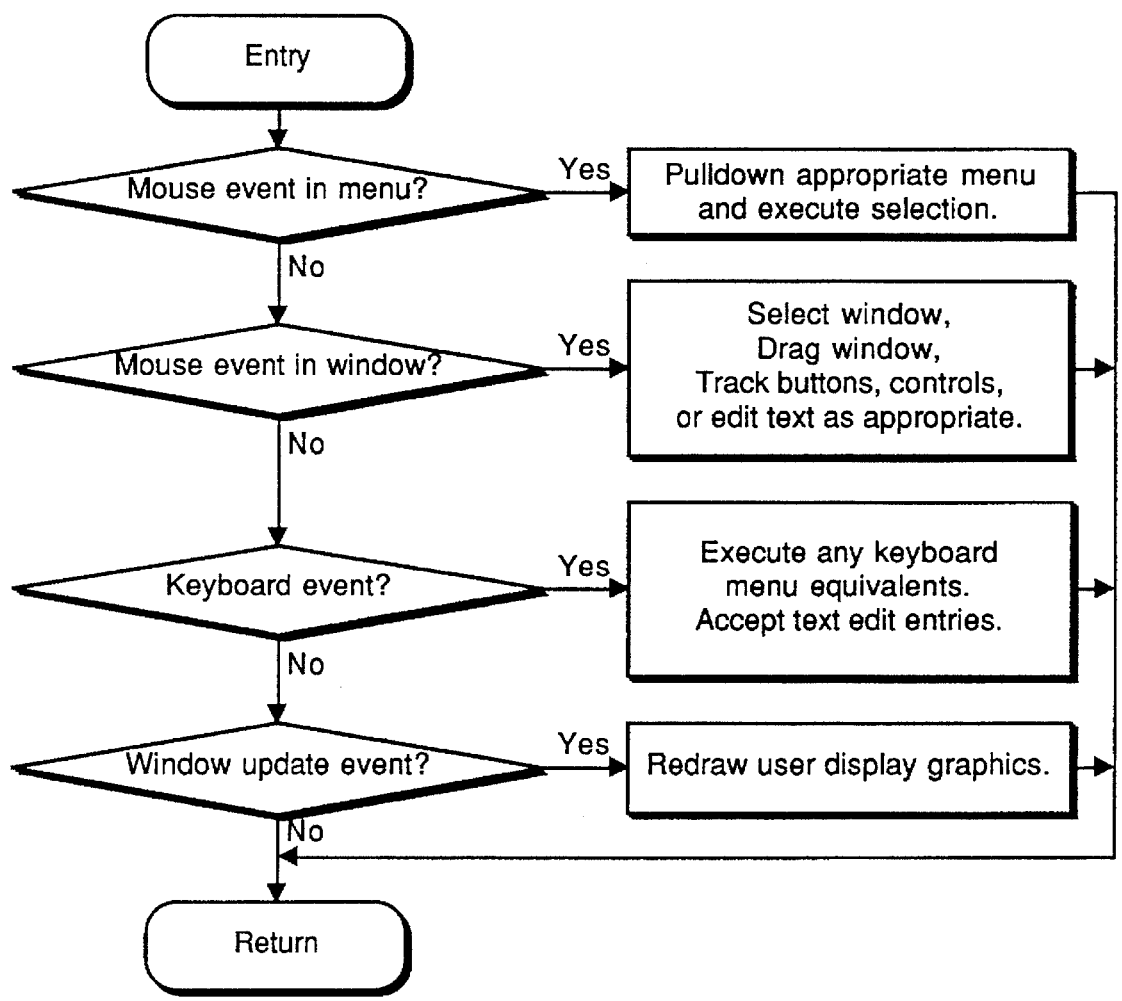
Figure B24. Handle user interface events.

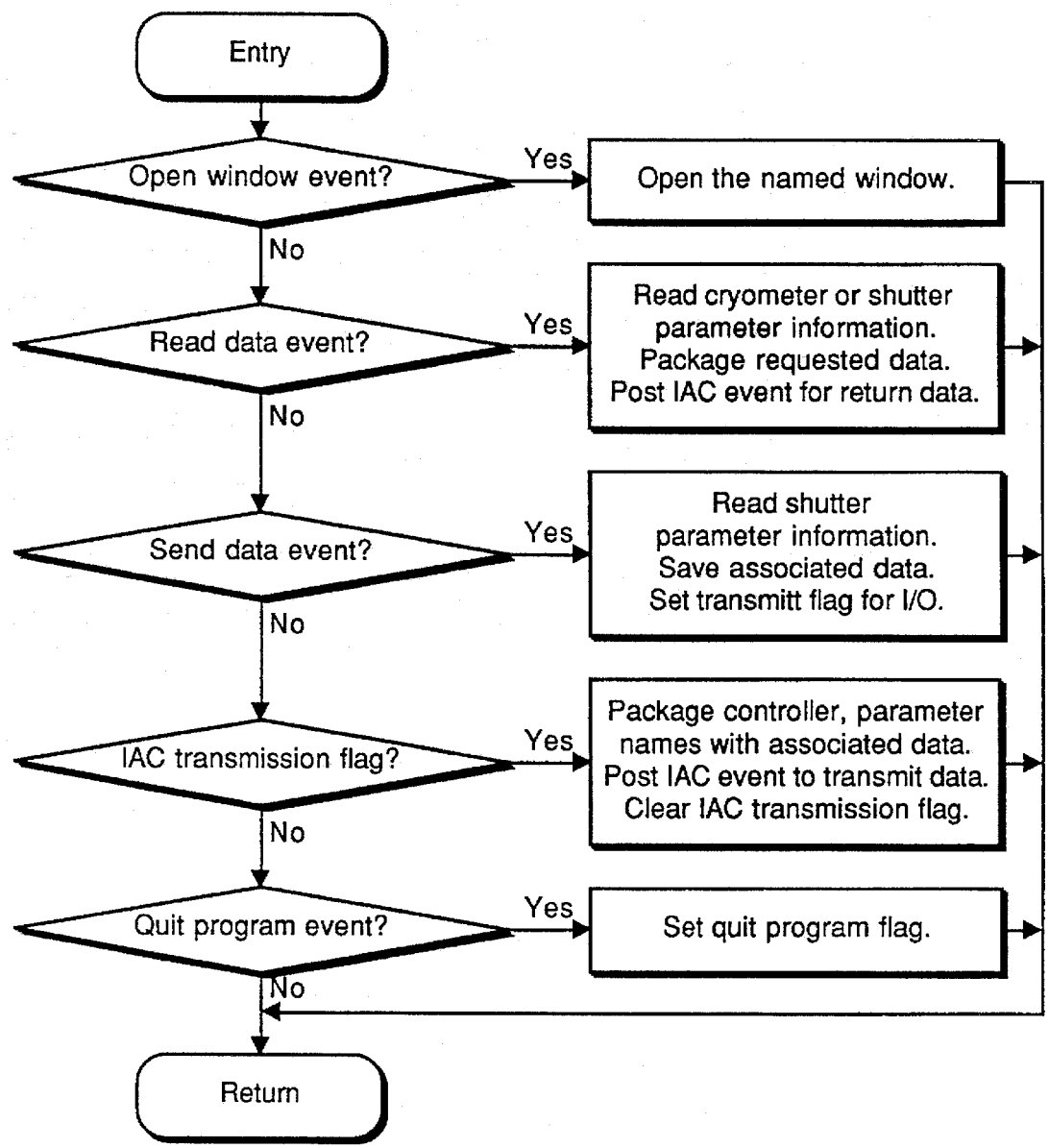
Figure B25. Handle Inter-Application-Communication.

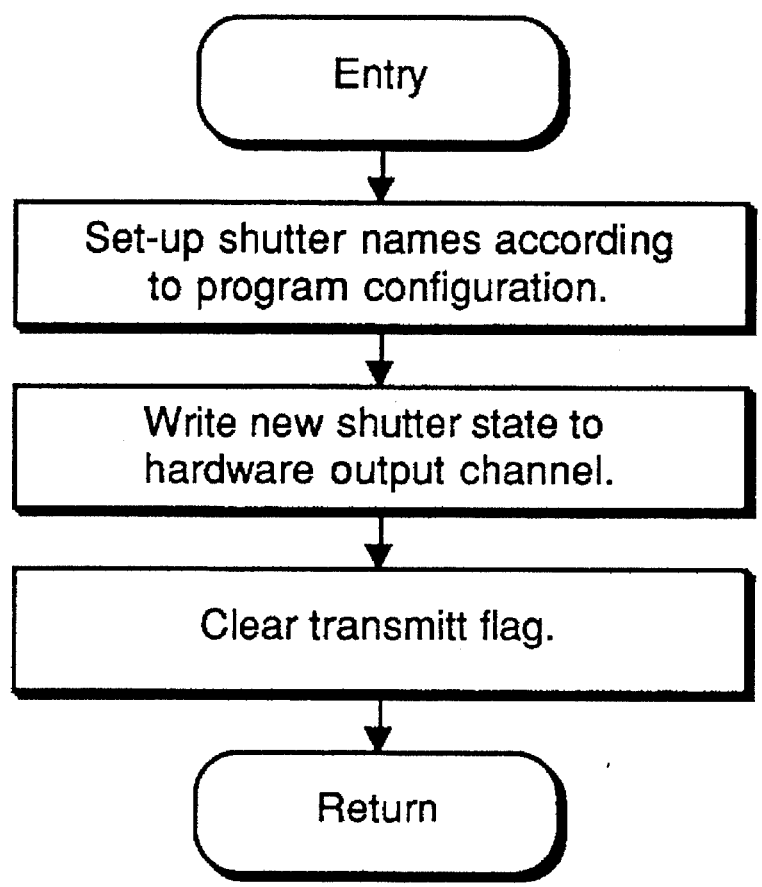
Figure B26. Write hardware output channel.

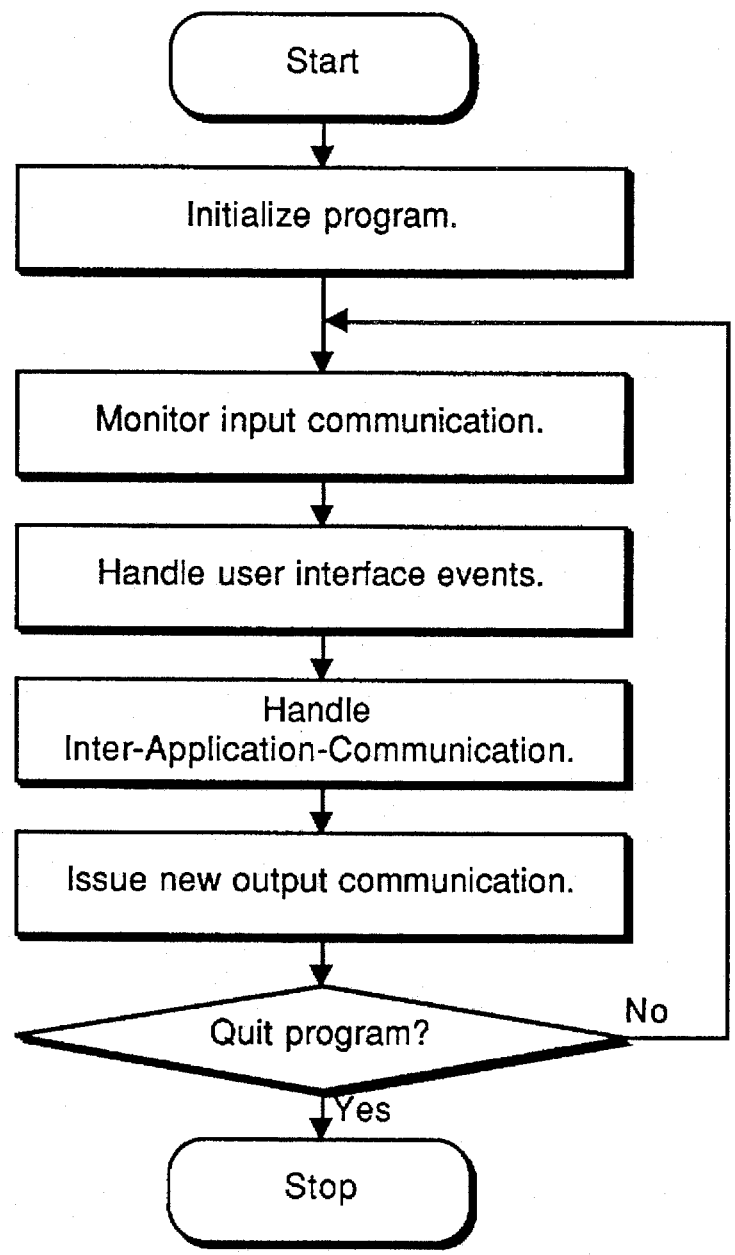
Figure B27. Ion Gauge Main Program Loop.

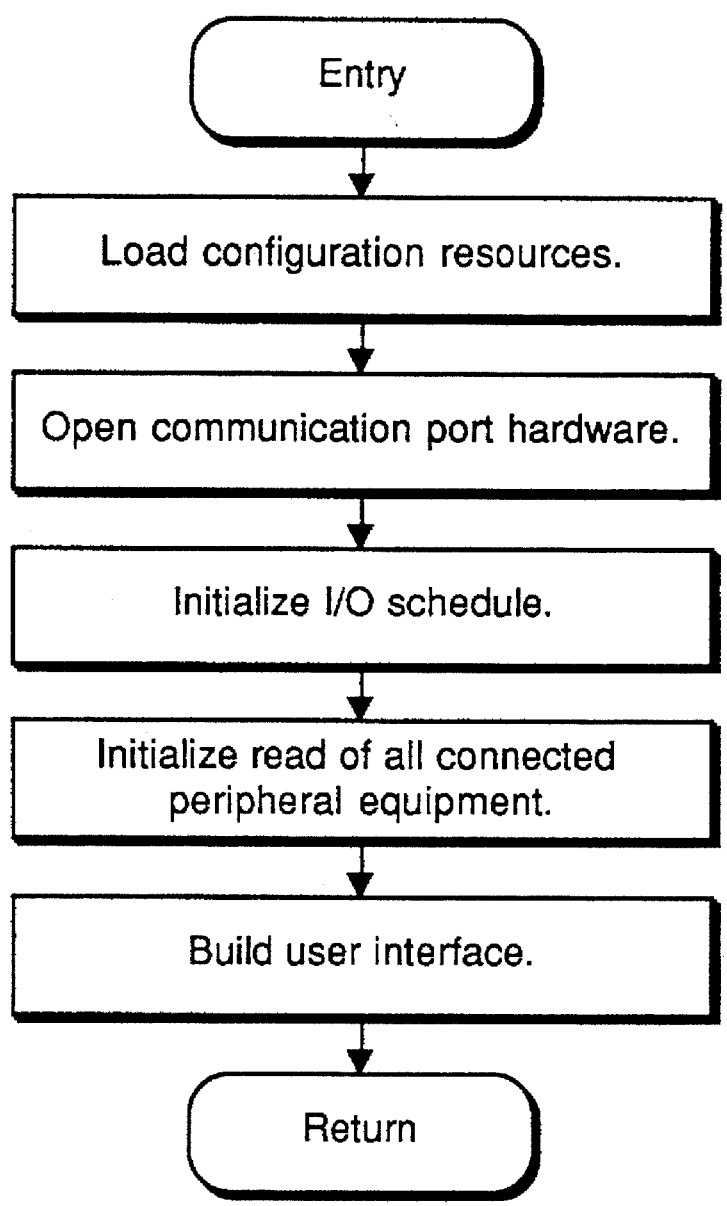
Figure B28. Initialize program.

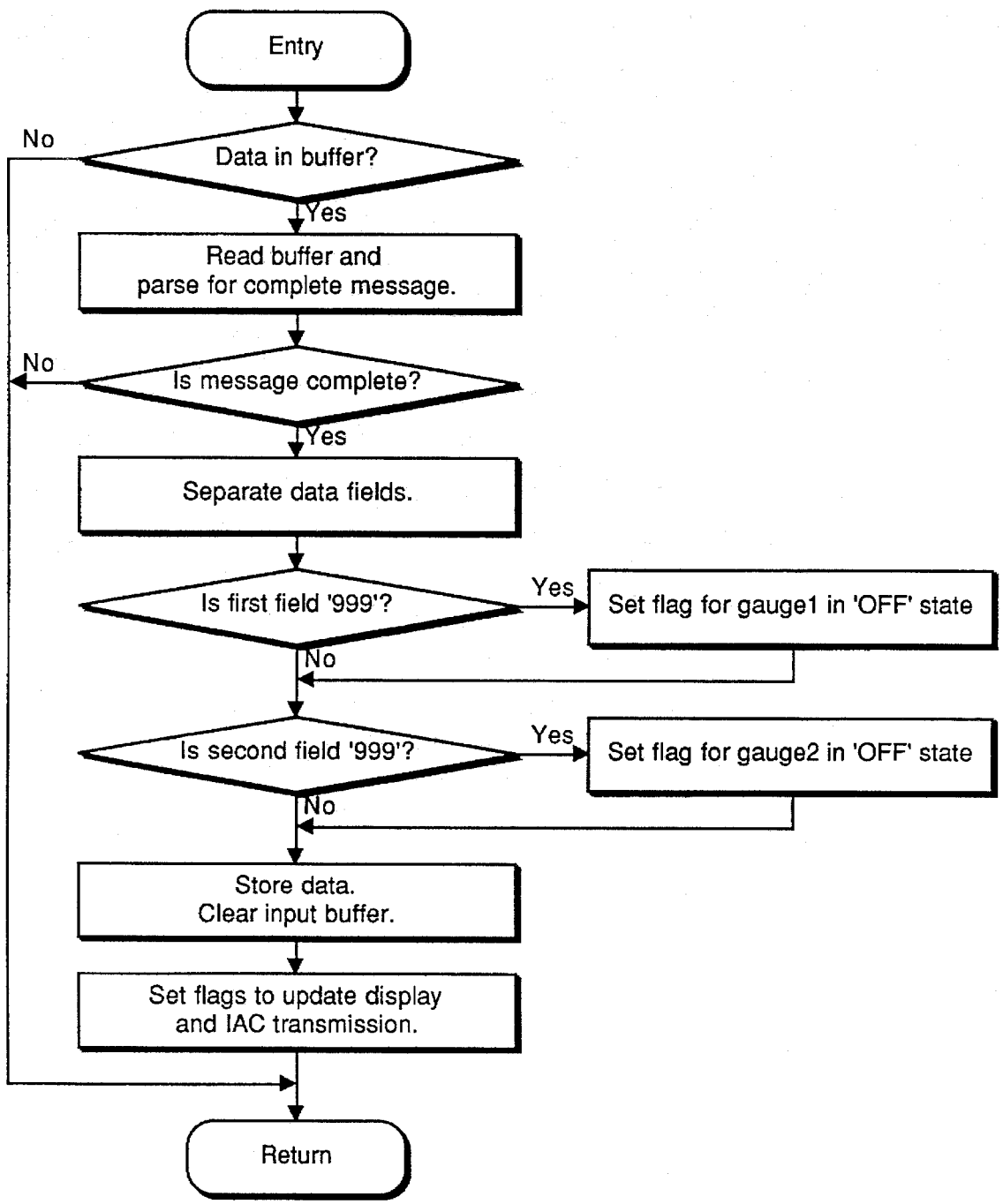
Figure B29. Monitor input communication.

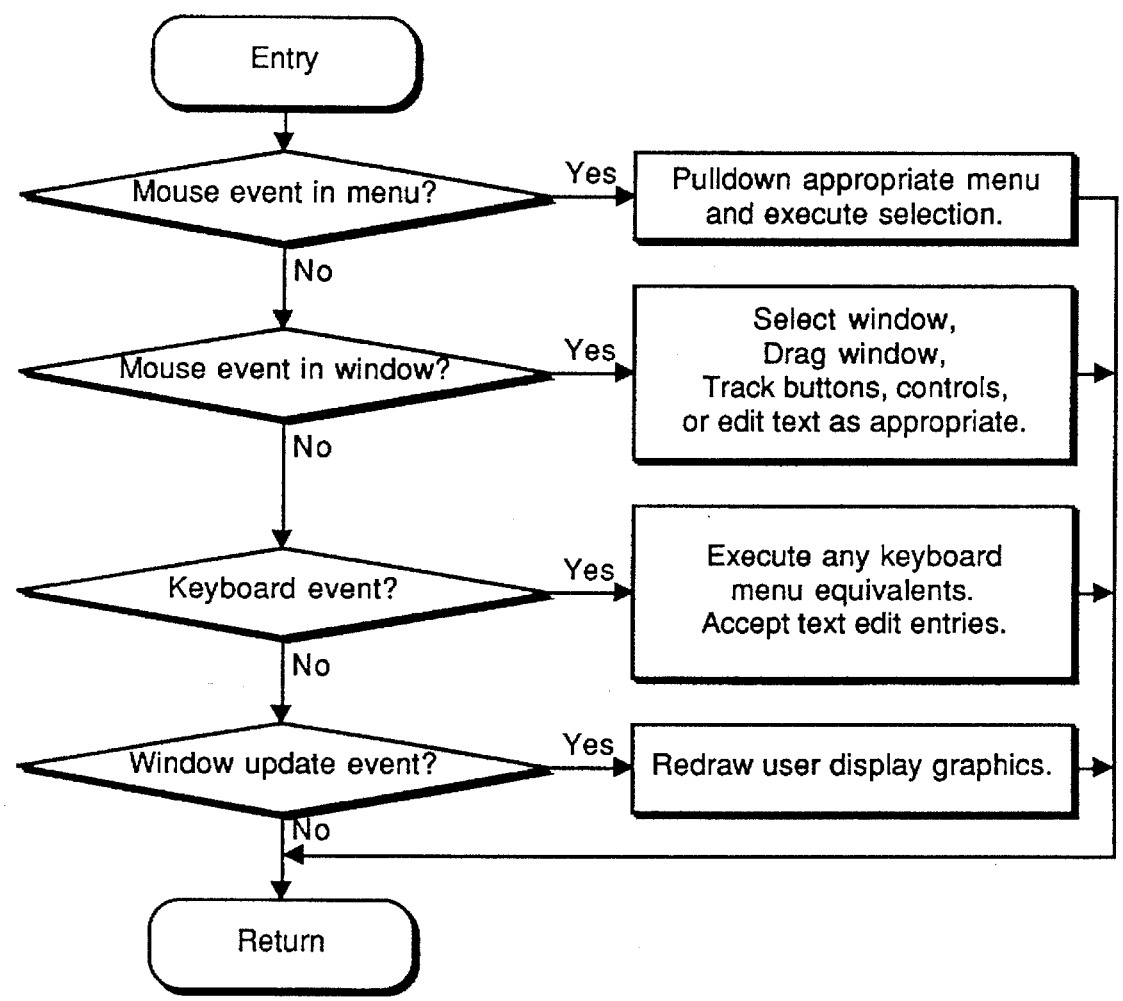
Figure B30. Handle user interface events.

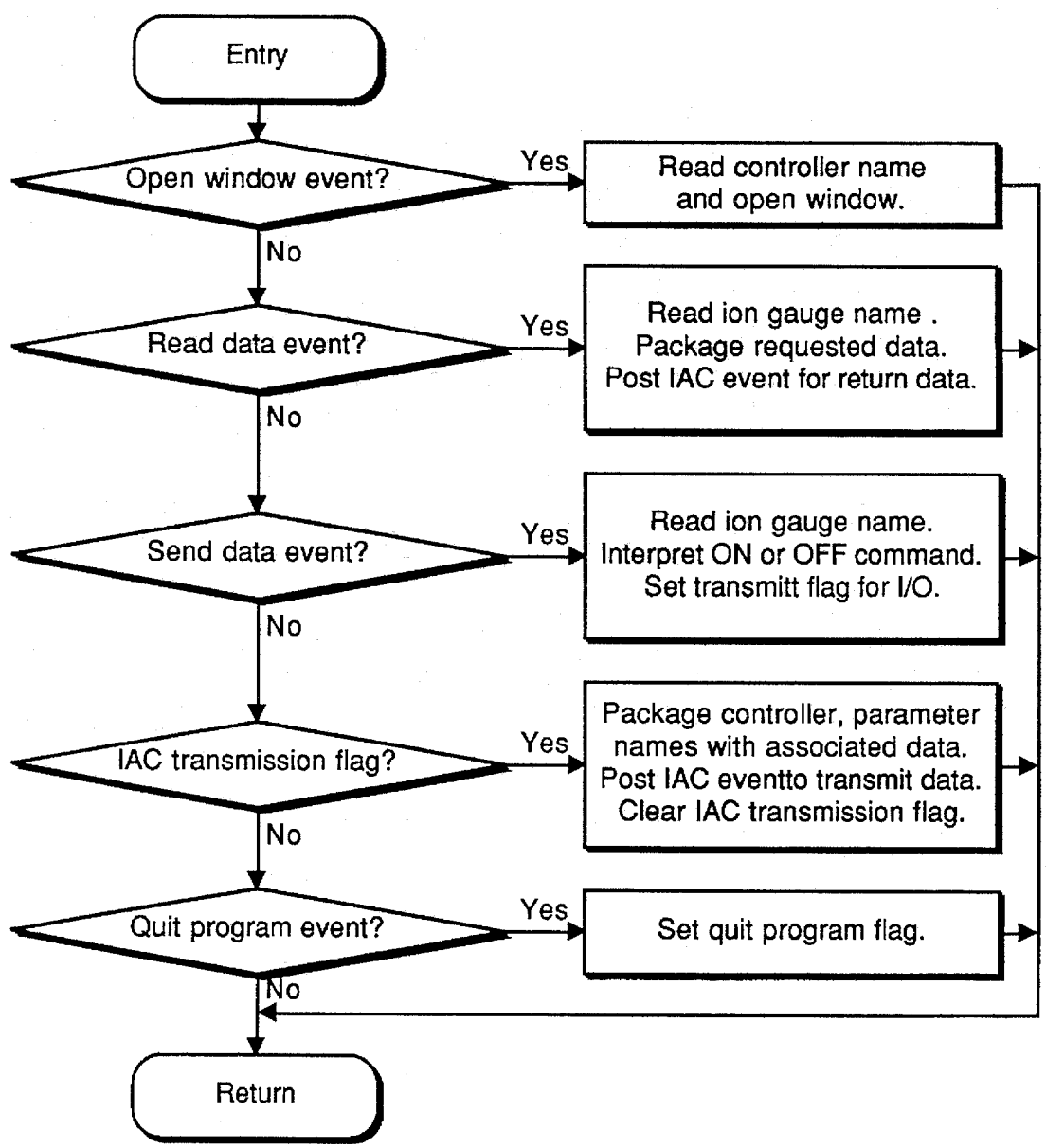
Figure B31. Handle Inter-Application-Communication.

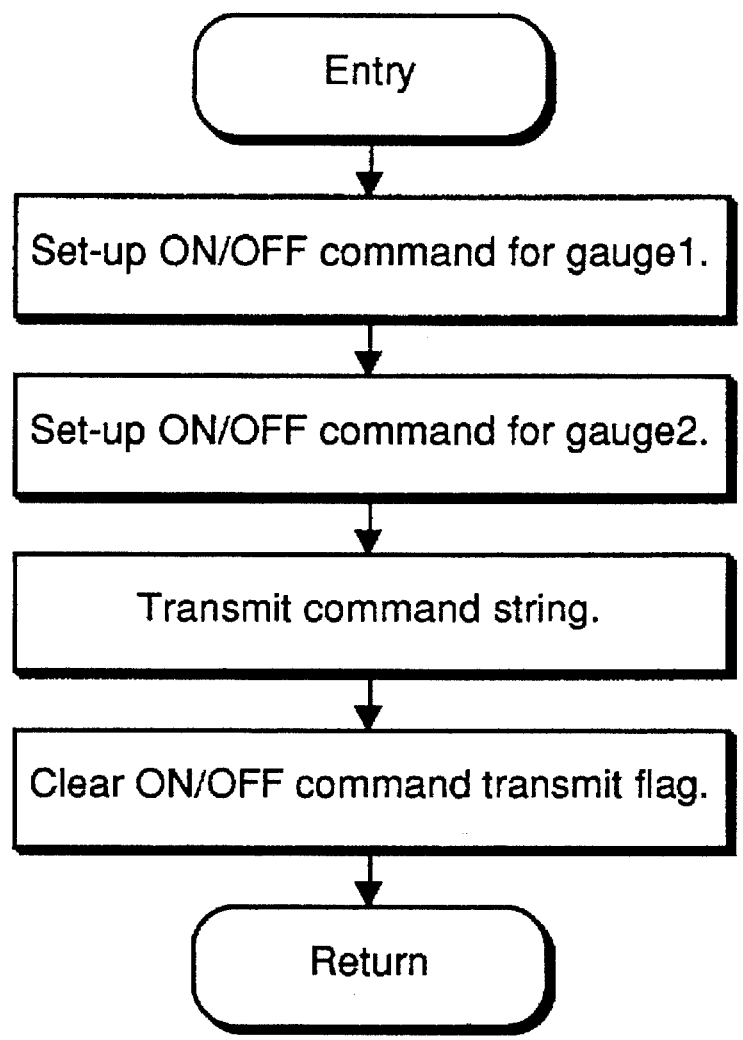
Figure B32. Issue new output communication.

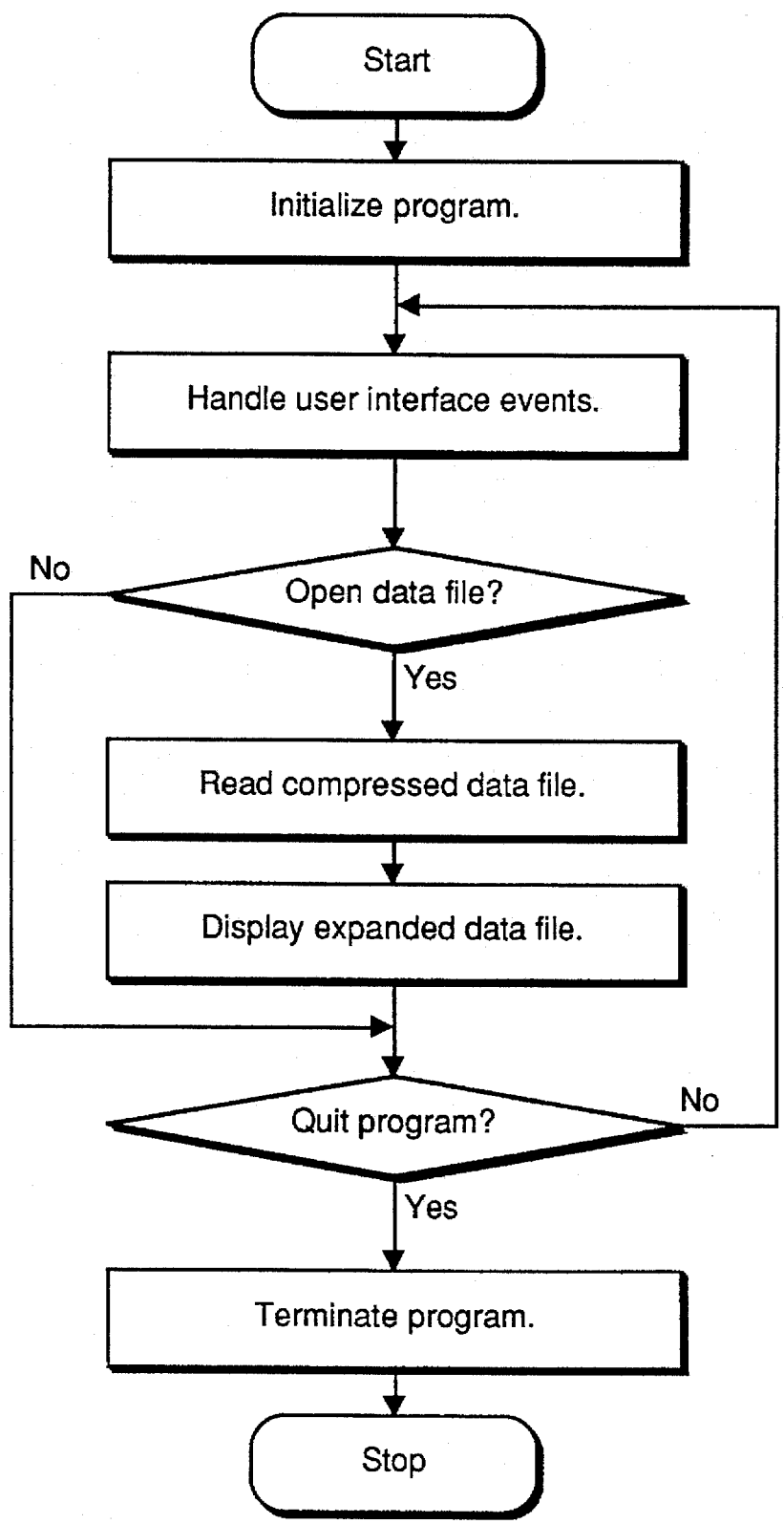
Figure B33. Data Reader Main Program Loop.

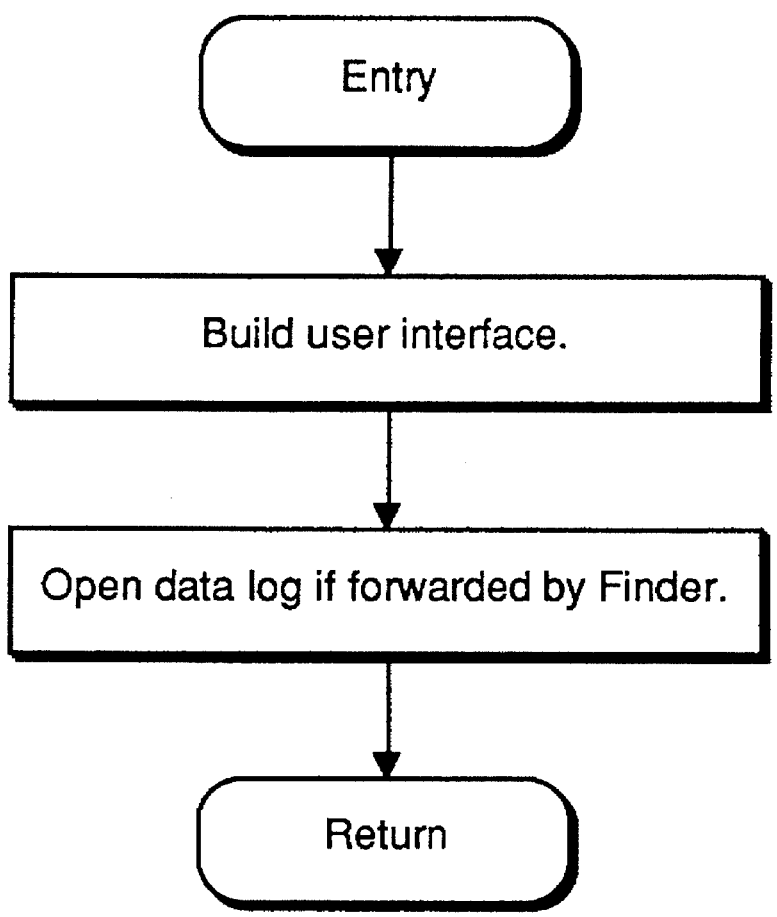
Figure B34. Initialize program.

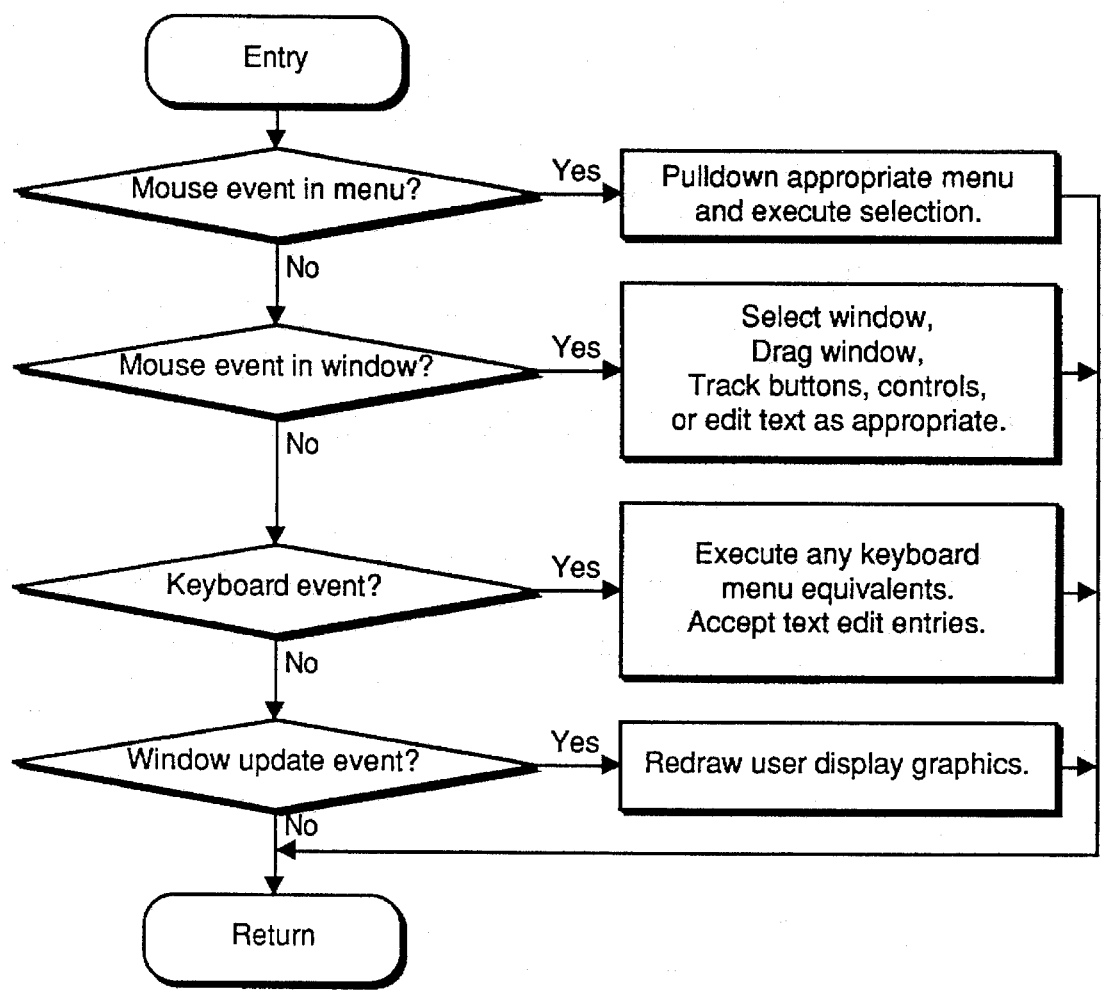
Figure B35. Handle user interface events.

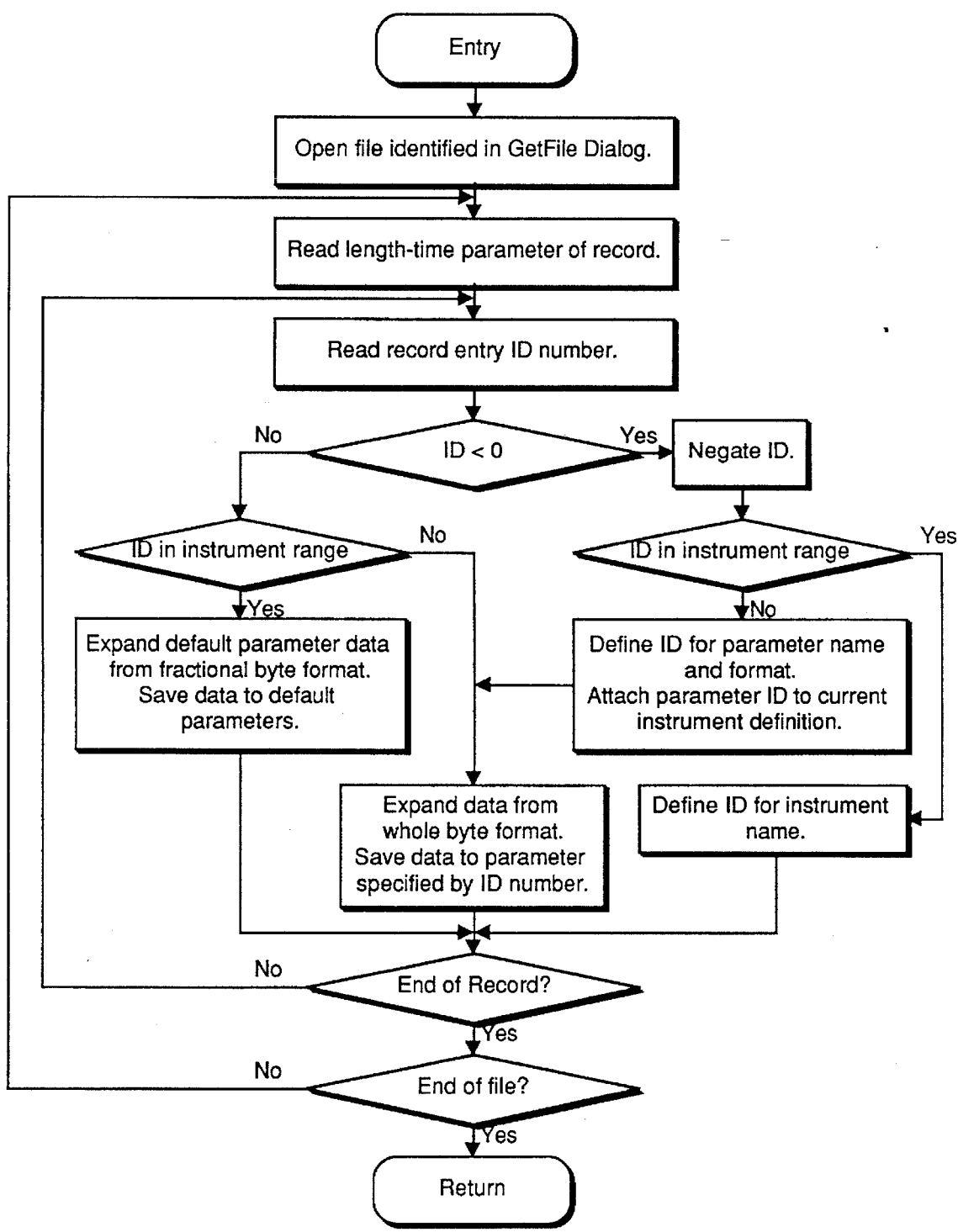
Figure B36. Read compressed data file.

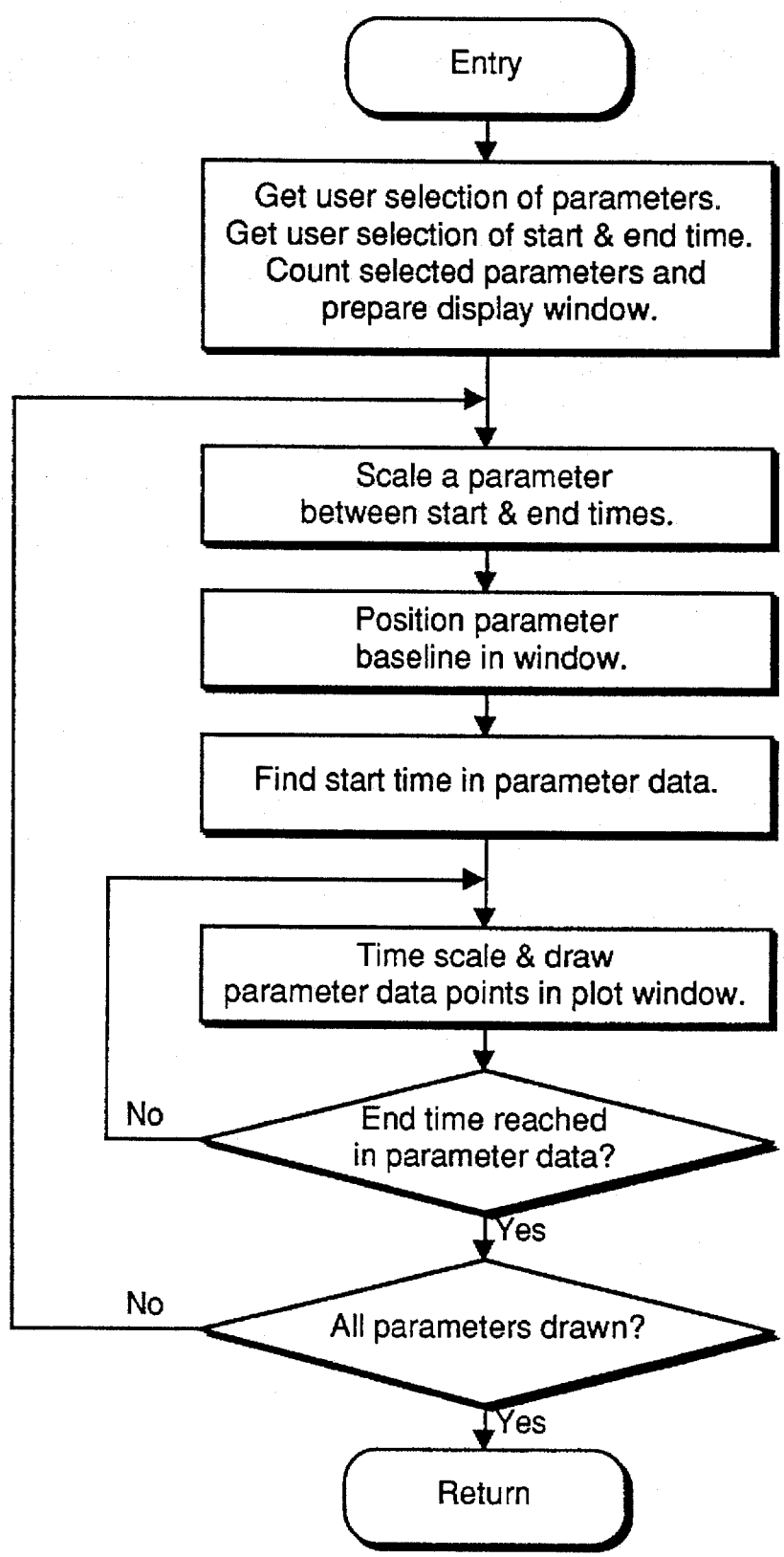
Figure B37. Display expanded data file.

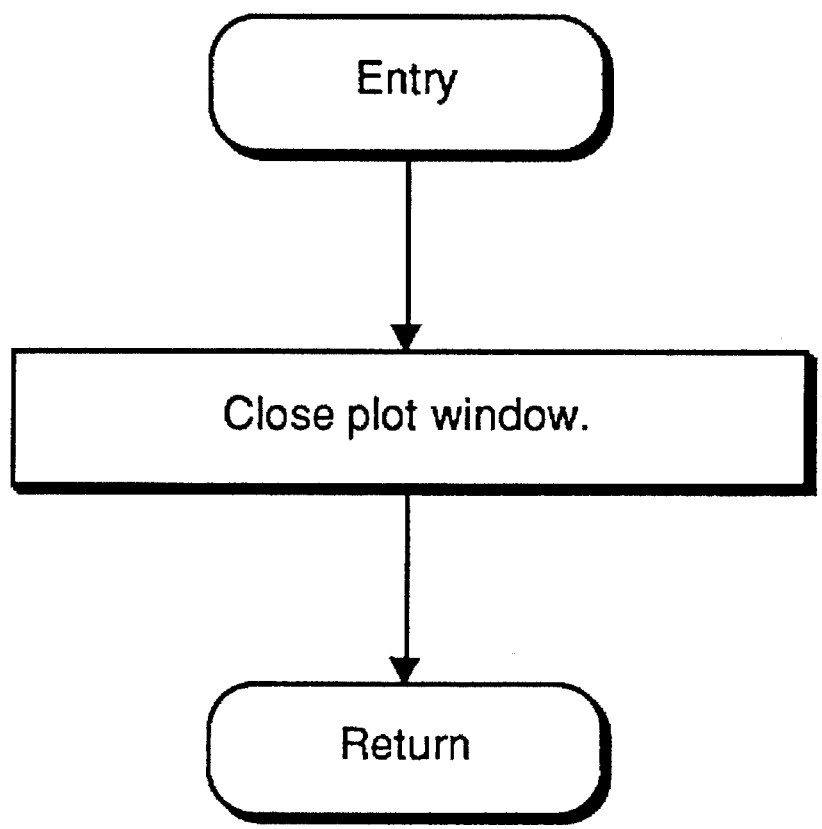
Figure B38. Terminate program.

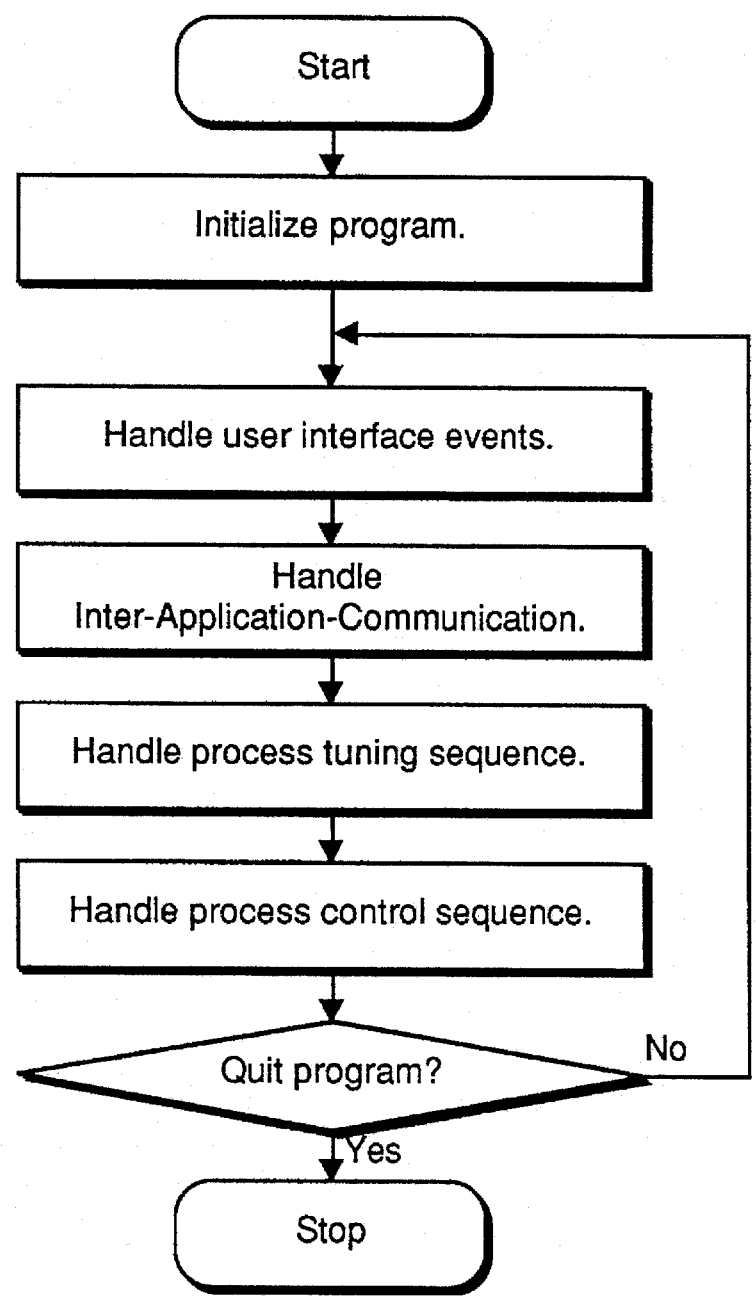
Figure B39. Adaptive Gain Bandwidth Controller Main Program Loop.

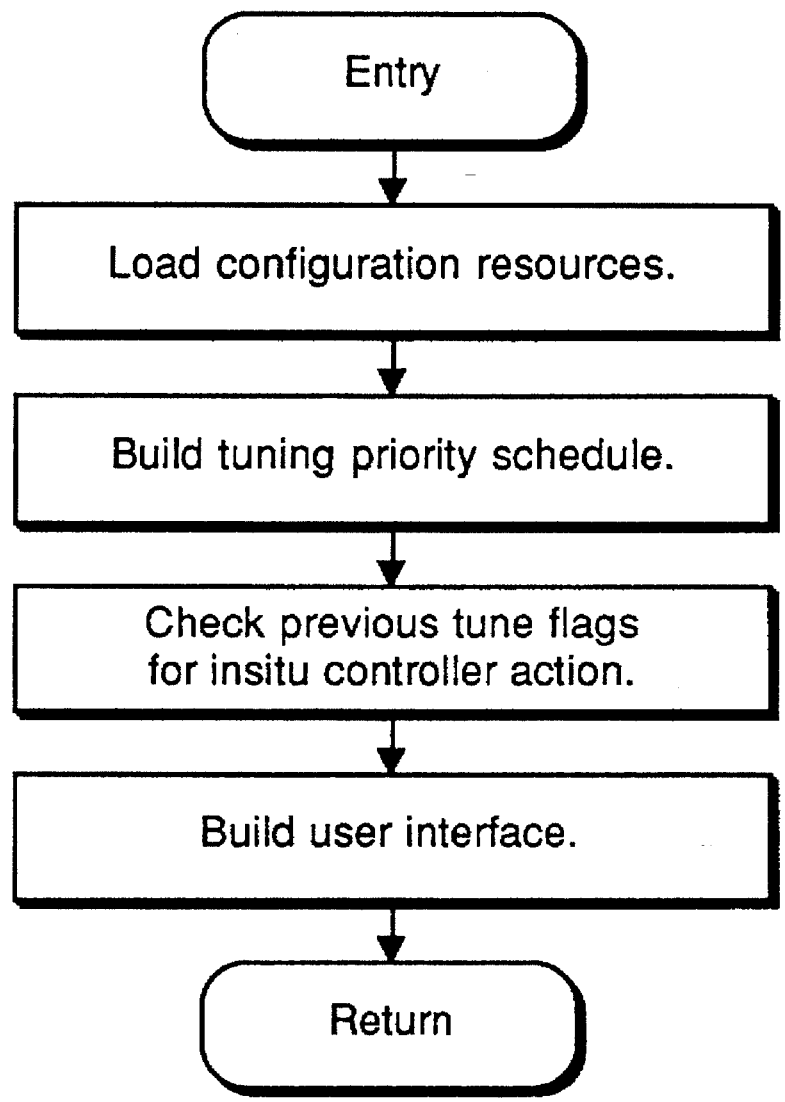
Figure B40. Initialize program.

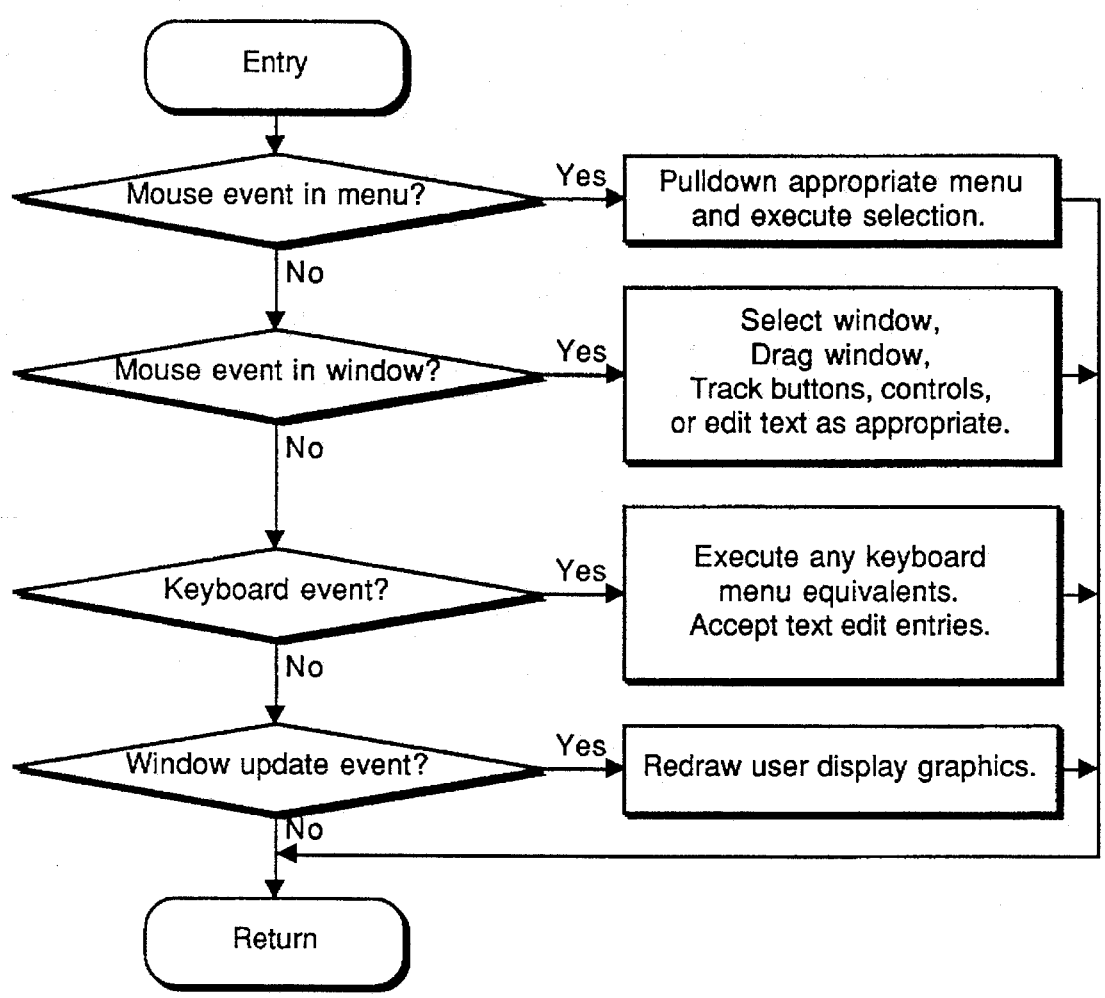
Figure B41. Handle user interface events.

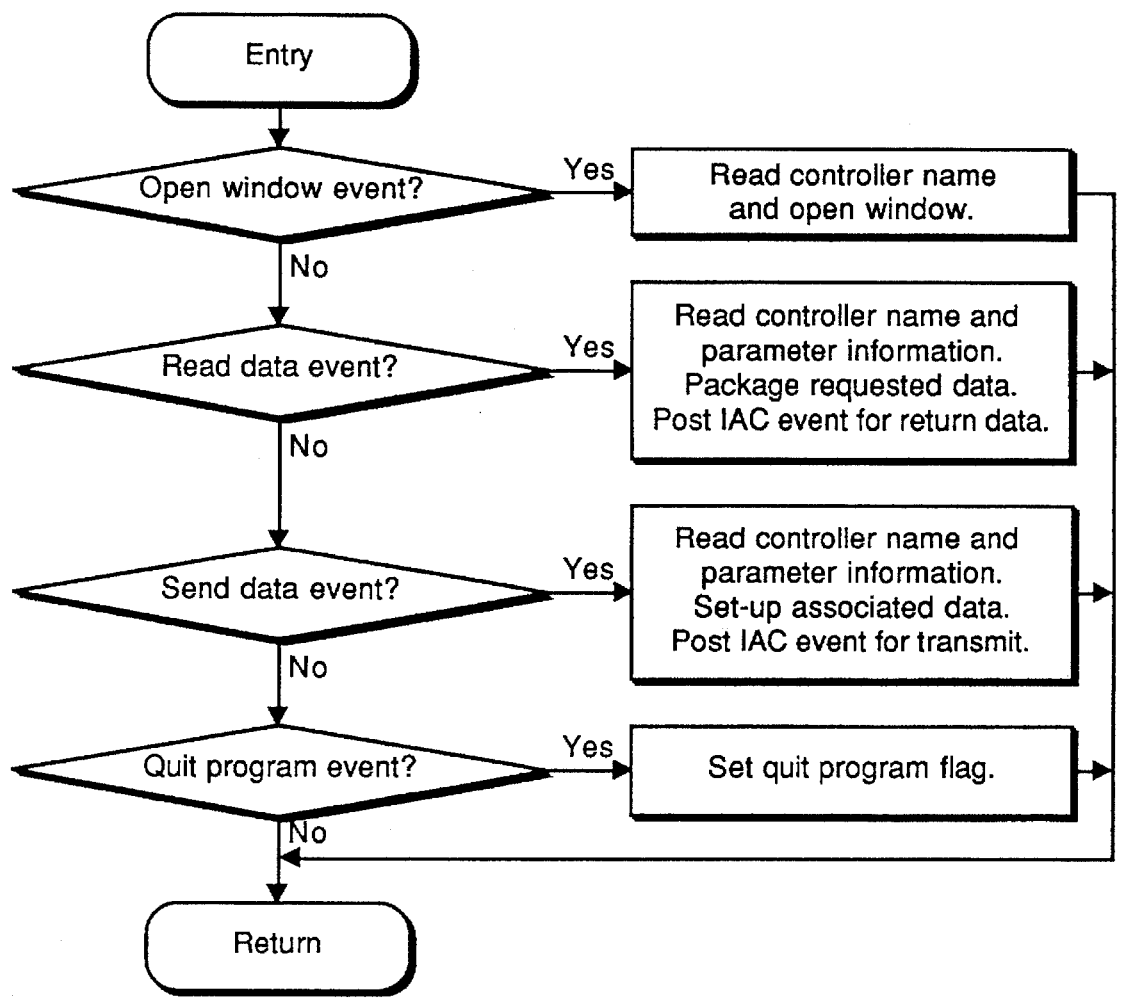
Figure B42. Handle Inter-Application-Communication.

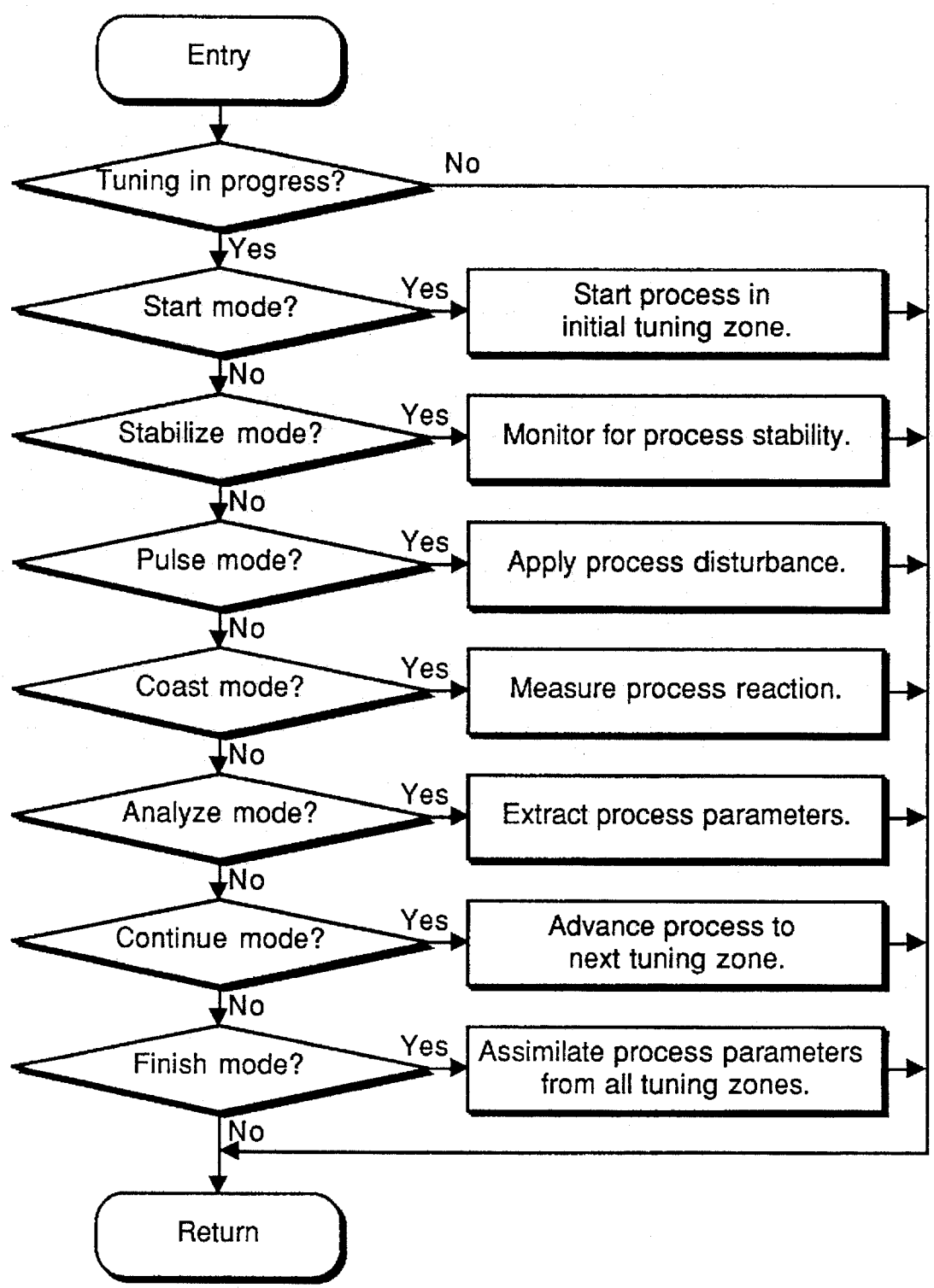
Figure B43. Handle process tuning sequence.

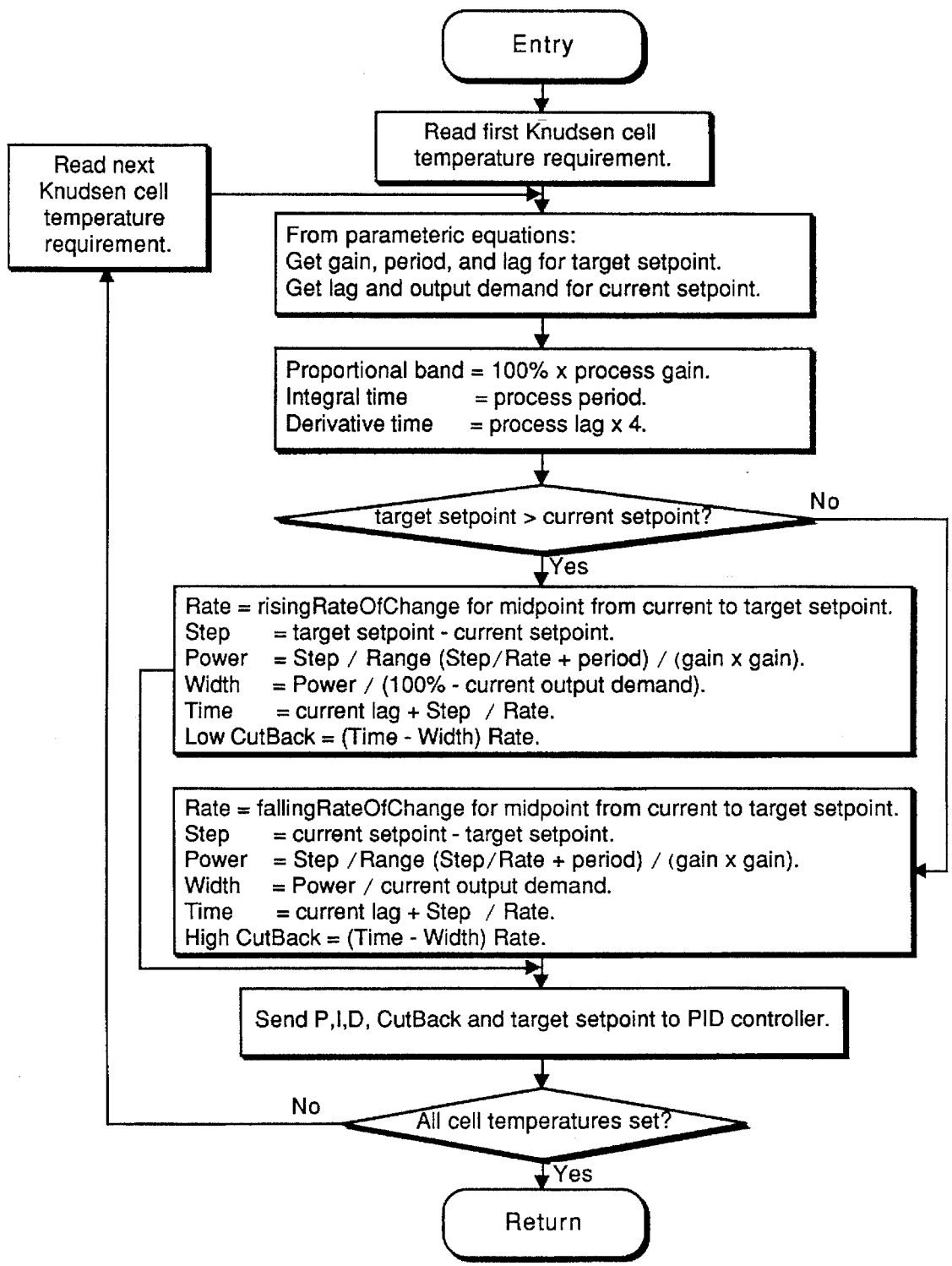
Figure B44. Handle process control sequence.

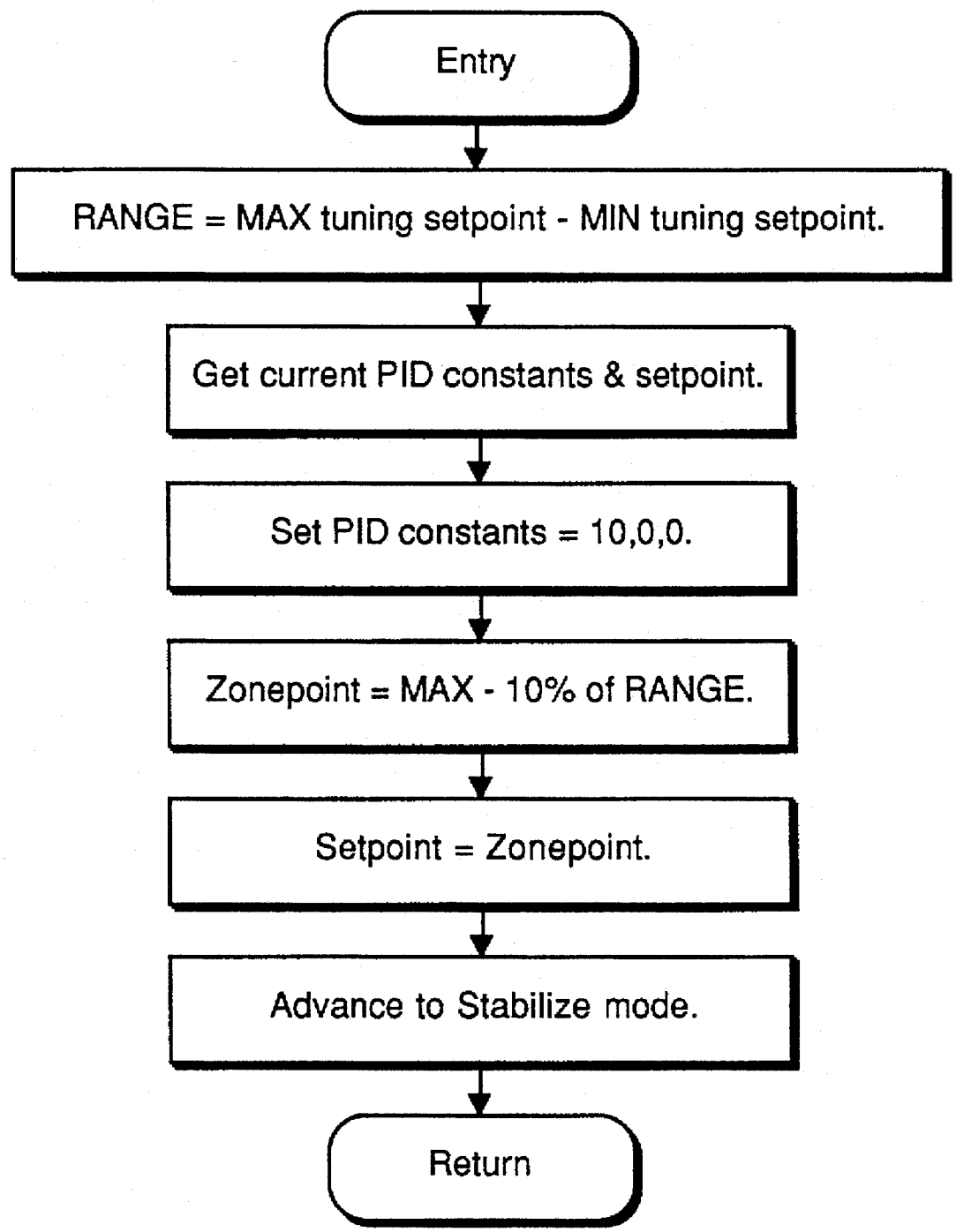
Figure B45. Start process in initial tuning zone.

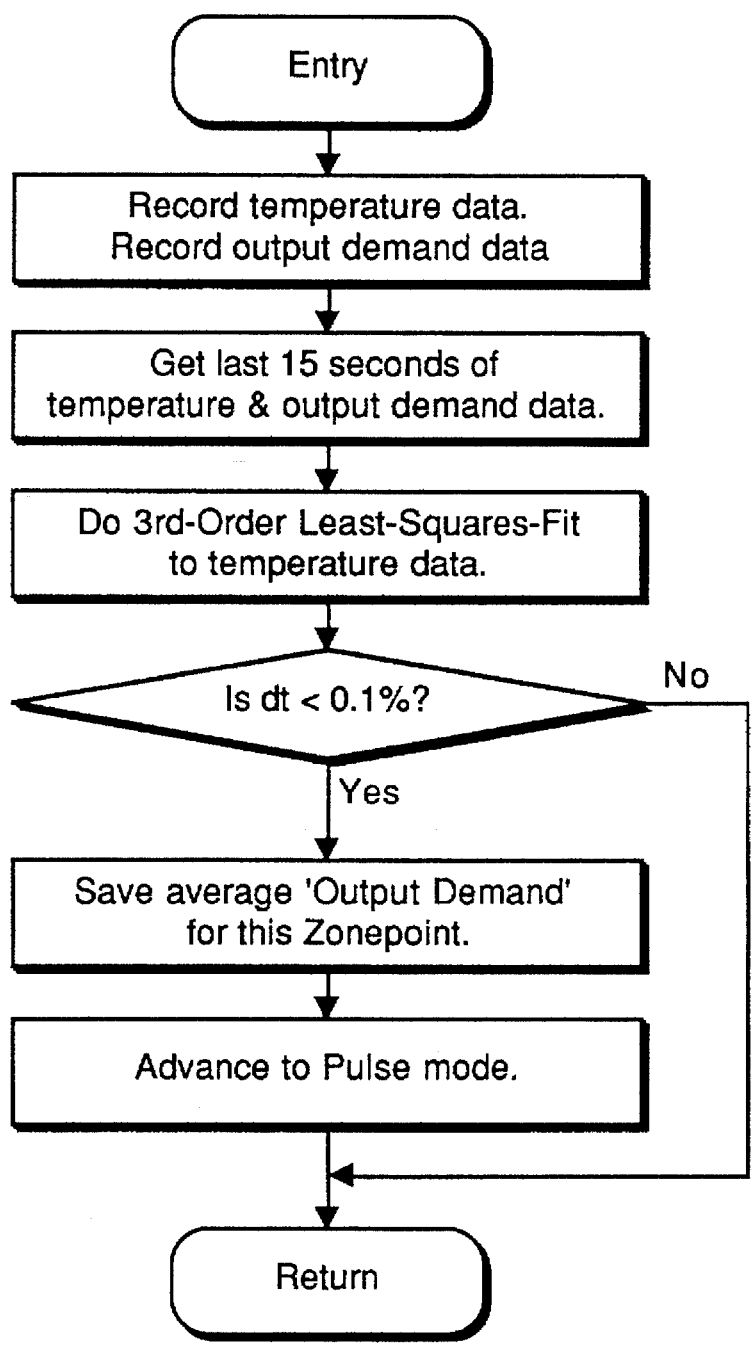
Figure B46. Monitor for process stability.

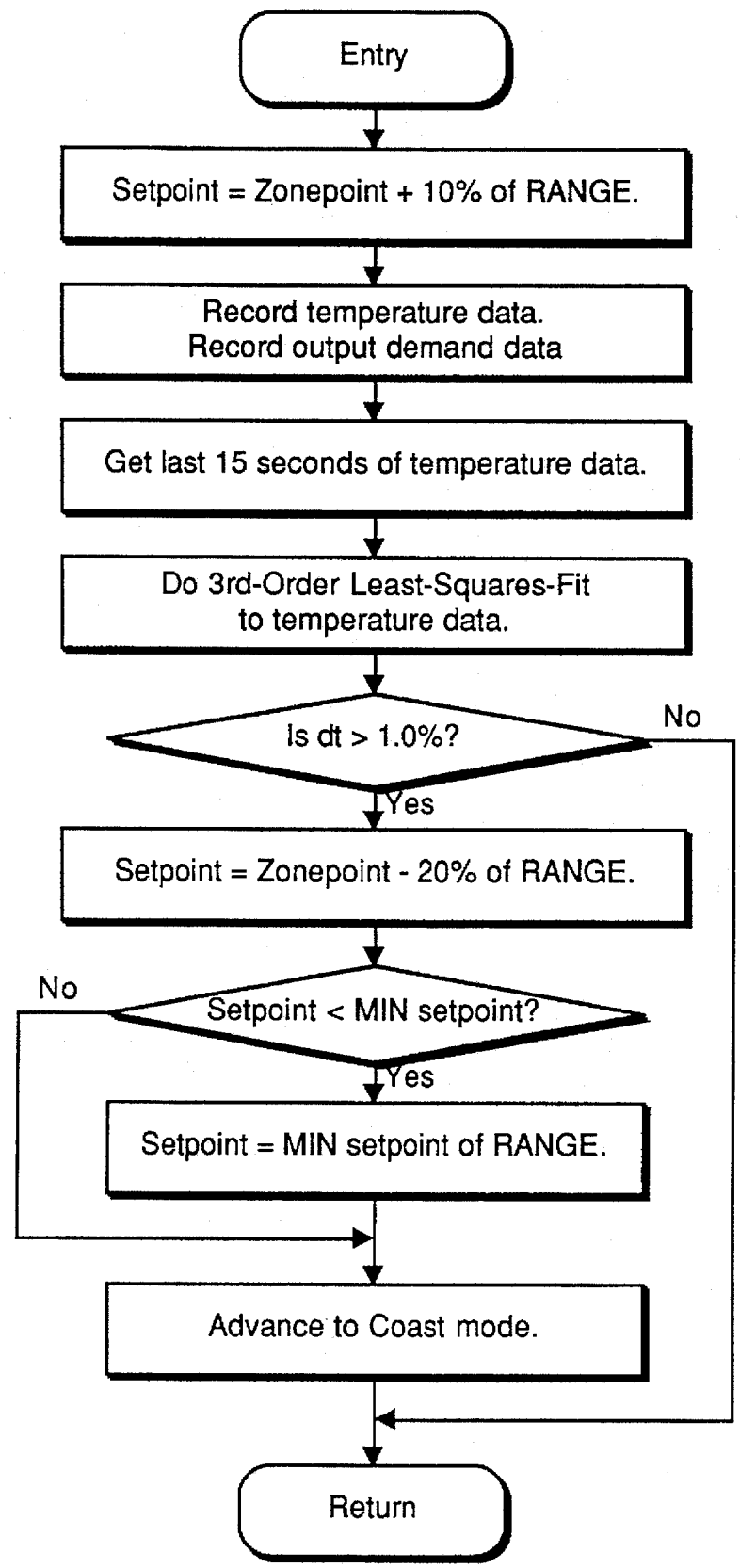
Figure B47. Apply process disturbance.

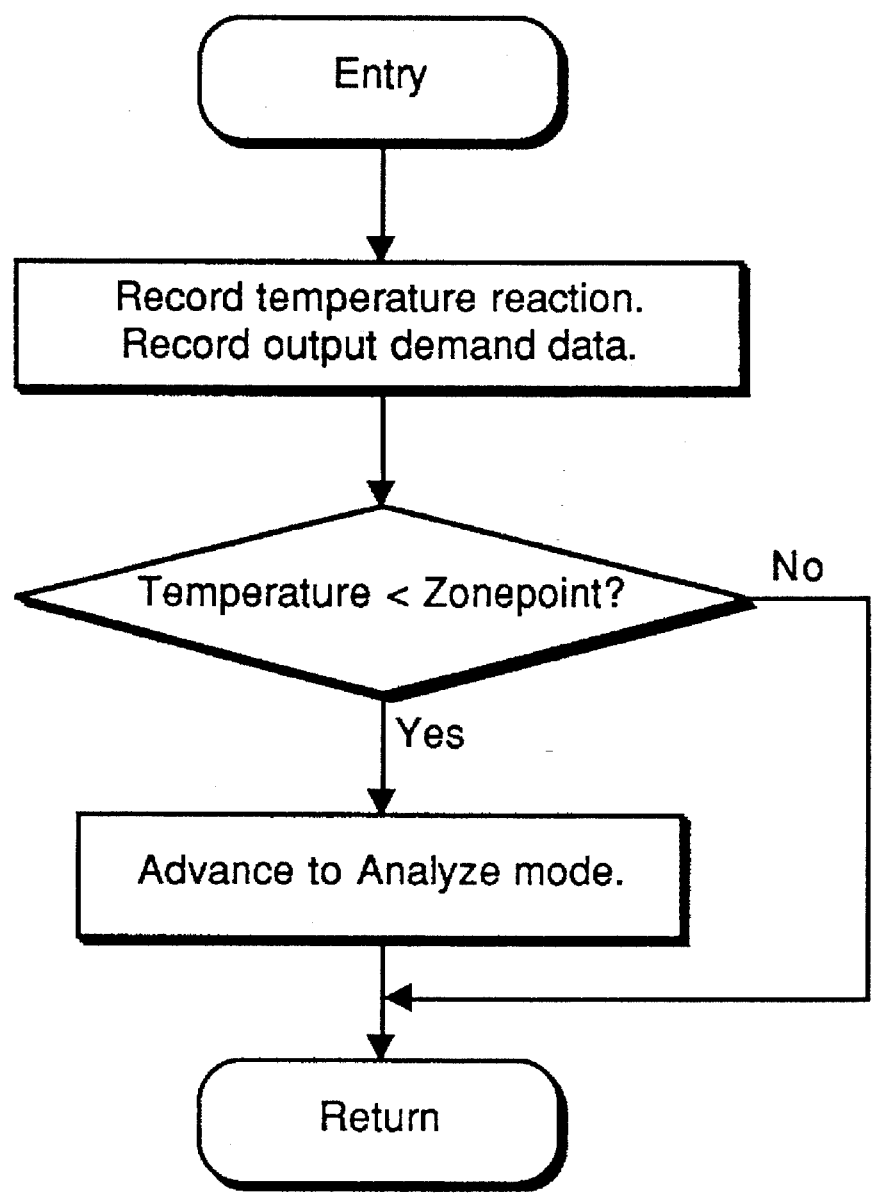
Figure B48. Measure process reaction.

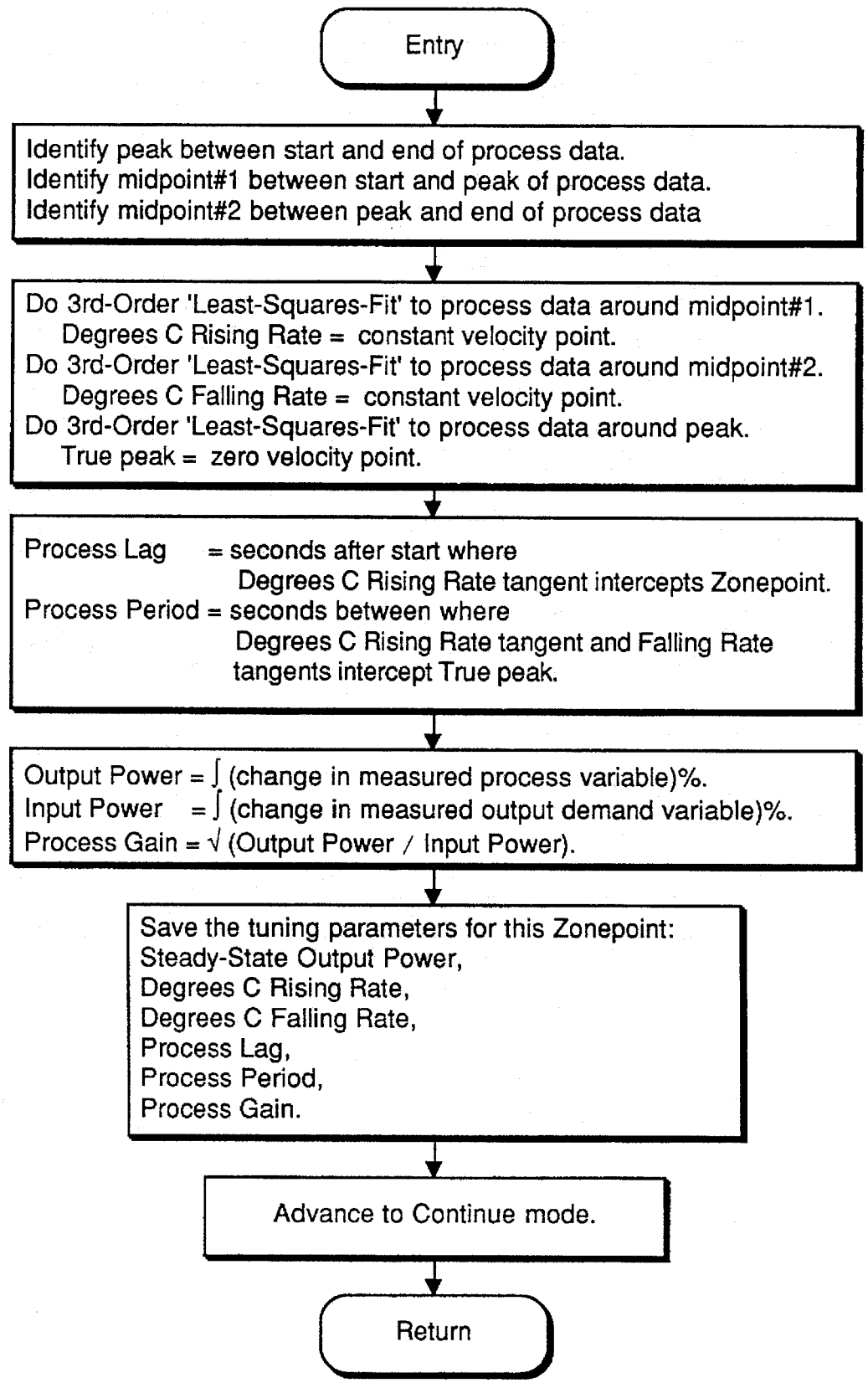
Figure B49. Extract process parameters.

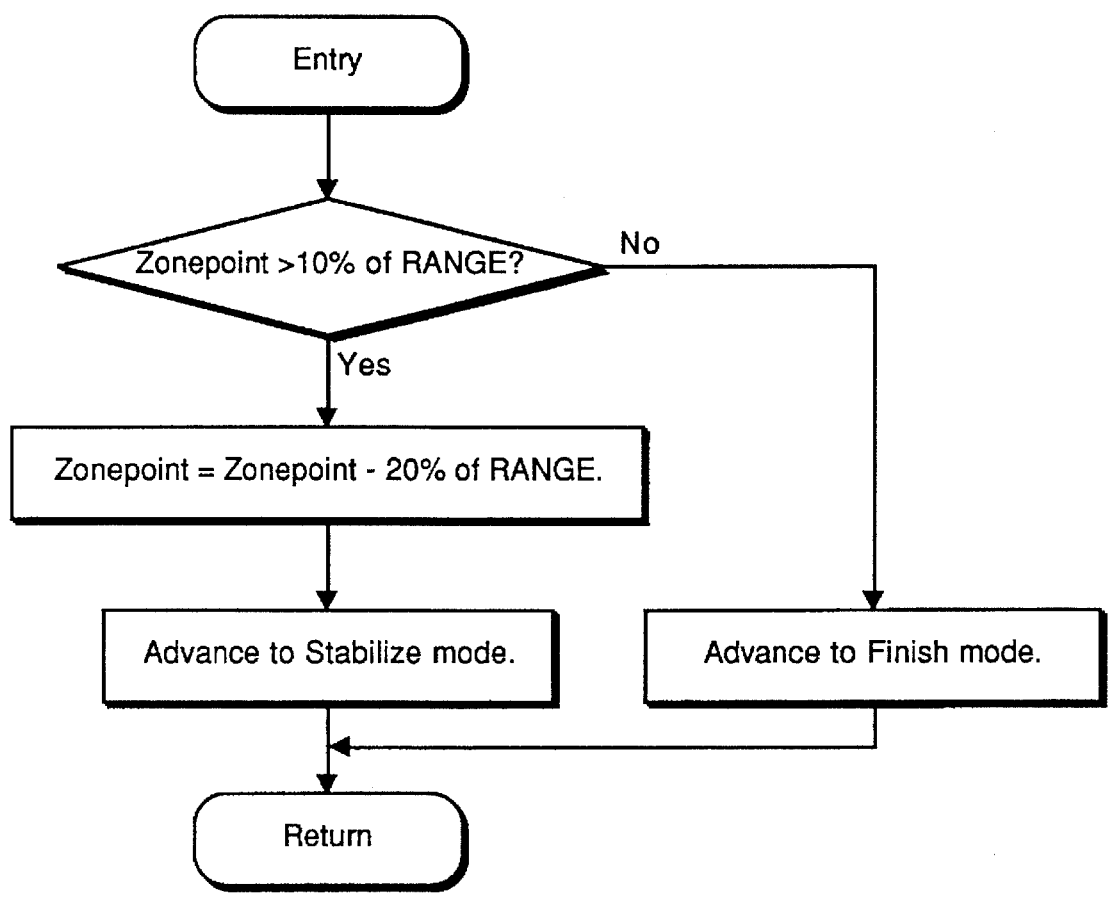
Figure B50. Advance process to next tuning zone.

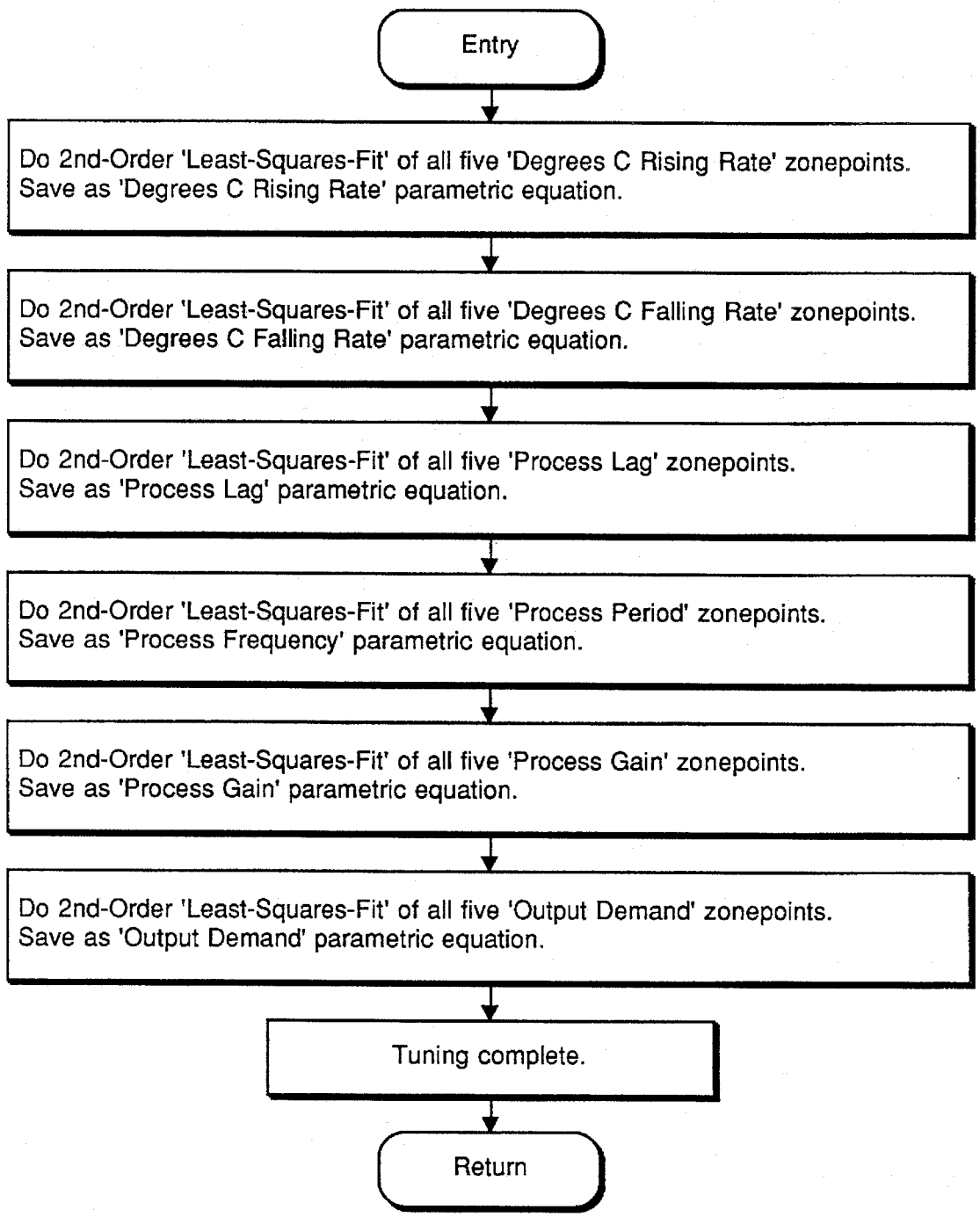
Figure B51. Assimilate process parameters from all tuning zones.

What is claimed is:

1. A hierarchial control system for controlling and improving epitaxial thin films grown with molecular beam epitaxy (MBE), using a plurality of MBE Knudsen cells which supply fluxes of different elements, each Knudsen cell having a heater and a shutter; the control system being arranged in a hierarchy comprising: input-output control means for MBE instrumentation; inner-control-loop means that qualifies MBE process dynamics prior to MBE growth; self-directed-control-loop means that quantifies MBE growth progress in-situ for precise film thickness, composition, and interfacial sharpness; and data transfer means using inter-application communications for transferring data among individual control units;

wherein the input-output control means comprises sensor and actuator interfaces coupled to temperature and flux sensors and to the shutter for each Knudsen cell, and a PID (Proportional, Integral, Derivative) controller coupled to the heater of each Knudsen cell to control the temperature;

wherein the inner-control-loop means comprises an adaptive gain bandwidth (AGB) unit which includes means for quantifying thermal dynamics of the MBE Knudsen cells, using temperature data and PID algorithm data for a Knudsen cell from the input-output control means via said data transfer means; a beam equivalent pressure (BEP) calibrator unit which includes means to quantify flux emission from each Knudsen cell, using temperature data and ion beam pressure data for a Knudsen cell and ion gauge from the input-output control means via said data transfer means; and a shutter opening transient compensator (SOTC) unit which includes means to quantify the effects of shutter cycle loading on the effective flux emission from each Knudsen cell, using temperature data and ion beam pressure data and shutter data for a Knudsen cell and ion gage from the input-output control means via said data transfer means; and wherein the self-directed-control-loop means comprises a growth control unit which includes means for essential recipe execution, using temperature, BEP, and shutter opening transient data from the AGB, BEP, and SOTC units via said data transfer means; a flux setpoint control unit which includes means to calculate precise Knudsen cell thermal setpoints for required flux output density, using temperature and BEP data for the Knudsen cell from the input-output control means and BEP unit via said data transfer means; and expert system inference engine means for guiding recipe flux requirements via in-situ sensor data, using temperature, pressure, and shutter data from the input-output control means and the AGB, BEP, and SOTC data from the respective AGB, BEP, and SOTC units via said data transfer means.

2. A hierarchical control system according to claim 1, with means combining all MBE instrumentation onto a single organized work platform, so that MBE set-up, calibration, and growth can be controlled from a central location, and MBE parameters can be monitored in real-time and compared for process interactions and boundary conditions.

3. A hierarchical control system according to claim 1, with means for combining all MBE instrumentation for centralized data logging purposes, and for automatically recording operator set machine parameters as recorded data which is accessible for duplicating MBE growth conditions, and wherein said recorded data contains all calibration variables to facilitate duplication of said machine parameters for later analysis.

4. A hierarchical control system according to claim 3, which includes means for providing set-up, calibration and growth data from the recorded data to the expert system inference engine means to process and validate new MBE recipe designs with reduced recipe trials.

5. A hierarchical control system according to claim 1, wherein said adaptive gain bandwidth (AGB) unit includes means for extracting parameters about thermal properties of each MBE Knudsen cell using a trapezoidal tuning method, wherein unit measures process lagtime, process period (frequency), rising rate falling rate, nominal power requirement, and process gain, where the process gain is equal to the square root of a quantity having a numerator and denominator, with the numerator being the reciprocal of range times the integral of Output Temperature Pulse & Noise Power, and the denominator being the integral of Input Pulse Power, the extracted parameters being used in-situ to the MBE growth process to determine optimal values for the proportional band, integral time, derivative time, and cutback constants for each proportional-integral-derivative controller for each Knudsen cell associated with the MBE machine system.

6. A hierarchical control system according to claim 1, wherein said shutter opening transient compensator (SOTC) unit is coupled with the adaptive gain bandwidth unit and the beam equivalent pressure unit to compensate load disturbances incurred on Knudsen cell flux emissions that result from cycling the shutters associated with each Knudsen cell, wherein the following equation profiles the effective flux $f_e(t)$ that results from a desired flux $f_d(t)$ in a single time constant system where A and B constitute gain and derivative terms:

$$f_e(t) = [A + B\, d/dt] f_d(t)$$

this effective flux profile being inverted in a compensation algorithm to reduce variation due to shutter load disturbances to 1% of the desired flux profile.

7. A hierarchical control system according to claim 1, wherein said beam equivalent pressure (BEP) calibrator unit includes means for automating the task of tabulating each Knudsen cell flux pressure equivalent to cell temperature across the operating range of each Knudsen cell, the relationship between the flux pressure $\Phi$ and the temperature T in each Knudsen cell being shown in the following equation $$ln\Phi = lnA - \frac{Ea}{k} \cdot \frac{1}{T}$$
BEP intercept, BEP slope.

where A is a BEP intercept of the y-axis, Ea is energy of activation for a particular species, k is Boltzman's constant, and Ea/k is BEP slope, these tabulations being data logged to facilitate the data availability for in-situ flux regulation via Knudsen cell temperature regulation during the MBE growth process.

8. A hierarchial control system for controlling and improving epitaxial films grown with molecular beam epitaxy (MBE) using MBE Knudsen cells; the control system being arranged in a hierarchy comprising: input-output control means for MBE instrumentation; inner-control-loop means that qualifies MBE process dynamics prior to MBE growth; self-directed-control-loop means that quantifies MBE growth progress in-situ for precise film thickness, composition, and interfacial sharpness; and ex-situ-controlloop means that guides future recipe design with an artificial neural network; and data transfer means using inter-application communications for transferring data among individual control units;

wherein the input-output control means comprises sensor and actuator interfaces coupled to temperature and flux sensors and to the shutter for each Knudsen cell, and a PID (Proportional, Integral, Derivative) controller coupled to the heater of each Knudsen cell to control the temperature;

wherein the inner-control-loop means comprises an adaptive gain bandwidth (AGB) unit which includes means for quantifying thermal dynamics of the MBE Knudsen cells, using temperature data and PID algorithm data for a Knudsen cell from the input-output control means via said data transfer means; a beam equivalent pressure (BEP) calibrator unit which includes means to quantify flux emission from each Knudsen cell, using temperature data and ion beam pressure data for a Knudsen cell and ion gage from the input-output control means via said data transfer means; and a shutter opening transient compensator (SOTC) unit which includes means to quantify the effects of shutter cycle loading on the effective flux emission from each Knudsen cell, using temperature data and ion beam pressure data and shutter data for a Knudsen cell and ion gage from the input-output control means via said data transfer means; and wherein the self-directed-control-loop means comprises a growth control unit which includes means for essential recipe execution, using temperature, BEP, and shutter opening transient data from the AGB, BEP, and SOTC units via said data transfer means; a flux setpoint control unit which includes means to calculate precise Knudsen cell thermal setpoints for required flux output density, using temperature and BEP data for the Knudsen cell from the input-output control means and BEP unit via said data transfer means; and expert system inference engine means for guiding recipe flux requirements via in-situ sensor data, using temperature, pressure, and shutter data from the input-output control means and the AGB, BEP, and SOTC data from the respective AGB, BEP, and SOTC units via said data transfer means; and wherein the ex-situ-control-loop means comprises an artificial neural network with means for processing acquired MBE calibration and growth data to form material-process models to guide future recipe design.

9. A hierarchical control system according to claim 8, which includes means for combining all MBE instrumentation onto a single organized work platform; so that MBE set-up, calibration, and growth can be controlled from a central location; and so that MBE parameters can be monitored in real-time and compared for process interactions and boundary conditions.

10. A hierarchical control system according to claim 9, which includes means for providing set-up, calibration and growth data to the expert inference engine and to the artificial neural network to process and validate new MBE recipe designs with reduced recipe trials.

11. A hierarchical control system according to claim 8, which includes means using inter-application communication to transfer data to and from individual units, which allows each instrumentation unit, inner-loop-control unit, self-directed-control-loop unit, and ex-situ-control-loop unit to be developed independently of the other units, and allows the hierarchial control system to be configured uniquely for any MBE system.

12. A molecular beam epitaxy (MBE) control method using a hierarchical control system, for controlling and improving epitaxial thin-films grown with an MBE machine system, wherein said method comprises the steps of:

calibrating the MBE machine system to determine specific MBE machine characteristics to be used in optimizing a wafer growth recipe and precisely controlling MBE machine actuators during thin-film wafer growth;

optimizing the growth recipe to the calibration of the MBE machine to accommodate machine boundary conditions for substrate temperature, cell temperature, beam flux, shutter timing, and chamber pressure;

growing the thin-film semiconductor wafer with precise substrate and cell temperature control, cell temperatures driven by individual cell flux requirements, and cell temperatures automatically adjusted to compensate cell shutter opening flux transients;

post-processing the thin-film wafer growth for future growth recipe enhancement by correlating actual substrate and cell temperatures with growth process temperature requirements and x-ray defraction properties to provide recipe design by electro-optical property requirements.

13. A molecular beam epitaxy control method according to claim 12, wherein the step of growing a thin-film semiconductor wafer in a calibrated MBE machine with an optimized growth recipe comprises the steps of:

setting the substrate and Knudsen cell temperatures, proportional band, integral time, derivative time, high cutback, and low cutback constants, required for each layer by the optimized growth recipe;

setting the state and duration of each Knudsen cell shutter required for each layer by the optimized growth recipe;

compensating the flux beam emission from each Knudsen cell to minimize shutter load induced flux emission transients with the following equation, $$C_{(n)} = K_0 S_{(n)} - K_1 S_{(n-1)} + K_2 C_{(n-1)}$$

by tracking the previous $S_{(n-1)}$ and current $S_{(n)}$ shutter state and previous $C_{(n-1)}$ temperature compensation to calculate a current $C_{(n)}$ compensation temperature for each Knudsen cell required for each layer by the optimized growth recipe.

14. A molecular beam epitaxy control method according to claim 12, wherein the step of post-processing a thin-film wafer grown by the MBE control method comprises the steps of:

correlating each Knudsen cell growth process temperature record with the optimized growth recipe setpoint temperature record and the flux emission compensation temperature record;

correlating properties determined by x-ray defraction of each thin-film wafer layer with the required layer properties of the optimized growth recipe.

15. A molecular beam epitaxy control method according to claim 12, wherein the step of calibrating a MBE machine system is carried out at a time before optimizing a growth recipe and before growing a thin-film wafer based on an optimized growth recipe and comprises the steps of:

tuning each proportional-integral-derivative (PID) Knudsen cell and substrate temperature controller, to calculate K constants for the parametric equations that describe the control variable requirements of each Knudsen cell and substrate controller for any temperature requirement within each Knudsen cell and substrate operating temperature range using the following equations:

$$G = K_{G2}T^2 + K_{G1}T^1 + K_{G0}T^0$$

$$P = K_{P2}T^2 + K_{P1}T^1 + K_{P0}T^0$$

$$L = K_{L2}T^2 + K_{L1}T^1 + K_{L0}T^0$$

$$R = K_{R2}T^2 + K_{R1}T^1 + K_{R0}T^0$$

$$F = K_{F2}T^2 + K_{F1}T^1 + K_{F0}T^0$$

$$Q = K_{Q2}T^2 + K_{Q1}T^1 + K_{Q0}T^0$$

$$\Delta = |\text{target setpoint} - \text{current setpoint}|$$

Proportional band = $G \cdot 100\%$

Integral time = P
Derivative time = L.4

$$\text{High Cut Back} = \frac{L}{F} + \frac{\Delta}{F^2} - \frac{\Delta^2 + \Delta \cdot P \cdot F}{F^2 \cdot FG^2 \cdot Q \cdot \text{range}}$$

$$\text{Low Cut Back} = \frac{L}{R} + \frac{\Delta}{R^2} - \frac{\Delta^2 + \Delta \cdot P \cdot R}{R^2 \cdot G^2 \cdot (100\% - Q) \cdot \text{range}}$$

where the parametric equation for gain is $K_G$, period is $K_P$, lag is $K_L$, rising rate is $K_R$, falling rate is $K_F$, output demand power is $K_Q$, and T is the required temperature;

calibrating each Knudsen cell flux beam emission, to determine the Beam Equivalent Pressure (BEP), flux control time constant, and shutter induced load change to determine the K constants for the following equation for each Knudsen cell, $$C_{(n)} = K_0 S_{(n)} - K_1 S_{(n-1)} + K_2 C_{(n-1)}.$$

16. A molecular beam epitaxy control method according to claim 15, wherein the step of tuning proportional-integral-derivative (PID) temperature controllers comprises the steps of:

initializing the temperature process tuning zones, by dividing a process range from a minimum operating temperature to a maximum operating temperature into five temperature tuning zonepoints equally spaced by 20% of the range with the first tuning zonepoint and setpoint set equal to 10% of the process range below the maximum operating temperature and setting the controller's P,I,D coefficients to 10,0,0 respectively;

monitoring the process until a stable temperature, determined by the following equation, $$|K3| + |K2| + |K1| < 0.001$$

by continuously fitting the last 15 seconds of the process temperature data to a 3rd-Order Least-Squares-Estimation until the sum of the magnitudes of the K3, K2, and K1 coefficients minimizes below 0.1% applying a disturbance to the process, by increasing the process setpoint by 10% of the process range and then determining an initial temperature reaction as in the previous step with the following equation, $$|K3| + |K2| + |K1| > 0.01$$

when the equation is satisfied, the process setpoint is lowered by 30% of the process range in preparation for the next tuning zonepoint;

measuring the process reaction, by recording the process temperature data and the process input power data until the process temperature decreases below the current tuning zonepoint temperature;

extracting the six process parameters, by determining the maximum rising temperature rate vector with a 3rd-Order Least-Squares-Estimation of the leading temperature data, determining the maximum falling temperature rate vector with a 3rd-Order Least-Squares-Estimation of the trailing temperature data, determining a noise filtered temperature peak with a 3rd-Order Least-Squares-Estimation of the peak temperature data, determining process lag as the time delay from the initial disturbance to an intercepting tangent from the maximum rising rate vector, determining process period as the time separation from where the rising rate vector intercepts the maximum value of the noise filtered temperature peak and where the falling rate vector intercepts the same temperature peak, determining process gain by the following equation, where the process gain is equal to the square root of a quantity having a numerator and denominator, with the numerator being the reciprocal of range times the integral of Output Temperature Pulse & Noise Power, and the denominator being the integral of Input Pulse Power; and determining steady-state power as the input power to the process at the stable temperature prior to applying the disturbance;

advancing to the next tuning zone, by decreasing the tuning zonepoint by 20% of the process range if the current zonepoint is greater than 10% of the process range above a minimum operating temperature for the process and then repeating with the monitoring of the process for stable temperature;

assimilating the six process parameters from all tuning zones, by fitting the five extracted values for each parameter to six separate 2nd-Order Least-Squares-Estimated parametric equations for later use to calculate proportional band, integral time, derivative time, high cutback, and low cutback constants.

17. A molecular beam epitaxy control method according to claim 15, wherein the step of calibrating flux emission from Knudsen cells comprises the steps of:

initializing the flux calibrating zones, by dividing a process range from a minimum flux operating temperature to a maximum flux operating temperature into five flux calibrating zonepoints equally spaced by 20% of the range with the first calibrating zonepoint equal to 10% of the process range below the maximum flux operating temperature;

baking out excess flux species from the Knudsen cell, by idling the Knudsen cell temperature setpoint at the maximum flux operating temperature for a preset bake-out period and then decreasing the temperature setpoint by 10% of the process range to the first flux calibrating zonepoint;

monitoring the process until a stable temperature, is determined by the following equation, $$|K3| + |K2| + |K1| < 0.001$$

by continuously fitting the last 15 seconds of the process temperature data to a 3rd-Order Least-Squares-Estimation until the sum of the magnitudes of the K3, K2, and K1 coefficients minimizes below 0.1%;

measuring the flux emission shutter load and beam equivalent pressure (BEP), by opening the Knudsen cell shutter and recording the flux magnitude data and temperature data until the flux measurement reaches a steady-state condition as determined by the equation, $$|K3|+|K2|+|K1| < 0.001$$

where the last 15 seconds of flux data is fitted to a 3rd-Order Least-Squares-Estimation until the K3, K2, and K1 coefficients minimize below 0.1% and then record the BEP value and calculate the StepUp temperature as a function of the change in flux magnitude for the shutter opening load change;

measuring the flux emission StepUp response, by applying the StepUp temperature to the Knudsen cell setpoint and recording the flux magnitude data and temperature data until the flux measurement reaches a steady-state condition as determined in the first flux measuring step;

measuring the flux emission StepDown response, by applying the zonepoint temperature to the Knudsen cell setpoint and recording the flux magnitude data and temperature data until the flux measurement reaches a steady-state condition as determined in the first flux measuring step;

advancing to the next flux calibrating zone, by closing the Knudsen cell shutter and then decreasing the calibrating zonepoint and setpoint by 20% of the process range if the current zonepoint is greater than 10% of the process range above a minimum flux operating temperature for the process and then repeating with the monitoring of the process for stable temperature;

assimilating the flux emission parameters from all calibrating zones, by correlating the shutterload flux data to the shutter opening time and converting into a difference equation D(z) and correlating the StepUp and StepDown flux data with Knudsen cell delay time and converting into a difference equation H(z), calculating C(z) by the following equation, $$C(z) = \frac{-D(z)}{H(z)}$$

and then converting C(z) into C(n), $$C_{(n)} = K_0 S_{(n)} - K_1 S_{(n-1)} + K_2 C_{(n-1)}$$

then fitting the coefficients $K_0$, $K_1$, and $K_2$ of C(n) and the BEP value for each of the five flux calibration zones to four separate 2nd-Order Least-Squares-Estimated parametric equations for later use in flux transient compensation during MBE thin-film wafer growth.

18. A molecular beam epitaxy control method according to claim 12, wherein the step of optimizing a growth recipe for the MBE machine calibration is carried out before growing a thin-film wafer, and comprises the steps of:

adjusting open shutter duration for each recipe layer with shutter timing from previous growth data and previous MBE machine calibration;

calculating the required beam flux from each Knudsen cell for each recipe layer given the required layer thickness and percent composition of each species by the equation $$\Phi = composition\ thickness/shutter\ duration;$$

calculating the required Knudsen cell temperature for beam flux for each recipe layer by the BEP equation $$Temperature = BEPintercept - BEPslope/\ln\Phi.$$

* * * * *